US011003422B2

(12) United States Patent
Penland et al.

(10) Patent No.: US 11,003,422 B2
(45) Date of Patent: May 11, 2021

(54) METHODS AND SYSTEMS FOR VISUAL PROGRAMMING USING POLYMORPHIC, DYNAMIC MULTI-DIMENSIONAL STRUCTURES

(71) Applicant: FASILITY LLC, Wayland, MA (US)

(72) Inventors: D. Jordan Penland, Surrey (CA); Christopher F. Lowery, Wayland, MA (US); Kathryn Heppner Trogolo, Wayland, MA (US)

(73) Assignee: Fasility LLC, Wayland, MA (US)

( * ) Notice: Subject to any disclaimer, the term of this patent is extended or adjusted under 35 U.S.C. 154(b) by 0 days.

(21) Appl. No.: 16/869,984

(22) Filed: May 8, 2020

(65) Prior Publication Data

US 2020/0356350 A1    Nov. 12, 2020

Related U.S. Application Data

(60) Provisional application No. 62/846,499, filed on May 10, 2019.

(51) Int. Cl.
*G06F 9/44* (2018.01)
*G06F 8/34* (2018.01)
*G06F 8/30* (2018.01)

(52) U.S. Cl.
CPC ............. *G06F 8/34* (2013.01); *G06F 8/315* (2013.01)

(58) Field of Classification Search
CPC ................................. G06F 8/34; G06F 8/315
USPC .................................................. 717/100–120
See application file for complete search history.

(56) References Cited

U.S. PATENT DOCUMENTS

| | | |
|---|---|---|
| 5,758,122 A | 5/1998 | Corda |
| 5,900,879 A | 5/1999 | Berry |
| 5,903,271 A | 5/1999 | Bardon |
| 6,053,951 A | 4/2000 | McDonald |
| 6,105,036 A | 8/2000 | Henckel |
| 6,731,314 B1 | 5/2004 | Cheng |
| 6,734,884 B1 | 5/2004 | Berry |
| 6,947,037 B1 | 9/2005 | Lynn |
| 6,973,642 B2 | 12/2005 | Minemoto |
| 7,506,304 B2 | 3/2009 | Morrow |

(Continued)

FOREIGN PATENT DOCUMENTS

WO    2000049498    8/2000

OTHER PUBLICATIONS

Bilas, The Continuous World of Dungeon Siege, Game Developers Conferences (GDC) 2003, Mar. 4, 2003, 57 pp.

(Continued)

*Primary Examiner* — Chuck O Kendall
(74) *Attorney, Agent, or Firm* — Cambridge Technology Law; Maura K. Moran

(57) ABSTRACT

A computer-based dynamic multi-dimensional visual programming environment is disclosed in which a visual programming language supports creation, operation, and maintenance of a model of a software system having a spatial arrangement of dynamic, polymorphic structures on a multi-dimensional world, to render the multi-dimensional grid into a display on a two-dimensional computer screen, and to construct, display, and act on instructions from a user interface associated with the two-dimensional screen to manipulate the dynamic, operable, multi-dimensional graphical items on the multi-dimensional grid.

20 Claims, 32 Drawing Sheets

(56) References Cited

U.S. PATENT DOCUMENTS

| | | | |
|---|---|---|---|
| 7,672,822 | B2 | 3/2010 | Lee |
| 7,874,921 | B2 | 1/2011 | Baszucki |
| 9,213,460 | B2 * | 12/2015 | Nurse .................... G06F 9/451 |
| 9,457,277 | B2 | 10/2016 | Loduha |
| 2001/0045965 | A1 | 11/2001 | Orbanes |
| 2001/0052110 | A1 | 12/2001 | Orbanes |
| 2002/0089541 | A1 | 7/2002 | Orbanes |
| 2002/0129340 | A1 | 9/2002 | Tuttle |
| 2007/0150864 | A1 | 6/2007 | Goh |
| 2017/0109933 | A1 | 4/2017 | Voorhees |
| 2018/0357048 | A1 * | 12/2018 | Venkataraman .......... G06F 8/24 |

OTHER PUBLICATIONS

West, Evolve Your Hierarchy, Cowboy Programming, Jan. 5, 2007, downloaded Jul. 23, 2018, from http:// cowboyprogramming.com/2007/01/05/evolve-your-heirachy/, 37 pp.

Martin, Entity Systems are the Future of Mmog development Part 1, Introduction, T-machine.org, Sep. 3, 2007, downloaded Jul. 25, 2018, from http://t-machine.org/index.php/2007/09/03/entity-systems-are-the-future-of-mmog-development-part-1/, 7 pp.

Martin, Entity Systems are the Future of MMOG development Part 2, What is an Entity System?, T-machine.org, Nov. 11, 2007, downloaded Jul. 25, 2018, from http://t-machine.org/index.php/2007/11/11/entity-systems-are-the-future-of-mmog-development-part-2/, 17 pp.

Martin, Entity Systems are the Future of MMOG development—Part 3, More on What is an Entity System, T-machine.org, Dec. 22, 2007, downloaded Jul. 25, 2018, from http://t-machine.org/index.php/2007/12/22/entity-systems-are-the-future-of-mmog-development-part-3/, 11 pp.

Martin, Entity Systems are the Future of MMOG development—Part 4, MMO Development Practices, T-machine.org Mar. 13, 2008, downloaded Jul. 25, 2018, from http://t-machine.org/index.php/2008/03/13/entity-systems-are-the-future-of-mmos-part-4/, 16 pp.

Martin, Entity Systems are the Future of MMOG development—Part 5, Initialization, Storage, and Data, T-machine.org, Oct. 26, 2009, downloaded Jul. 25, 2018, from http://t-machine.org/index.php/2009/10/26/entity-systems-are-the-future-of-mmos-part-5/, 12 pp.

Martin, Entity System 1: JAVA/Android, T-machine.org, May 9, 2010, downloaded Jul. 25, 2018, from http://t-machine.org/index.php/2010/05/09/entity-system-1-javaandroid/, 28 pp.

Martin, Entity Systems Languages, T-machine.org, Mar. 25, 2016, downloaded Jul. 25, 2018, from http://t-machine.org/index.php/2016/03/25/which-languages-need-entity-systems-libraries-right-now/, 40 pp.

* cited by examiner

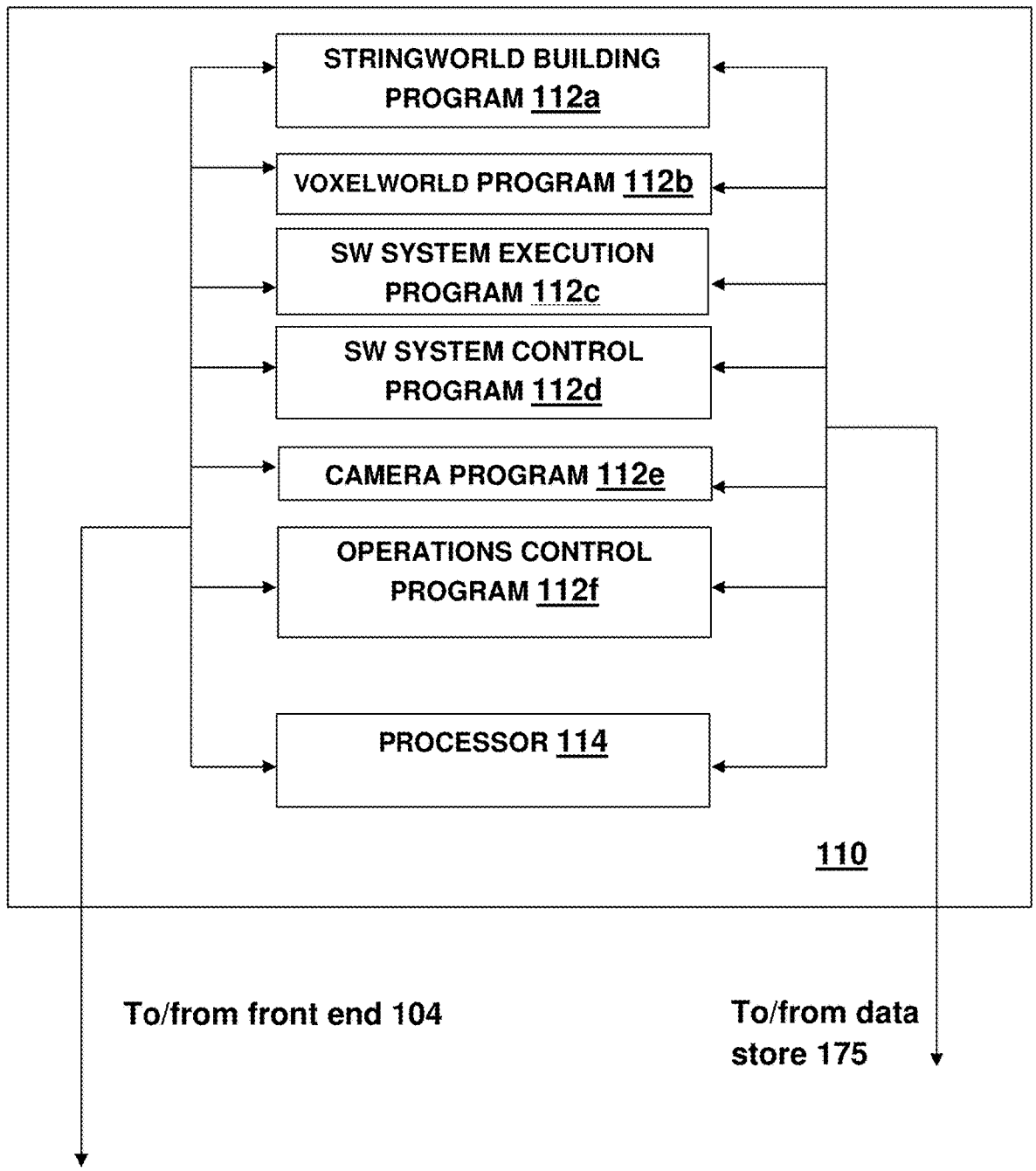

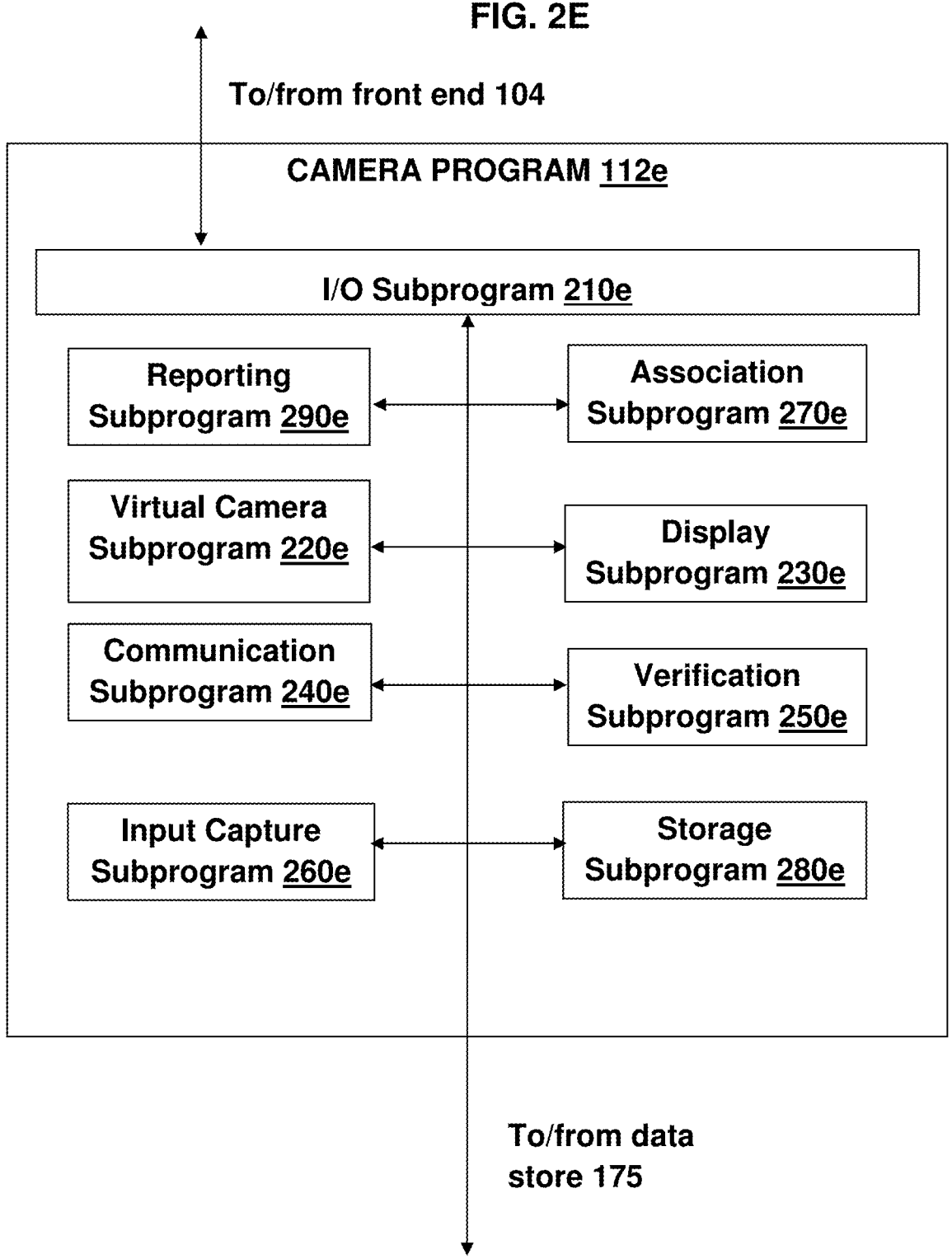

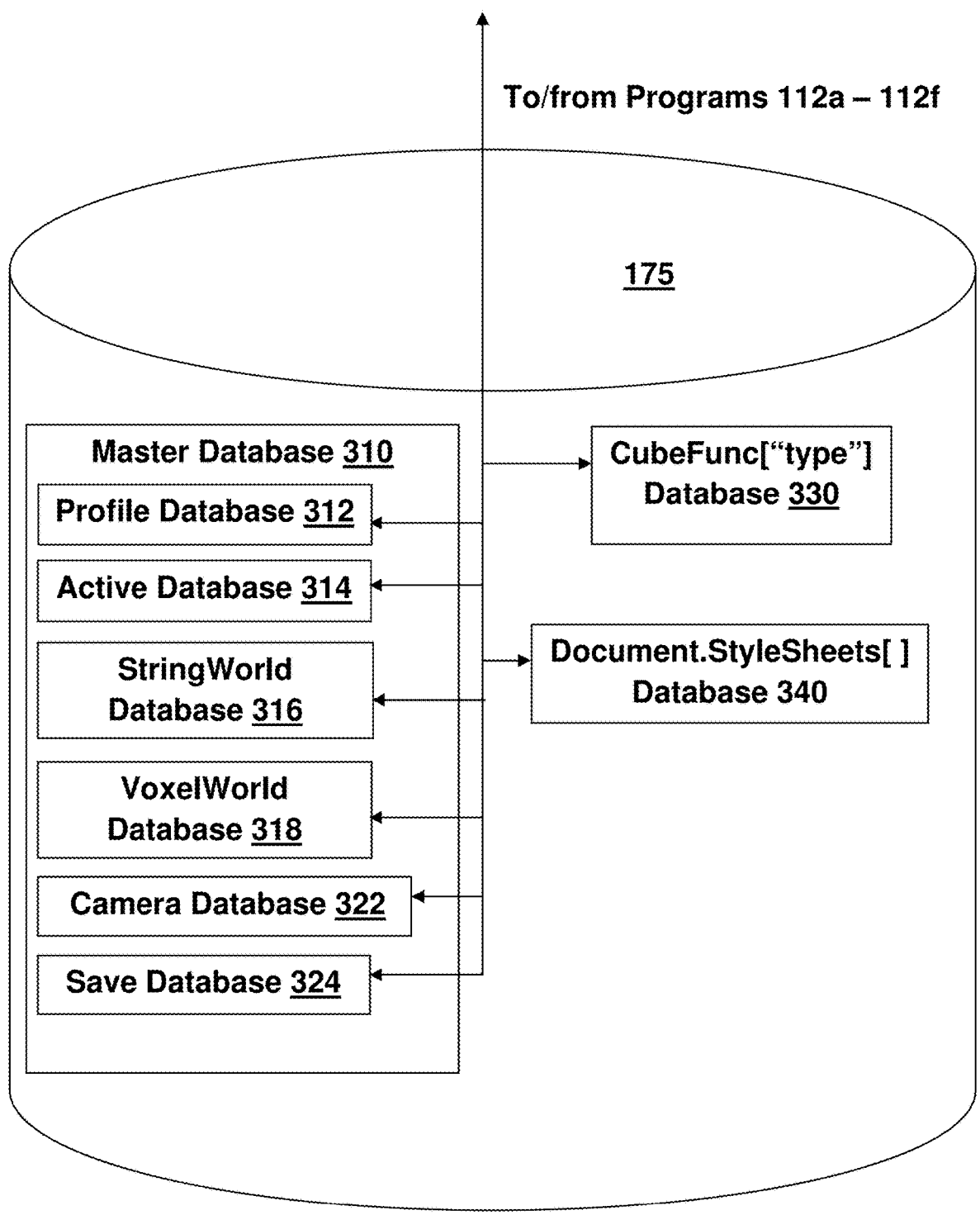

523

530

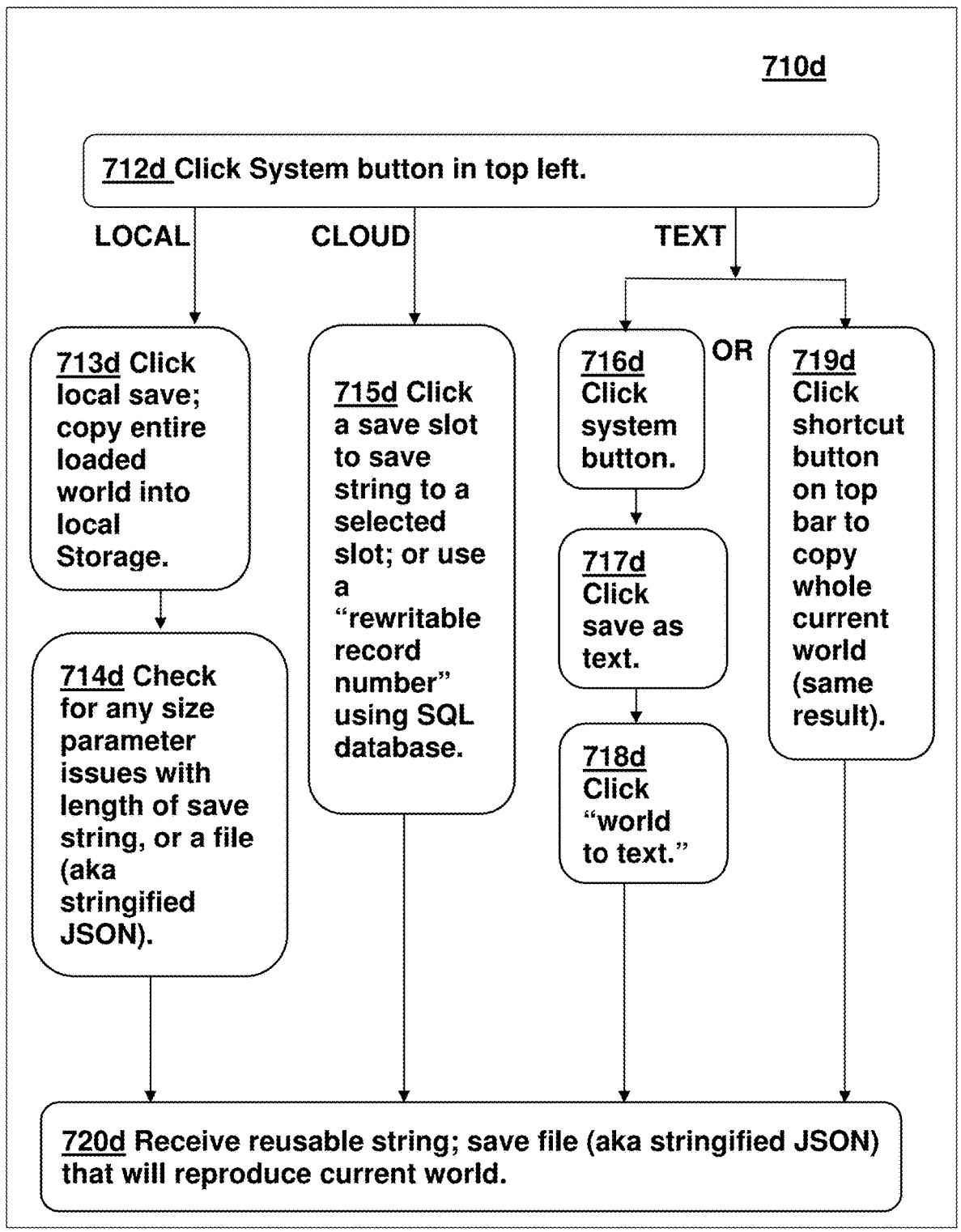

METHODS AND SYSTEMS FOR VISUAL PROGRAMMING USING POLYMORPHIC, DYNAMIC MULTI-DIMENSIONAL STRUCTURES

CROSS-REFERENCE TO RELATED APPLICATION

The present application claims priority to an earlier filed U.S. Provisional Patent Application No. 62/846,499, filed on May 10, 2019, and entitled METHODS AND SYSTEMS FOR VISUAL PROGRAMMING USING POLYMORPHIC, DYNAMIC MULTI-DIMENSIONAL STRUCTURES, the disclosure of which hereby is incorporated by reference.

FIELD

The present invention relates to the field of software programming, in particular to the field of visual software programming.

BACKGROUND

A computer program is a set of software instructions used to control the behavior of a computer. The software instructions that form the computer program are created according to a set of rules, formats, and procedures. A programming language is a formal language with instructions, rules, and procedures that are used to develop computer programs. When computer programs are introduced into a computer, they may produce effects that alter the state of the computer. The execution of a computer program is a series of actions following the instructions it contains to operate in combination and with relevant data, to perform a specific task, which may be simple or very complex.

Multiple intercommunicating software programs, along with data, configuration files, and system specification, tests, maintenance records, and documentation, may be organized into a software system designed to produce a desired result.

Programming Systems: OOP and COP

A variety of programming systems have been developed to organize software systems. One such programming system, Object-Oriented Programming (OOP), organizes software systems into entities represented by objects containing groups of encapsulated data and procedures. An object-oriented program is described by the interaction of the objects.

Component-based software engineering, also known as component-based development, is a branch of software engineering that separates a software system into distinct sections while still providing wide-ranging functionality throughout the software system.

One method of achieving component-based software design is to employ Component Oriented Programming (COP) techniques, in which elements of the software system are organized into entities having behaviors or attributes (such as order of operation, activities, characteristics, functionality, or style) and interrelationships with other entities. An entity's behaviors and attributes are derived from a set of components associated with the entity, each component of which may be unique to an entity or may be shared with multiple entities.

An "information vector," comprising a model containing information and directional components for the entity, may be developed to identify the set of components associated with the entity, or, further, the vector's constituent parts may contain information about the behaviors or attributes that the entity's components represent. For example, an element of the vector may identify a behavior or attribute, carry information about the behavior or attribute, or it may have a pointer to a definition of the behavior or attribute so that, when the entity is invoked, the behaviors and attributes associated with the entity may be invoked as well.

Other entities have their own set of defined behaviors and attributes organized into a component set, with a single behavior or attribute associated with any number of entities (including none of them). When a feature of a behavior or attribute is updated, the entities that are associated with the behavior or attribute do not need to be individually updated; instead, when invoked, a master component associated with the behavior or attribute is updated, and an entity's pointer for the component will access the updated master component and so may access the updated behavior or attribute.

Further, a system may be described by an array for the set of entities in the system and the set of characteristics that may be associated with entities in the set. An m×n matrix "A" may be developed for the set of m entities and a set of n characteristics that may be associated with the entities, in which a matrix element a(j, k) would refer to information related to characteristic k for entity j. For example, if entity j did not have characteristic k, element a(j, k) may be zero; and, if entity j does have characteristic k, element a(j, k) may be information related to characteristic k or a pointer to such information. In particular, the pointer for element a(j,k) may point to a piece of software code for implementing characteristic k in entity j.

As an analogy, the Microsoft™ Excel™ spreadsheet program developed by Microsoft Corporation of Redmond, Wash., features calculation, graphing tools, pivot tables, and a macro programming language called Visual Basic for Applications™, also available from Microsoft Corporation, which has a feature known as function composition, with which a user of the Excel™ program may develop a desired function out of other functions, and in so doing develop flexible relationships between functions to produce desired results. In invoking the desired functions, the constituent functions are invoked and used to produce the desired result.

In one component-based approach, the entity is an element of a software system that receives or actualizes logic of a component of the entity. Since components and entities may mutually access data and pass data to each other, an entity may contain the 1,000 lines of code or be associated with a component having or pointing to the 1,000 lines of code. When a component is thus defined, because more than one entity may be associated with a component, more than one entity may be associated with the same 1,000 lines of code, rendering the code more easily reusable and less apparent inside an entity (where it could also be deleted more easily). Use of components to define entities frees an entity from being a literal interpretation of the code. The entity may have code or it may not, or it may describe a feature or not, or it may contain or call data or not, but the entity will have a consistent set of characteristics that allow data or functionality to be stored or retrieved reliably. Entities may be mono-component or multi-component.

Mono-component entities may be defined by a single component, or they may be defined by multiple components that do not interact and so may operate only one component at a time. Mono-component entities are of benefit because they are relatively easy to manage and provide simplicity of concept.

Multi-component entities may be defined by multiple components that may interact with each other, causing more than one component to be operated simultaneously or in rapid serialization that appears simultaneous.

In certain embodiments of developing or maintaining software systems using COP-based programming, entities may start out mono-component, and as development progresses, become multi-component. Adding components to selected entities over time allows software system designers to control the introduction of new code, data, or functionality, and study interactions, interrelationships, and impact of the operation of an entity to which a component is associated and the operation of other entities in the system, eliminate stacking blockages, and otherwise facilitate debugging.

Visual Programming

Visual programming, sometimes known as visual software programming, is a software programming technique in which programs are created by manipulating software elements graphically rather than by specifying them textually. With visual programming, a software system may be displayed visually on a computer screen, with its elements and their interrelationships displayed to facilitate understanding of the system, adding of features, deleting, modifying, debugging, and analysis of the operation of the software system when its elements are in various states.

Typically, code has not been visualized in more than two dimensions (2D), because of the considerable complexity in code, data, computations, operations, and abstraction that is inherent in modeling in three dimensions (3D) as opposed to modeling in 2D (consider, as an example, the additional complexity of calculations involving 3D vectors rather than 2D vectors), and the additional hundreds or thousands of choices to be handled in rendering in 3D instead of 2D.

A software system element may be represented by any visually displayed image, such as a block, cube, sphere, polyhedron, or irregular shape. For convenience here, visually displayed images will be referred to as graphical items (also known as images, displayed images, items, displayed items, graphical items, objects, images, shapes, blocks, or cubes). Also, while the interrelationships between two or more software system elements may be represented by one or more solid, dashed, wavy or curved arrows, lines or arcs between visually displayed images representing the software system elements, for convenience here, the interrelationships will be referred to as conjoiners. In complex display of interconnections between software system elements, it may not be possible to avoid conjoiners crossing each other, in which case it may be convenient to represent the conjoiners so as to indicate whether or not the conjoiners "connect" to represent interconnections among multiple elements. In one display representation, the conjoiners may be displayed in the same color or with a unique shape when they intersect (to illustrate that the conjoiners join multiple elements) or in different colors or different shapes when they do not intersect. In another display representation, the conjoiners may be displayed using conventions of electrical/electronic circuit diagrams, such as two intersecting conjoiners shown by a crossing of conjoiners with a dot at the intersection to indicate a connection, and two non-intersecting conjoiners may be shown by a simple crossing of the conjoiners without a "dot" or other graphical image.

Alternatively, using another set of conventions of electrical/electronic circuit diagrams, intersecting conjoiners may be shown by a simple crossing of the conjoiners at their intersection to indicate a connection, while non-intersecting conjoiners may be shown by a small semi-circle symbol to show one conjoiner "jumping over" the other conjoiner. In another alternative design embodiment, to reduce confusion between intersecting and non-intersecting conjoiners, intersecting conjoiners may be shown with a dot displayed at their intersection to indicate a connection, and two non-intersecting conjoiners may be shown with the small semi-circle symbol at their intersection to show one conjoiner "jumping over" the other conjoiner.

Computer Languages

Computer languages have been developed to allow software developers to program computers. Common computer languages include visual programming languages and style sheet languages.

Style sheet languages express the presentation of structured electronic documents in which embedded coding may be used to give the whole, and parts, of the document various appearances. One modern example with widespread use is Cascading Style Sheets (CSS), a style sheet language used for describing the presentation of a document written in a markup language like HTML. The specifications for CSS are maintained by the World Wide Web Consortium (W3C) of Cambridge Mass. (W3C is the main international standards organization for the World Wide Web). CSS was originally built to style documents but may now be employed to present images of elements of a software system in a graphical display. CSS has also grown to present images of entities of a COP-based software system in a graphical display, supporting both single tag and multi-tag entity selectors, to achieve the definition of appearance, positioning, interactivity or non-interactivity, and other presentation details.

Visual programming languages (VPL) have been developed to allow software developers to program with visual expressions and spatial arrangements of text and graphical symbols. VPLs have been developed to allow software developers to program with visual expressions and spatial arrangements of text and graphical symbols. One example of a block-based VPL is the Scratch™ visual programming language with which users may create online projects using a block-like interface. The Scratch™ language was developed by and is available from MIT Media Lab at the Massachusetts Institute of Technology of Cambridge, Mass. In certain VPLs, the relationships between the elements of a software system represented by displayed items may be shown without use of arrows, lines or arcs, for example by adjacency of items or proximity to items.

Visual Feedback

Visual programming allows a programmer to inspect and control the operation of a software system's elements, sub-function by sub-function, following their visual interaction, calling and operation of sub-functions, and interaction of elements through changes in the display. The syntax of the VPL defines the visual display (geometric shape, size, color, etc.) of the items representing the software elements, and how an element's visual display may be changed in response to operation of or by an element so that a user knowledgeable of the syntax may understand, based on the display, that an action occurred, what kind of action occurred, and what was the scope and impact of the action.

Thus, changes in display provide a feedback on the status and operation of a software system.

Other Visual Software Programming Features

Visually Interpreting Code as Graphical Images Processing Code Directly

In conventional visual programming environments, every semantic bit of code is typically represented in the visual display by a graphical image with a rigid 1:1 syntax mapping, such as a flow diagram. While 1:1 syntax mapping is convenient because it ensures an automatic, careful tracking of each line of software code, the rigid mapping has the disadvantage of preventing display of hierarchical representation of software code (preventing a developer from "seeing the forest for the trees"), or complicating or encumbering display of hierarchical representation of software code. Hierarchies of software code may have many thousands of lines that rarely need to be reviewed or represented (e.g. HTTP(S) request methods which have not changed much in 10 years, but may not be easily summarized in just a few lines of code). Rigid mapping could add "overhead" to the display of such infrequently amended code. In programs such as Excel™, a user is free to obscure or shorthand certain formulas without cluttering spreadsheet cells, but it would be advantageous to offer a less rigid syntax mapping to allow for different hierarchical level views of the software system under development.

Using Flow Diagrams to Show Paths of Code Execution Between Items

In conventional visual programming environments, flow diagrams have been used to show paths of code execution through a program. Therefore, while the flow may be shown to display paths of code execution (also referred to as "flow of code execution"), in conventional visual programming environments, the flow of code execution within the software system under development typically is changed by altering the connections of lines of code execution, not by altering the appearance of the lines. Typically, the path of code execution does not constantly need altering or reassessment in modern coding projects, where groups of project data, configuration parameters, or business logic are more dynamic. It would be advantageous to offer displays that allow for the path of code execution to be displayed and modified so that flow may be altered to access entities that have graphical entities that are 3D models in a 3D world in the vicinity of a selected graphical item, such access herein referred to as "visiting neighborhoods." Such entities having proximal 3D models in the 3D world or common interrelationship frequently have common characteristics, so that access to such graphical items-defined "neighborhoods" of entities would be advantageous.

An Input/Output Port System of 3D Solids Like a Flow Diagram

In conventional visual programming environments, 2D representations of 3D solids may be used to display the inputs and outputs of selected modules of a software system under development. While the inputs and outputs may be displayed like a flow diagram, in conventional visual programming environments, the inputs and outputs themselves or the orders of operations of entities typically are not altered by altering the appearance of the 3D solids or by altering their locations in the display. It would be advantageous to offer a dynamic 3D modeling environment in which altering the displayed inputs and outputs of 3D models or the order in which they are arranged in a 3D world alters the inputs and outputs and orders of operation of the entities that the 3D models represent.

A Pre-Compiled, or Object-Oriented 3D Coding Environment

Conventional visual programming environments typically provide a pre-compiled, object-oriented 3D coding environment using languages such as JAVA™ general-purpose computer-programming language available from Oracle Corporation of Redwood Shores, Calif., or the C++ general-purpose programming language standardized by the International Organization for Standardization (ISO) of Geneva, Switzerland. It would be advantageous to provide a coding environment that is not limited to use of pre-compiled or object-oriented software.

Tags and MetaData

In the visual development of website front-ends, CSS also allows a developer to tag an element to be displayed with multiple behaviors or attributes (such as visual stacking order, activities, characteristics, etc.). For example, tagging an element with a house tag and a shiny tag produces a displayed image of the element as a shiny house. Assigning elements with multiple tags related to varying behaviors or attributes allow the elements to acquire different sets of complex attributes and behaviors, and external functions can select and modify their order of operation.

By using metadata and a system of tags related to desired behaviors or attributes, desired functionality may be achieved without providing each element with complex metadata, programming, and complex hierarchical definitions. For example, an element may be associated with a giraffe tag to associate the appearance and behavior of a giraffe with the element and an accounting tag to render the entity with the capability of performing accounting operations such as 'consume data sources' and 'output sums' on accounting data. The giraffe/accountant element may be capable of being visually displayed as a giraffe and, upon encounter with an accounting data block, may 'consume data sources' and 'output sums' When the accounting operation is at the back end of a website or other application without a visual display, the giraffe image may not even be visible, and all that will be apparent will be data sources coming in and results coming out, not that a giraffe performed the operation.

Another example applying tagging or metadata to elements of a visually-based system may be seen in the A-Frame™ open-source web framework for building virtual reality (VR) experiences. The A-Frame™ framework is primarily maintained by the Mozilla community, supported by the Mozilla Foundation and the Mozilla Corporation, both of Mountain View, Calif., and the WebVR community, which is maintained by the Mozilla Foundation for use in virtual reality devices in a web browser. The A-Frame™ framework is an entity/component system framework for the THREE.jS™ cross-browser JavaScript™ library and API used to create and display animated 3D computer graphics in a web browser. The THREE.jS™ library/API is hosted in a repository on the GitHub web-based hosting service from GitHub Inc. of San Francisco, Calif., for version control using the Git™ version control system from GitHub Inc. JavaScript™, a trademark of Oracle Corporation, is a high-level, interpreted programming language that is used under license for technology invented and implemented by Netscape Communications (now owned by Verizon Media of New York, N.Y.) and current entities such as the Mozilla Foundation.

When a graphical item is created in the A-Frame™ framework, it represents an element of a software system. When a tag is added to the graphical item that instructs the item to be animated to grow and shrink, the tagging of the item creates a complex behavior of animation, but the software element that the graphical item represents does not change—its functionality is not altered. Tags may be applied to the graphical item to build additional functionality for the software element associated with the graphical item, for example, special tags may be used to generate vertex geometries with useful visual sub-properties (like color, position, material, etc.) automatically included.

Thus, tagging becomes a shorthand method for programming a software element with functionality. A programmer may use tags to build new functionality and define new features for elements of a software system. However, reliance on tags to build new functionality and define new features is limiting because typically operation of functionality defined with tags involves the retrieval of the data and instructions causing human delay in designing, or in some cases machine delay in executing, the desired operation. It would be advantageous in software development to provide new functionality and to define new features for system elements that may be speedily and efficiently invoked.

Wrapper and Composing Functions

In visual programming environments, a new feature may be incorporated into a computer system or a feature of one element of the software system may be arranged to work in tandem with another element by manipulation of images representative of the feature. For example, an existing entity may be configured to call a desired subroutine, one or more helper functions, or variables. A new entity may be created to trigger the existing entity to function as configured, and a wrapper function may be employed to connect the new entity with the existing entity.

A new block associated with the new entity may be created and placed in a display with an existing block that represents the existing entity, and a graphical representation of the wrapper function that connects the new entity with the existing entity may also be created and placed in the display to show a link between the old block and the new block.

In one embodiment, the wrapper function may be represented by positioning the new block adjacent to the existing block in the display, to represent the relationship between the entities associated with the blocks. In another embodiment, the wrapper function may be represented by a conjoiner (such as an arrow or arc) between the blocks or by displaying a coating that completely or partially envelops the blocks.

In still another embodiment, a graphical item representing a wrapper function may connect two existing blocks, for example, in one of the ways disclosed above, to invoke composing functions that operate cross-entity so that the result of one function operating on an entity represented by one block is passed as the argument of a function operating on an entity represented by the next block, and the result of a function operating on the entity represented by the last block in the connection is the result of a function operating on the whole. Thus, when one block is clicked, it will cause the entities represented by both blocks to operate. The order of operation, left to right or right to left, may be defined at the convenience of the programmer, for example by passing all immediate events to a hopper or execution stack, to call functions serially.

Thus, the programmer may use tags, metadata, wrapping functions and composing functions on adjacent blocks so that they operate in the same information space, sharing variables between them.

It can be seen that a software system developer has multiple ways to organize a software system and multiple tools with which to develop the software system. However, it would be advantageous to provide a programming environment that could support development of software systems organized into a variety of architectures, such as OOP and COP, and could represent the software systems visually so as to facilitate understanding software systems at a variety of levels of abstraction. Further, it would be advantageous to develop a series of visual software development tools and structures to facilitate the development of software systems that may be represented visually.

Sharing an Application with Multiple Programmers

It is often desirable for multiple programmers to work together to develop a software system. Frequently, the sharing occurs in multiple environments, using multiple sets of resources, tools, and structures and collecting and managing similar user materials in a variety of different contexts. Some browsers have "tab groups," or groups of related tabs that are organized in groups to make them easy to locate and access, but the tab groups are specific to the programming space of the one programmer but not necessarily to her remote teammates. In addition, sharing multiple environments requires considerable consumption of human effort, as well as memory and CPU cycles, to manage the collection, application, and sharing of information among users.

It would be advantageous to develop a series of visual software development tools and structures to facilitate the multi-user development of software systems, increasing interface efficiency, improving ease of sharing, and reducing the burden on computer and network resources of such sharing.

SUMMARY

A dynamic multi-dimensional visual programming environment is disclosed in which a visual programming language supports the use of dynamic, polymorphic multi-dimensional structures (also known as graphical items) to develop and maintain a software system, including systems based on Object-Oriented Programming (OOP) or Component-Oriented Programming (COP).

The disclosed dynamic multi-dimensional visual programming environment and language may be used to create a model of a software system having a spatial arrangement of dynamic, polymorphic, graphical items comprising text and graphical images on a multi-dimensional grid, such as, when the model is created in three dimensions, a 3D grid (the model otherwise known as a scene or a multi-dimensional world), to render the model into a display on a 2D computer screen, and to operate a user interface associated with the 2D screen to manipulate the dynamic, operable, graphical items on the multi-dimensional grid.

The resultant dynamic multi-dimensional visual programming environment, comprising the disclosed multi-dimensional visual programming language and the software, hardware, data, and protocols that provides the infrastructure to develop and use a software system, including hosting that language; and developing, displaying, running, testing, modifying, saving, and sharing the software system and its multi-dimensional, dynamic visual models written in the multi-dimensional visual programming language, allows for spatial arrangement and activation of the dynamic, polymorphic graphical items to add, delete, and modify features, debug code, and analyze the operation of the software system when its entities are in various states, thus facilitating the programming of software systems.

The resultant dynamic multi-dimensional visual programming environment may be used to model a COP-based software system in a multi-dimensional world. The resulting system, organized into system entities, interrelationships between entities, and components defining attributes or behaviors of entities, may be modeled in a spatial arrangement of virtual dynamic, polymorphic multi-dimensional structures comprising text and graphical images positioned at assigned locations on a multi-dimensional grid, which may be rendered into a graphical display on a 2D computer screen. The multi-dimensional grid may be defined with a coordinate system, such as the Cartesian (X,Y,Z) coordinate system, and a graphical item may be defined by a point having an address on the multi-dimensional grid relative to a defined geometric location.

The visual programming language with which a COP-based software system may be developed may use polymorphic, dynamic multi-dimensional graphical structures that comprise definable/reusable multi-dimensional structures to model the software system entities and create and modify the software system itself. The rules of the visual programming language provide a programming environment that allows for creation and modification of the software system, with the environment featuring multi-dimensional structures with which consistent "database-style" Create, Read, Update, Delete functionality is associated, quick "click to build" user interface (UI) options, "save/load" from text file or from text-editing software, such as the Notepad™ text-editing software that is built into the Windows™ operating system from Microsoft Corporation, to expedite building of the multi-dimensional model of the software system, and workflow and UI optimizations that facilitate use of the visual programming environment by users with little to no training.

The graphical items with which the software system is modeled are polymorphic in that they may represent different types of entities in the modelled software program. They are dynamic in that they may be manipulated to program the COP-based software system, with their movements on the multi-dimensional grid resulting in new addresses for the graphical items defined with reference to the geometric center. The dynamic graphical items may be spatially arranged and given activation or functional patterns or characteristics so that manipulation of a graphical item (or an item adjacent to the graphical item, should the entity associated with the graphical item be associated itself with a wrapper function) using the user interface associated with the 2D screen causes the entity associated with the graphical item to be activated or to have an operation applied to it.

When the software system is COP-based, the polymorphisms and dynamic characteristics are provided by associating selected components with the entities that the graphical items represent.

The dynamic, polymorphic graphical items may convey information about values associated with them. They may be assigned visually distinctive manifestations to define types and style for representing types of entities, characteristics of entities, and interrelationships between or among entities. For example, when the modeled software system is a COP-based software system, the elements of the software systems are entities, components associated with entities, and links between entities representing relationships between entities. The visual manifestations, or "styles," of graphical items may convey information about values (e.g., data, variables, code, or functionality) associated with entities modeled by the graphical item, through the definition(s) of the component(s) associated with the entity, thus facilitating analysis and modification of the software system by developers familiar with the values that the styles represent. Further, more than just visual style or appearance may be applied to a graphical item. For example, a graphical item modeling an entity with more than one component associated therewith may have multiple visually distinctive manifestations (color, striping, texture, stipple, etc.) to represent the component set, thus presenting the graphical item with an individuality of appearance, which may be an individuality of visual style, individuality of behavior, or a combination of both.

In addition, the use of dynamic, polymorphic graphical items allows graphical images to provide indirect visual interpretation of code. For example, the cube grid of editable code strings and string-based entities may operate as a flexible layer that represents code without a rigid 1:1 syntax mapping between a line of code and a graphical element. In other words, a programmer may associate additional lines of code with a graphical image without the code being visually apparent, which it would be in a "direct" visual programming environment. Thus, the visual programming environment may display hierarchical representation of software code to present a higher understanding of the functionality of the software under development in one view, with a more detailed presentation of the code that provides the functionality as desired in another view, with the choice of view selectable by the user.

Components either store information about attributes or behavior of entities or have pointers to locations that store such information about attributes or behavior of entities. In either case, a component may be associated with multiple entities, each of which operates under the same rules and definitions imposed by the value of the component.

Modifying the component itself, either by editing its attributes or behavior information or its information at a remote location, modifies the rules under which each entity associated with the modified component operates.

Alteration of the visually distinctive manifestations of graphical items in the multi-dimensional world may be used to alter the COP-based software system entities modeled by the graphical items. For example, when the appearance of a graphical item is altered (with modes of user alteration including, but not limited to, style), the component(s) associated with the entity that the graphical item models are exchanged, for example, by replacing a first component associated with the original style with a second component associated with the new appearance. The rules and definitions imposed by the value of the first component are replaced with the rules and definitions imposed by the value of the new component, thus modifying the attributes or behavior of the modified entity. Thus, modifying the appearance of graphical items adds, deletes, or modifies features and functionality of the software system itself, facilitating debugging of code and analysis of the operation of the software system when its entities are in various states.

In addition, while the interrelationship among entities of a software system under development and the paths of code execution within the software system may be presented visually in the dynamic multi-dimensional visual programming environment of the present invention through the use of graphical elements, such as conjoiners, e.g. buttons and clicker cubes, as well as code cubes themselves that "transmit execution" with visual cues, the dynamic nature of the graphical elements themselves allow for alteration of the interrelationships themselves among entities and the flow of code execution itself within the software system under development through the alteration of the graphical elements that display the interrelationships among entities and the lines of code execution.

In addition, while the inputs and outputs of selected modules of a software system under development may be presented visually in the dynamic multi-dimensional visual programming environment of the present invention through the use of styles of the graphical elements that model the selected modules and by imparting functionality to the graphical elements, the dynamic nature of the graphical elements themselves allow for alteration of the inputs and outputs themselves through the alteration of the location, appearance, and functionality of the graphical elements that model the selected modules.

However, it should be noted that the visual alteration of the graphical item modifies the rules and definitions for the modified entity, but not for the other entities to which the first component is applied. In other words, the visual alteration of the graphical item modifies the set of components (and their associated rules and definitions) of the modified entity but not those of the other entities with which the first component is associated.

The software system may be modeled onto a multi-dimensional grid, with locations on the grid provided with a grid address and with graphical items representing elements of the software system assigned to a location on the grid at a specified grid address. Conservation of addressing is imposed in the grid such that each location on the grid is unique and only one valid graphical item may be located in the item's voxel at a time, the "voxel" being described in more detail below as the volumetric representation of a pixel. Therefore, no two graphical items may be defined to be at a particular grid location or a certain quantized zone at a time. With the multi-dimensional world defined by quantized space and enforcement of graphical item placement within that quantized space, superimposition of graphical items in the multi-dimensional world is disallowed, and the uniqueness and stability of location in the grid of graphical items is provided.

With definition of the multi-dimensional world by quantized space and enforcement of graphical item placement within that quantized space, the attendant uniqueness and stability of location of graphical items in the grid makes possible imparting software functionality and style to software entities based on the grid addresses of one or more graphical items that model the software.

Imparting behavior and style may be performed on a target software entity through direct or absolute addressing (in which the target entity is identified by the "global" grid address of its model on the multi-dimensional grid, and relative addressing (in which the target entity is acted on by an entity with action functionality because the target entity meets specified proximity criteria in content associated with the entity, like "MyLeft" or "MyRight", with the specified proximity criteria being based on the grid locations of the graphical item of the acting entity and the target entity).

The definition of the multi-dimensional world by quantized space and enforcement of graphical item placement within that quantized space allows for the development of functionality to search for entities that are modeled by graphical items in the multi-dimensional world that are located near to each other in the multi-dimensional grid, according to criteria that may be defined by the searcher. The proximity criteria may include not only a search along the X, Y, Z directions away from a desired location on the grid (implemented, for example, by incrementing and decrementing grid addresses), but it may also include searching around a grid location using a measured distance from the desired location.

The disclosed apparatuses, methods and systems are very adaptable and may be used to simply and conveniently develop software systems of deep complexity.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiment(s) of the invention and together with the description, serve to explain the principles of the invention.

BRIEF DESCRIPTION OF THE DRAWINGS

FIGS. 1A and 1B are block diagrams of an exemplary computer-based software system development system for a 3D embodiment of the dynamic, polymorphic multi-dimensional visual programming environment described herein;

FIG. 2E is a block diagram of a camera program 112e for use in controlling a virtual camera of the multi-dimensional model of the software system under development;

FIG. 3 is a block diagram of a database structure for a 3D embodiment of the dynamic, polymorphic multi-dimensional visual programming environment described herein;

FIGS. 7A-7F are block diagrams showing the workflows of the operation of a dynamic, polymorphic 3D visual programming environment of the current invention;

DETAILED DESCRIPTION

Reference will now be made in detail to the present exemplary embodiments, examples of which are illustrated in the accompanying drawings. Wherever possible, the same reference numbers will be used throughout the drawings to refer to the same or like parts.

In the described embodiment, for simplicity, the visual programming environment is based in three dimensions, and the polymorphic, dynamic structures are constructed in 3D, but it is to be understood that the embodiment may be generalized into any number of dimensions that is convenient to the developer of a system according to the present invention. For example, a developer may choose to design a system for developing, operating, and maintaining systems organized with a COP-based methodology, and may further choose to organize components into one or more layers of sub-components, thus rendering a fourth (or further) dimension to the multi-dimensional model of a software system.

1. A Dynamic Multi-Dimensional Visual Programming Environment 1.1. Computer System 100 Description A computer system 100 that may support a multi-dimensional (such as 3D) visual programming environment using polymorphic, dynamic multi-dimensional structures according to the present invention will now be described in detail with reference to FIGS. 1A-1B of the accompanying drawings.

Figure 1A:
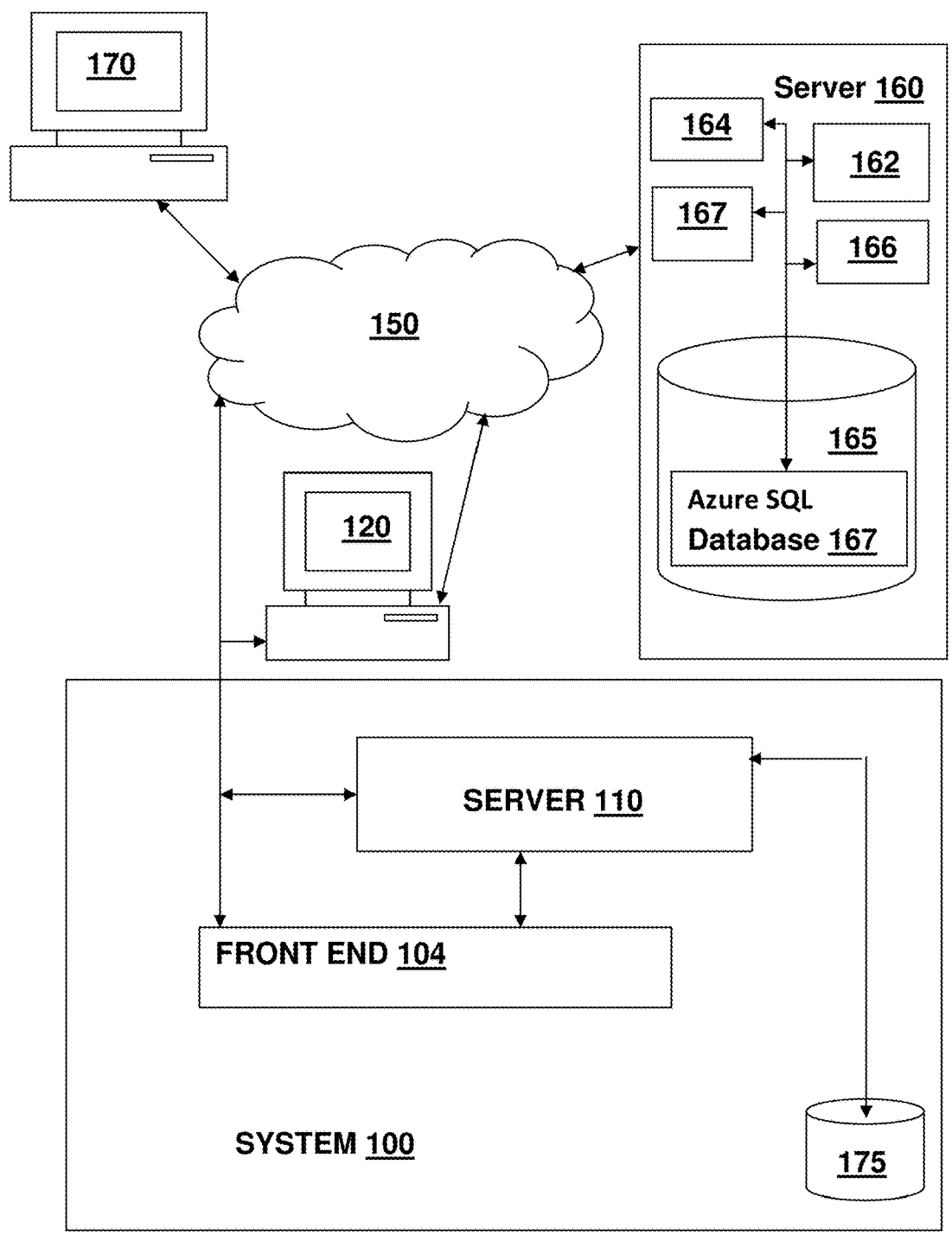

As shown in FIG. 1A, the computer system 100 has at least one processor such as a server 110 to manage the development, 3D modeling, editing, and sharing of a software system, the server 110 operating as a local host to the 3D visual programming environment and local browser plus local server as needed, the server in communication with user processors 120, 170 through a front-end 104, and a storage unit 175 electronically connected to the server 110 and in communication with server 160 for storing a copy of the 3D world. The server 160 may be a cloud platform such as any conventional cloud platform, for example, the Microsoft Azure™ platform available from Microsoft Corporation.

The components depicted in FIG. 1A may be operatively connected to one another via a network, such as the Internet 150 or an intranet, or via a conventional wired or wireless communication system with capabilities to perform the communications and exchanges described below. For example, in FIG. 1A, the server 110 and storage unit 175 are shown to be in communication with server 160 through front-end 104, but in other embodiments, they may be in communication with server 160 directly or through another system. Connections may be implemented through a direct communication link, a local area network (LAN), a wide area network (WAN) and/or other suitable connections.

The COP-based dynamic 3D visual programming environment may be implemented on a computer system with a client-server model, which is an application structure that may be distributed and that partitions tasks or workloads between computers in a network, often between servers, which provide a resource or service, and clients, which are the service or resource requesters. The dynamic 3D visual programming environment of the current embodiment is executed on the client and sends data relating to the 3D grid to the server 110 or to remote storage such as storage 175.

The server 110 may also have subprograms in a file, for example, entitled "env_init_build-boot", for collecting, retrieving and providing information and functionality related to starting the building of a user program and calling initialization.

1.2. User Interaction with the System 100

Users of the system 100 may communicate with the server 110 and access the front-end 104 using computer 120, which may be directly connected to the server 110, or computer 170, which may be connected to the server 110 via a network, such as the Internet 150 or an intranet, or via any type of wired or wireless communication system with capabilities to perform the communications and exchanges described below. The computers 120, 170 may be a remote special-purpose computer, including but not limited to a tablet, or a general purpose computer such as a desktop computer, laptop computer, or any other conventional or known computing devices.

The front-end 104 provides visible HTML5 rendering functionality and a user-friendly graphical user interface (GUI) populated with information about the software system and the 3D model of the software system. The front-end 104 may have fillable forms and screens for users to use in signing into the system 100. For example, the fillable forms and screens may include but not be limited to forms and screens for ensuring privacy and secure logins (establishing or updating passwords or other permissions), for collecting information for and developing user preferences and profiles, for providing legal notices or other alerts, for selecting the software system that a user or developer wants to access, for allowing users to direct the locations for storage of the software system, and for identifying the person(s) allowed access to the software system.

The front-end 104 may also provide for programs to access back end software such as for editing the 3D model, for analyzing the operation of the software system, and for debugging purposes. The GUI may also have the following components:

Mouse/Key Event Handling software

Menu Button Data and Logic

The front-end 104 GUI may also provide interfaces to back-end software such as the StringWorld building program 112a and the VoxelWorld program 112b (both described in greater detail below) for building the 3D model of the software system, While it is common to use CSS to display an image representative of an entity, the polymorphic, 3D structures of the present invention allow for users to distinguish among entities with distinct characteristics based on the displayed images of their 3D models, because an entity's component set, which defines the entity's characteristics, possesses a unique visual feature that causes:

Images of the 3D models of entities with identical component sets to look the same; and An image of the 3D model of an entity with one component set to be visually different from an image of the 3D model of an entity with different (non-identical) component set.

The VoxelWorld program 112b may be provided with component display filters so that a user may display 3D models of entities of a software system without certain characteristics. Using such filters, certain graphical items may be displayed as though the entities that they model are identical to each other when a selected set of components is being studied, but different when another set is being studied.

For example, assume a component having sub-components, for example, a door opener component, with one sub-component being a circular door knob and another sub-component being a door handle; and assume that the component display filter was arranged to filter components by granularity so that it was settable to a desired granularity to display 3D models as identical if the component filter is set to distinguish components at a higher level but to present the models with different visual display. If the component filter is set to distinguish components at a lower level, so that all graphical items modeling entities with any door opener component would be displayed identically when the filters are set to treat all types of door openers as equal, and graphical items modeling entities defined with different door opener types would be displayed differently, in accordance with the door handle type associated with the entities that the graphical items are modeled when the filters are set to distinguish among all types of door openers.

Also for example, assume a component display filter that may be set to ignore a selected component at the user's option, so that 3D models of entities that did not share a component may still be displayed identically when being reviewed for different purposes. In such a case, when the filters are set to ignore a component such as a door opener component of any type, the association of a door opener component with an entity may be deemed irrelevant for purposes of displaying 3D graphical items modeling such entities, at the user's option.

1.3. Software System Description

A block diagram of one embodiment of a software system for running a 3D embodiment of a dynamic multi-dimensional visual programming environment with polymorphic, dynamic 3D structures is shown in FIG. 1B and in further detail in FIGS. 2A-2G and FIG. 3.

As shown in FIG. 1B, the instructions, also referred to as commands, may be organized into a series of software applications, also called programs, for running a dynamic multi-dimensional visual programming environment with polymorphic, dynamic 3D structures. The programs may be hosted on the server 110, and may include A StringWorld building program 112a for developing and maintaining the 3D world;

A VoxelWorld program 112b for managing the grid locations of 3D graphical items, including responding to changes in grid location of 3D graphical items to move 3D graphical items on the 3D grid and enforcing conservation of grid locations through the 3D world;

A software system execution program 112c for running the software system under development, including running the code associated with a 3D graphical item in the 3D world;

A software system control program 112d for controlling the access to and history of the software system under development, providing access, saving, and undoing operations, version control, and other functions;

A camera program 112e for controlling a virtual camera to provide user-requested views of the 3D world; and An operations control program 112f for controlling the operation of the administrative functions of the dynamic 3D visual programming environment with polymorphic, dynamic 3D structures.

1.3.1. StringWorld Building Program 112a

Figure 2A:
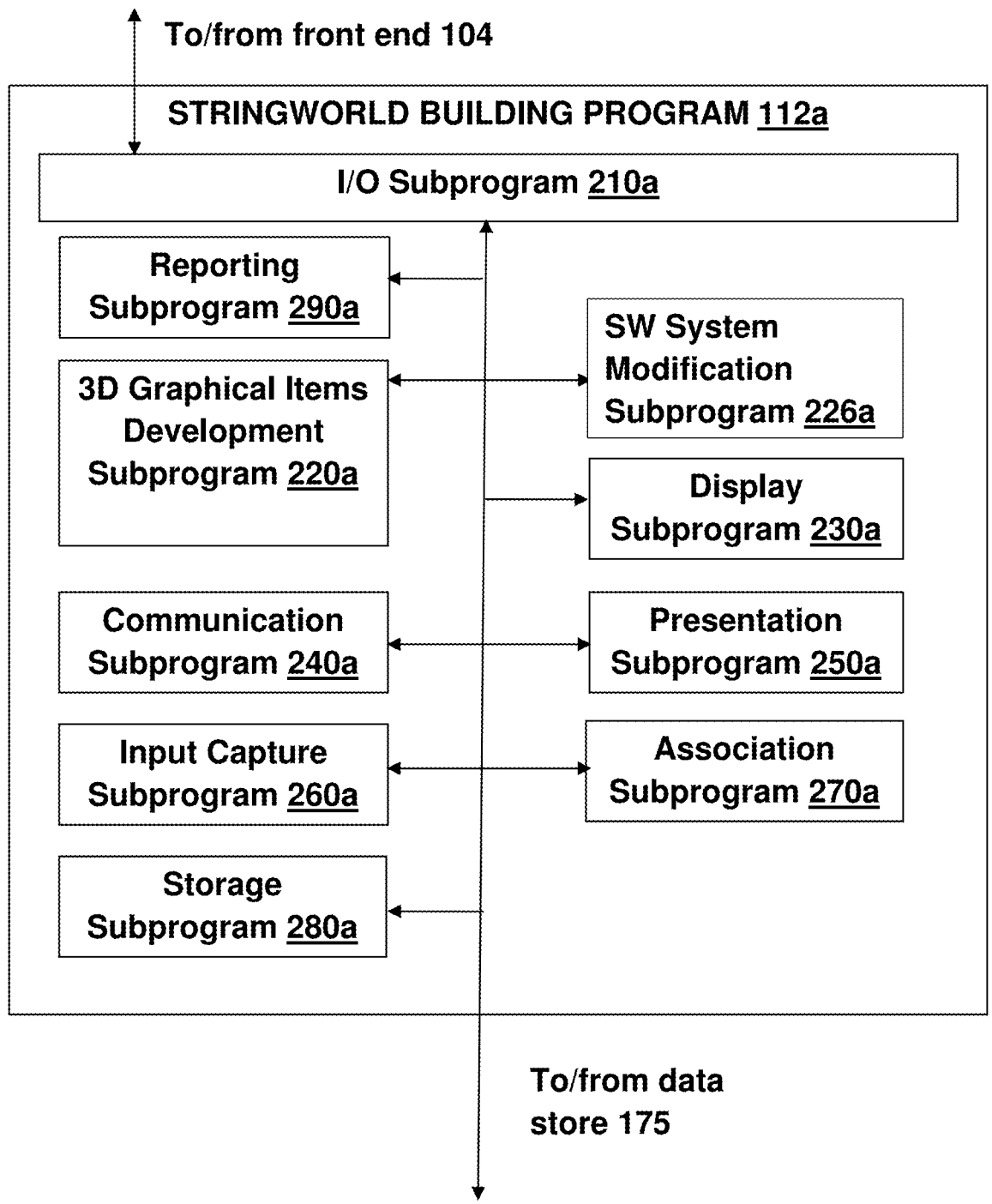
FIG. 2A is a block diagram of a StringWorld building program 112a for use in developing a software system in the 3D embodiment of the dynamic, polymorphic multi-dimensional visual programming environment shown in FIGS. 1A and 1B.

As shown in FIG. 2A, the StringWorld Building program 112a, for building a 3D model of the software system, may have an I/O subprogram 210a to process communications to and from the server 110, including information related to a requested software system. The program 112a may have a 3D graphical items development subprogram 220a, for adding, deleting and modifying the 3D graphical items to model the software system, with the modification including movement of 3D graphical items on the grid, and visual changes in the 3D graphical items to model changes in the software system under development, and with the modification also including echoing voxel data changes and loading/clearing for new level.

Voxel data changes are echoed by building a graphical interaction element, e.g. a radio button or slider bar, attaching it to the voxel, running it through the front-end construction and management subprogram 223f, which may respond to changes in the associated StringWorld element or can be "read" back to change the StringWorld element from the new VoxelWorld user interface element. Clearing the space for a new level may be accomplished by deleting the current VoxelWorld element and associated StringWorld. Loading a new level may be accomplished by performing a Clear, reading in the new StringWorld element, and building a VoxelWorld element from the new StringWorld element.

The program 112a may also have a software system modification subprogram 226a for modifying the software system in view of changes to the 3D graphical items, and a display subprogram 230a for facilitating the 2D display of the 3D model of the software system.

The StringWorld building program 112a may also have subprograms for providing other features and functionality of StringWorld building, such as a communication subprogram 240a for issuing and processing instructions from the user computers 120, 170 and for outputting the information related to movement of 3D graphical items on the grid to the VoxelWorld program 112b, described below, for assignment of grid locations for the newly added and moved graphical items.

The StringWorld building program 112a may also have a presentation subprogram 250a for presenting the 2D display of the 3D model to the user at computers 120, 170, an input capture subprogram 260a for capturing input from the user so that a user may provide instructions as to the model development, an association subprogram 270a for associating the input with the software system, and a storage subprogram 280a for storing information related to the software system, its 3D model, and its modifications. The StringWorld Building program 112a may also have a reporting subprogram 290a for providing reports of actions related to building and changing the software system and its model.

1.3.2. VoxelWorld Program 112b

Figure 2B:
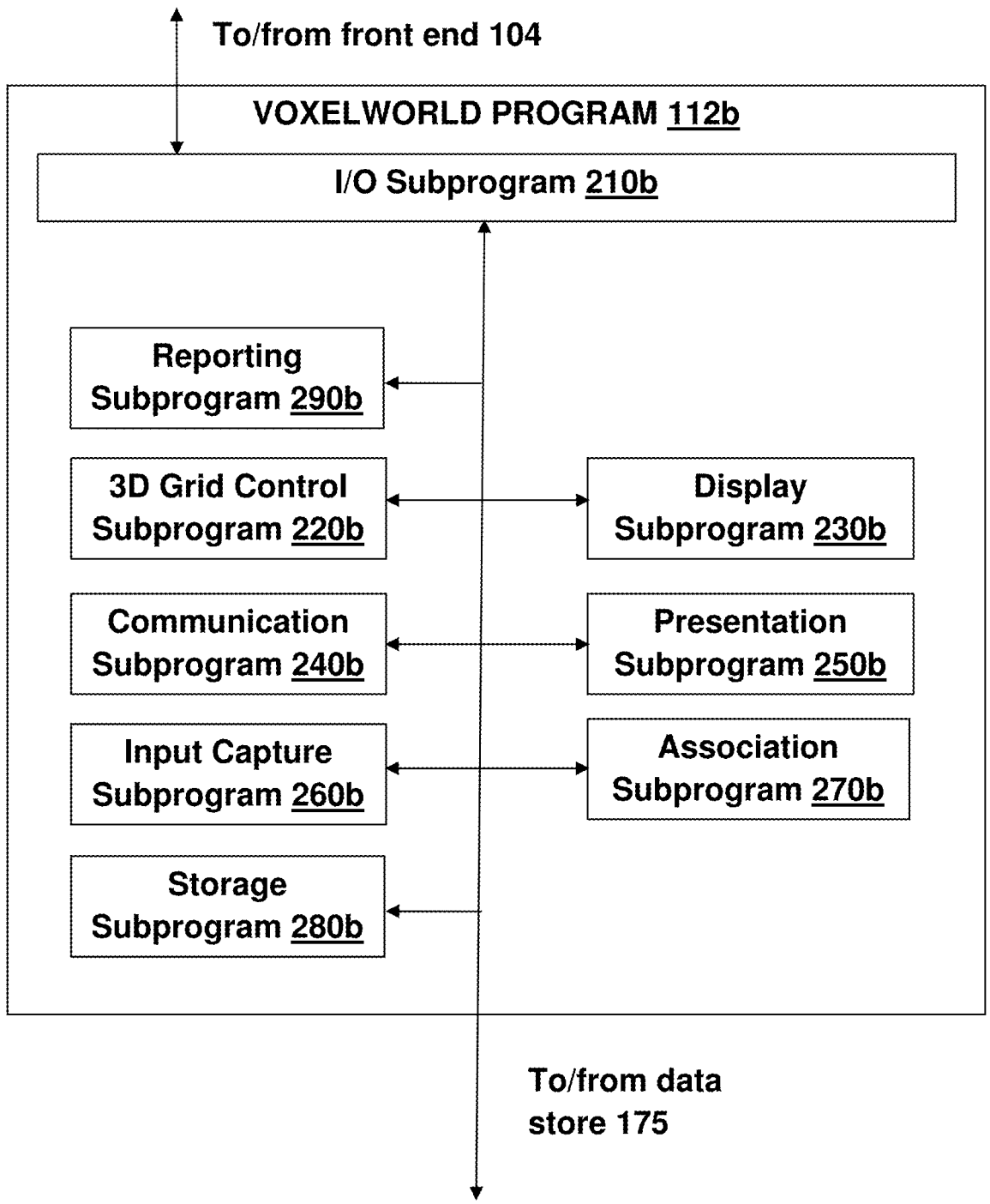
FIG. 2B is a block diagram of a VoxelWorld program 112b for use in developing a multi-dimensional model of the software system under development.

As shown in FIG. 2B, the VoxelWorld program 112b, for enforcing conservation of grid locations through the 3D world, may have an I/O subprogram 210b to process communications to and from the server 110 related to changes in the 3D model. The program 112b may have a 3D grid control subprogram 220b for managing the grid addresses of 3D graphical items. Such management may include keeping track of the size of a voxel (the 3D footprint of the graphical item), keeping track of the location of voxel footprints that are available on the 3D grid, keeping track of the grid addresses on the 3D grid of each graphical item in the 3D grid, and keeping track of any changes in the 3D grid communicated to the VoxelWorld program 112b from the StringWorld Building program 112a. The 3D grid changes may include deletion of a graphical item from the 3D grid (thus freeing up a voxel footprint-sized location), placement of a new graphical item into an available voxel footprint-sized location on the 3D grid, movement of a graphical item from one location to an available voxel footprint-sized location on the 3D grid, and movement of other 3D graphical items which movements were made necessary by the recent addition or movement of 3D graphical items.

The VoxelWorld program 112b may also have subprograms for providing other features and functionality of management of the 3D grid, such as a communication subprogram 240b for processing input from the StringWorld Building program 112b related to addition, deletion and movement of graphical items on the 3D grid, a presentation subprogram 250b for issuing output related to grid addresses of 3D graphical items on the 3D grid (including communication of new grid addresses for newly added and moved grid items), an input capture subprogram 260b for capturing input from the StringWorld Building program 112b related to addition, deletion and movement of graphical items on the 3D grid, an association subprogram 270c for associating the input from the StringWorld Building program 112b related to addition, deletion and movement of graphical items with the available and non-available locations on the 3D grid, and a storage subprogram 280b for storing information related to voxel size and the location of 3D graphical items on the grid software system. The VoxelWorld program 112b may also have a reporting subprogram 290b for providing reports of graphical items and their associated grid addresses.

The VoxelWorld program 112b may also have subprograms in the following files:
  "env_cubes," for collecting, retrieving and providing information and functionality related to Setup, cube types, library, and polymorphic functions via the cubeFunc lookup table; and
  "env_init_io-voxels," for collecting, retrieving and providing information and functionality related to retire—Master cube/voxel builder and voxel mover.

1.3.3. Software System Execution Program 112c

Figure 2C:
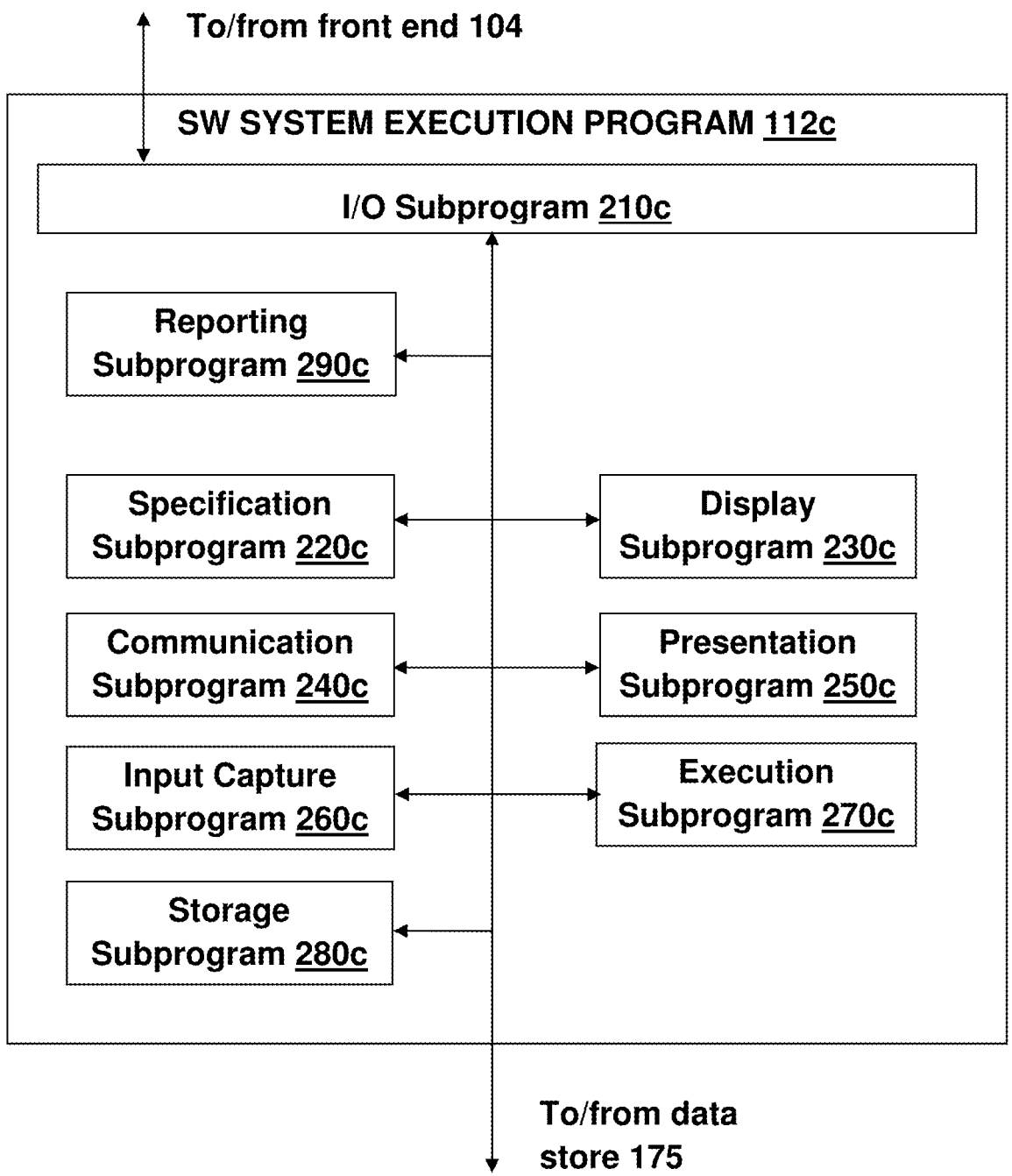
FIG. 2C is a block diagram of a software system execution program 112c for use in executing the software system under development.

As shown in FIG. 2C, the software system execution program 112c for running a software system under development, including running the code associated with a 3D graphical item in the 3D world, may have an I/O subprogram 210c to process communications to and from the server 110. The program 112c may have a specification subprogram 220c for specifying the form and scope of execution of a software system under development (such as the 3D graphical item(s) code associated with the 3D graphical item(s) to be executed), variable values, and debugging parameters. The program 112c may also have an execution subprogram 270c for running the software system under development in accordance with the parameters and values identified through operation of the specification subprogram 220c. The software system execution program 112c may also have a display subprogram 230c for facilitating a display of the execution of the software system.

The software system execution program 112c may also have subprograms for providing other features and functionality, such as a communication subprogram 240c for issuing and processing instructions from the user computers 120, 170 as to execution parameters and values, a presentation subprogram 250c for presenting execution parameters option pages to a user at computers 120, 170, and an input capture subprogram 260c for capturing input from the user so that a user may establish execution parameters and values. The execution parameters may be derived from several options related to, for example, debugging or variable values presented by a user on an execution option page, or, as noted below, they may be as simple as an instruction to execute code derived from clicking a Code cube (a 3D graphical item with which code is associated) on a 2D display.

The software system execution program 112c may also have a storage subprogram 280c for storing information related to the execution(s), such as time, date, code executed, variable values, and results. The software system execution program 112 may also have a reporting subprogram 290c for providing access reports showing a record of execution of software systems.

The software system execution program 112c may also have subprograms in a file, for example, entitled "env_init_loopUpdate," for collecting, retrieving and providing information and functionality related to defining the high frame rate EVENT LOOP, i.e. 30-60 frames per second (FPS).

1.3.4. Software System Control Program 112d

Figure 2D:
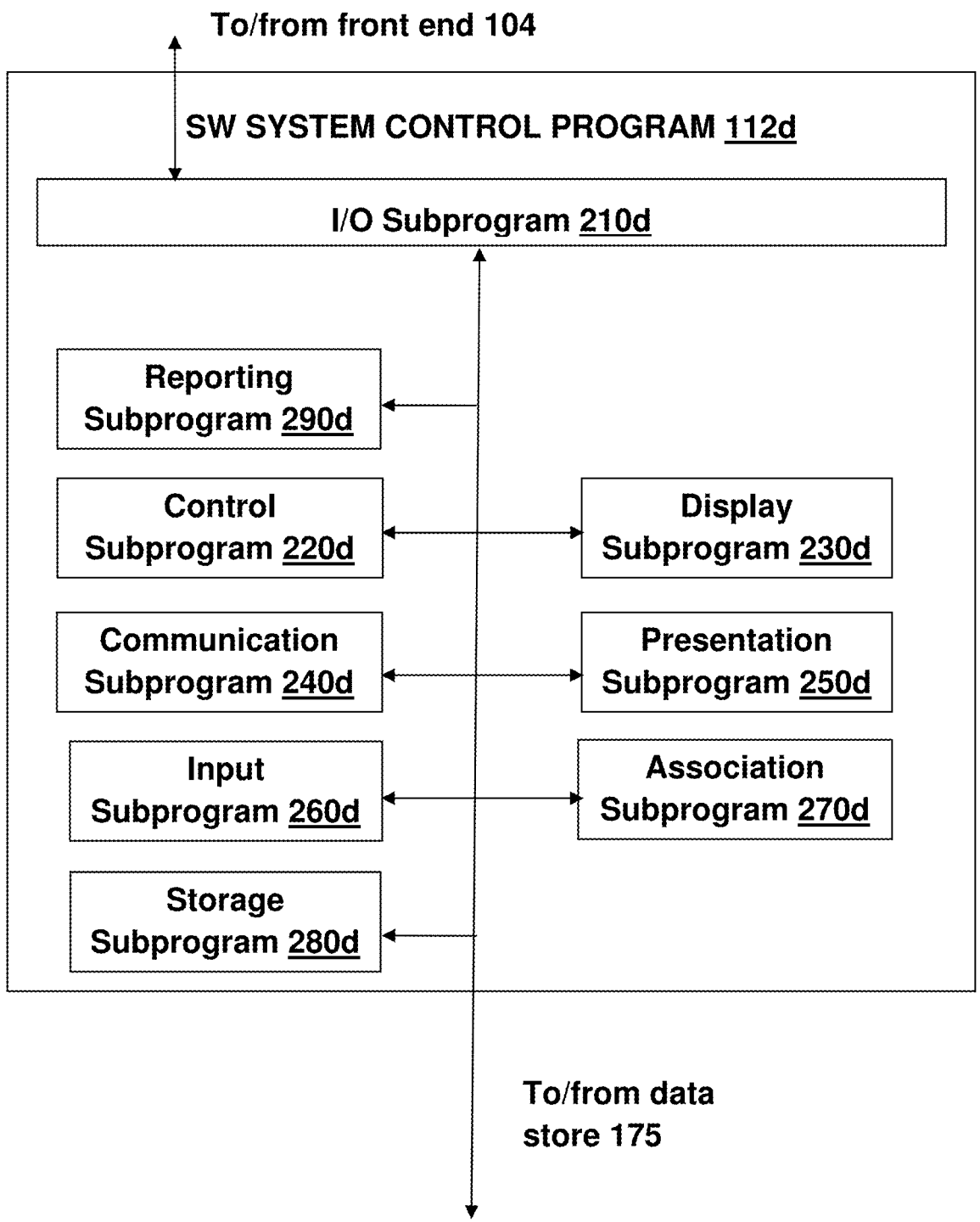
FIG. 2D is a block diagram of a software system control program 112d for use in controlling operation of the software system under development.

As shown in FIG. 2D, the software system control program 112d, for controlling the access to and history of the software system under development, providing access, saving, and undoing operations, version control, and other functions, may have an I/O subprogram 210d to process communications to and from the server 110. The program 112d may have a control subprogram 220d for controlling the access to and history of the software system under development, providing access, saving, and undoing operations, version control, and other functions, and a display subprogram 230d for facilitating the display of such information related to the software system under development.

The software system control program 112d may also have subprograms for providing other features and functionality, such as a communication subprogram 240d for receiving and processing instructions from the server 110 relating to the software system 120, 170, a presentation subprogram 250d for presenting the control information to the user at computers 120, 170, and an input capture subprogram 260d for capturing input, such as edits to the control information from the user.

The software system control program 112d may also have an association subprogram 270d for associating the control edits input from the user, and a storage subprogram 280d for storing the control information. The software system control program 112d may also have a reporting subprogram 290d for providing reports showing the control information.

The software system control program 112d may also have subprograms in the file entitled "env_functions", for collecting, retrieving and providing information and functionality related to helper functions for moving and/or editing cubes in groups.

1.3.5. Camera Program 112e

As shown in FIG. 2E, the camera program 112e, for controlling a virtual camera to provide user-requested views of the world, may have an I/O subprogram 210e to process communications to and from the server 110. In certain (not necessarily preferred) embodiments, the camera program 112e may be a conventional 3D camera. The program 112e may have a virtual camera subprogram 220e for providing a user with a movable line of sight into the grid. The virtual camera subprogram 220e may contain software instructions for an editor to provide a virtual camera, such as a fixed-position 3D camera with (X,Y,Z)-locked orbit controls. In one embodiment, the virtual camera subprogram 220e may contain software instructions to provide a web-based editor such as the Tridiv™ web-based editor, which is available from Julian Garnier of Paris, France, for creating 3D shapes in CSS. The Tridiv web-based editor provides a user with a movable line of sight into the grid, the line of sight having six degrees of freedom (X,Y,Z location and X,Y,Z axis rotation) to allow the user to relocate the camera freely and explore the 3D world with six continuous degrees of freedom. The camera program 112e may have a display subprogram 230e for facilitating the display of the line of sight of the 3D grid from the perspective of the user's virtual camera.

The camera program 112e may also have subprograms for providing other features and functionality of the virtual camera, such as a communication subprogram 240e for issuing and processing instructions from the user computers 120, 170 as to control of the camera, a presentation subprogram 250e for presenting camera controls to the user to allow for user positioning of the camera, and an input capture subprogram 260e for capturing instruction input from the user.

The camera program 112e may also have an association subprogram 270e for associating the input with a profile to form a profile for the user, and a storage subprogram 280e for storing information related to the user's camera control. The camera program 112e may also have a reporting subprogram 290e for providing reports showing user control of the virtual camera.

Pseudocode for instructions that provide the functionality of a virtual camera to display user-requested views of the 3D may include the following:

| Instruction | Function |
| --- | --- |
| changeOffset | Offset vector for rotating or translating camera from footing |
| changeXYZ | Location of temporary camera X, Y, Z |
| contactFlag | True if user footing has activated a cube |
| cubeIntXYZ | Integer footing X,Y,Z in CSS units (150 px ^3) |
| degRotate | Optional display of camera rotation in degrees |
| faceVec | Facing unit vector for user camera footing |
| offset | General offset for all camera operations, computed at runtime |
| pxXYZ | Pixel unit adjustments for complete world transformation |
| radRotate | Radian amounts for camera rotation |
| trueXYZ | Cube Units (150 px ^3) for camera footing in X,Y,Z components |
| xForm | Transform data for continuous footing transforms |
| xyOmegaHide | Data for hiding or showing pieces of larger "omega" cube |

The program 112e may also have subprograms in a file, for example, entitled "env_init_cam," for collecting, retrieving and providing information and functionality related to Semantic (e.g. "up") camera controls for viewing the Voxel-World.

1.3.6. Operations Control Program 112f

Figure 2F:
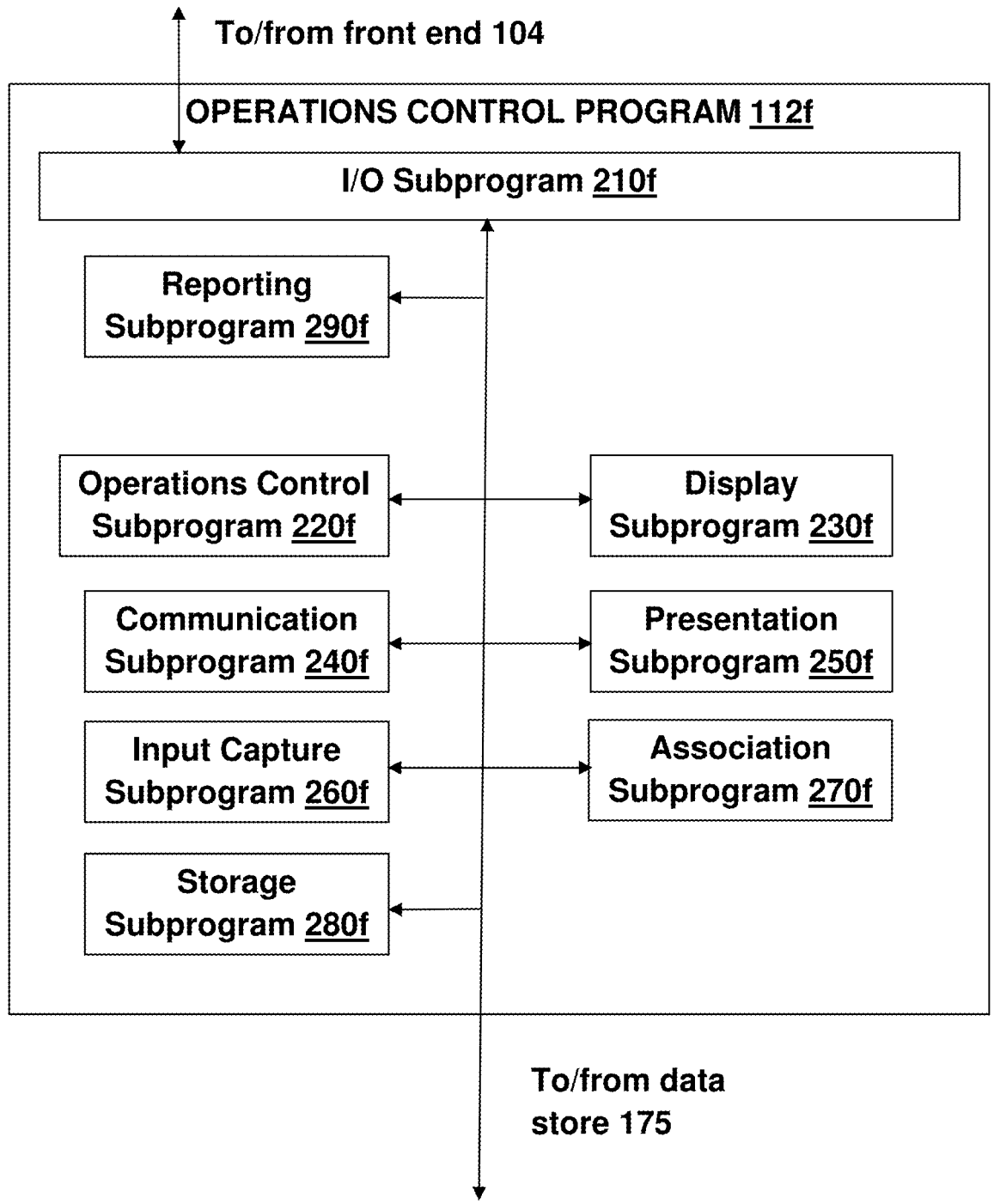
FIG. 2F is a block diagram of an operations control program 112f for use in controlling operation of the dynamic, polymorphic multi-dimensional visual programming environment described herein.
Figure 2G:
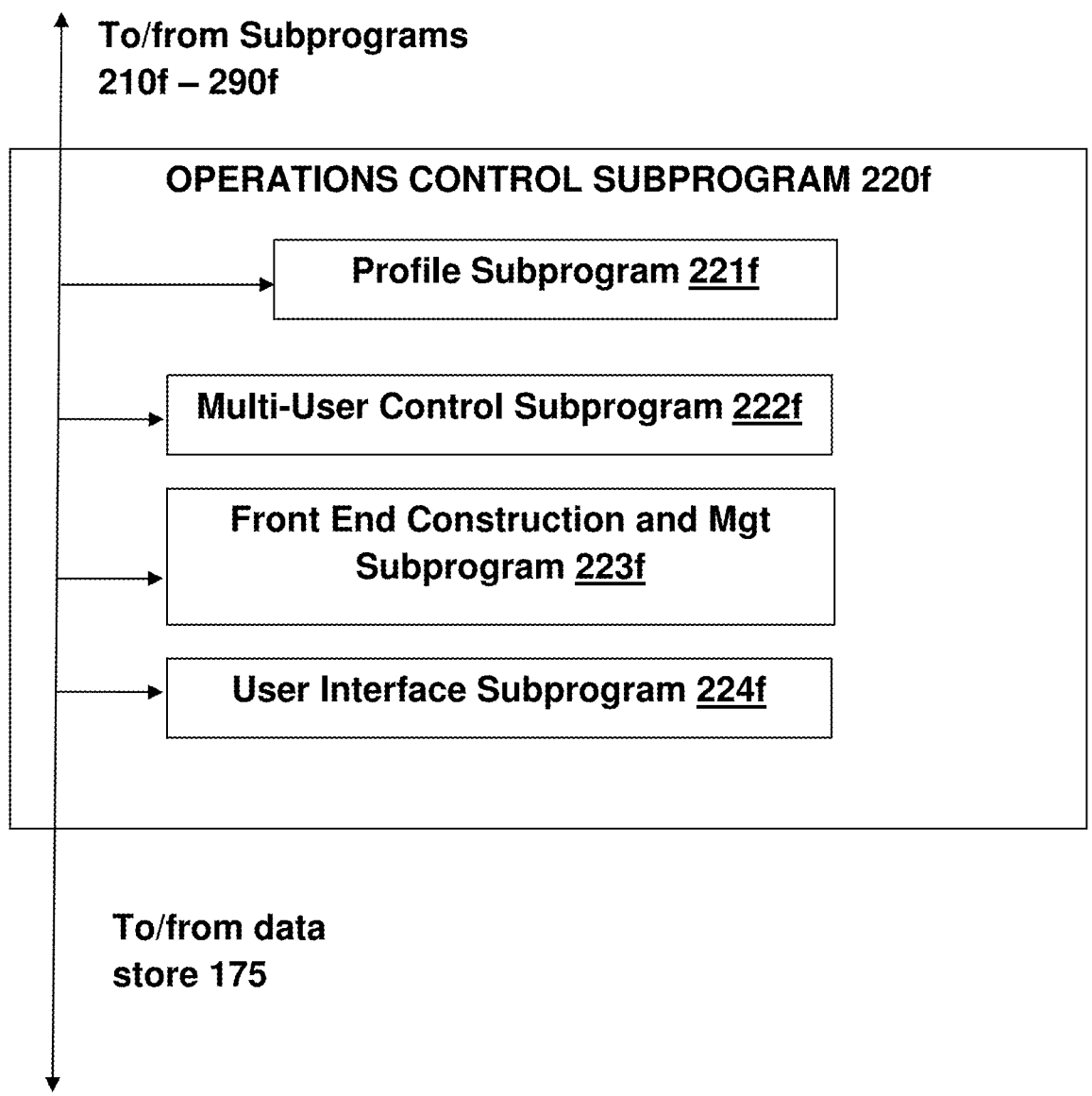
FIG. 2G is a block diagram of an operations control subprogram 220f for the operations control program 112f.

As shown in FIG. 2F, the operations control program 112f for controlling the operation of the administrative functions of the dynamic visual programming environment with polymorphic, dynamic structures may have an I/O subprogram 210f to process communications to and from the server 110. The program 112f may have an operations control subprogram 220f for managing aspects of the operation of the dynamic multi-dimensional visual programming environment with polymorphic, dynamic multi-dimensional structures described herein. The program 112f may also have a display subprogram 230f for facilitating a display of the operation management as needed.

The operations control program 112f may also have subprograms for providing other features, functionality, and pages of operation management, such as a communication subprogram 240f for issuing and processing instructions from the user computers 120, 170, a presentation subprogram 250f for presenting the operation management display to the user at computer 120 or computer 170, and an input capture subprogram 260f for capturing input from the user so that a user may provide instructions about operation management.

The operations control program 112f may also have an association subprogram 270f for associating user input with the subprograms of the user management subprogram 220f, and a storage subprogram 280f for storing information related to the operation management. The operations control program 112f may also have a reporting subprogram 290f for providing reports showing actions related to operation management.

The operations control program 112f may also have subprograms in the file, for example, entitled "env_init_JSONconfig," for collecting, retrieving and providing information and functionality related to JSON file defining program parameters.

As shown in FIG. 2H, the operations control subprogram 220f may also have subprograms for providing the features, functionality, and pages of operation management, among them the following subprograms:

A profile subprogram 221f for managing user access to software systems and the dynamic multi-dimensional visual programming environment with polymorphic, dynamic multi-dimensional structures;

A multi-user control subprogram 222f for controlling access to the computer system under development by multiple users;

A front-end construction and management subprogram 223f for constructing the screens and forms for accessing the software system and its 3D world; and A user interface subprogram 224f for managing the users' interactions with the 3D world, including but not limited to mousing and key event handling.

The profile subprogram 221f may have code for establishing user password(s) and developing or updating user profiles, developing at least one profile page that may be customized to the user, processing communications to and from the server and the user related to access requests and authorizations for a user to be associated with a software system and its 3D model, capturing input from the user and software system managers to identify permissions for access to software systems and their 3D models, and storing information related to the authorizations and the permissions the user may have for the software systems (development of a user profile expedites future access to the software system under development, including the 3D model of the software system).

The multi-user control subprogram 222f may have code for identifying the software system being shared and changes made to it, identifying and tracking the location of the multiple users, facilitating the display of the software system by multiple users, providing a display of an avatar for each of the multiple users, issuing and processing instructions from the user computers, presenting the display of the 3D world and the front-end software development screens, and capturing input from the user so that a user may set up a multi-user share of a 3D world and share programming with others. The protocol for multi-user control subprogram 222f may be a conventional computer communications protocol such as the WebSocket protocol, which is supported by many conventional browsers, including Google Chrome™, which is available from Google LLC of Mountain View, Calif.; Microsoft Edge™ and Internet Explorer™, both of which are available from Microsoft Corporation; Firefox™, which is supported by the Mozilla Foundation and the Mozilla Corporation; Safari™, which is available from Apple Inc. of Cupertino, Calif.; and Opera™, which is available from Opera Software AS of Oslo, Norway. Socket.io, described in more detail in connection with the multi-user environment example disclosed below, (or any number of similar implementations) is a middleware library that may be used to ID and track multiple users with different separated chat rooms and "broadcast" or "receive" patterns (i.e. a user change in a live multiplayer space may be broadcast on a particular port, so a string may reach the listeners and their client may make the change with low latency.

The multi-user control subprogram 222f may also have code in the following files:
"env_init_loadWorld," for collecting, retrieving and providing information and functionality related to load functions which are called for any new world; and
"env_ava," for collecting and retrieving multi-avatar information and multiplayer web-socket send/receive functions.

The front-end construction and management subprogram 223f may also have subprograms in the following files:
"env_init_io-data," for collecting, retrieving and providing information and functionality related to Move data between PROGRAM, CLIENT SYSTEM, CLOUD;
"env_init_io-sql," for collecting, retrieving and providing information and functionality related to Send, receive, and manage Azure SQL world storage; and
"env_init_ui-interface," for collecting, retrieving and providing information and functionality related to defining 2D graphical buttons, menus, and windows.

The user interface subprogram 224f may also have subprograms in the following files:
"env_init_ui-keys," for collecting, retrieving and providing information and functionality related to defining user keyboard interactivity patterns, e.g. arrows; and
"env_init_ui-mouse," for collecting, retrieving and providing information and functionality related to defining user mouse event patterns, e.g. click face, mouse look.

The front-end construction and management subprogram 112g may have code for constructing the screens and forms for accessing the software system and its grid space, facilitating the display of the screens and form, processing communications to and from the server 110, capturing input from the user, associating the input at the front-end with its intended program hosted by the server, issuing and processing instructions from the user computers, storing information related to the front-end input, and providing reports showing information related to the front-end inputs.

The user interface subprogram 224f for managing the users' interactions with the grid space may have code for facilitating transfer information related to display of screens from the server 110 to the front-end 104, and for facilitating transfer user input from the front-end 104 to the server 110.

The browser-based development environment that the user interface subprogram 224f provides (or, in alternative embodiments, the front-end 104 may provide) may be an entirely separate development environment with preview tabs (such as the development environment that is available from Glitch, Inc. of New York, N.Y.). Alternatively, the browser-based development environment may have a set of 2D rectangular panes in one tab that can be adjusted to divide screen space into preview and development windows (such as the preview environment system that is available from the JSFiddle online community serviced by JSFiddle, LTD of London, GB). Such browser-based development environments force a choice between dividing one large active space in a strictly rectangular way with sliders and toggles, or accepting several disconnected spaces that are switched between.

Alternatively, the interface subprogram 220i may provide a browser-based development environment that provides GUI elements with grid positions in order to allow positioning of data, or different areas, in one view (the example of educational use, disclosed below, demonstrates that capability).

Providing GUI elements with grid positions grants the user the option to use many different size and angle transitions to bring preview and development windows in and out of view. For example, the dynamic 3D visual programming environment of the current invention provides "display cubes" that track a user's footing and rotate a billboard to face the user, and scales the display for optimum viewability on demand. Also, the dynamic 3D visual programming environment automatically brings up a code editor to add, delete, and modify code cubes and their functionality. In addition, manual positioning of display cubes is available, and may be made automatic, at the system developer's option.

3D context also lets users keep various items active and quickly available without having to toggle a "minimize" button or switch between browser tabs (e.g. look left to see one set of data, look right to see a different set, without having to leave the main tab).

1.4. Databases

The instructions and data that define a 3D world and the programs 112a-112i may have computer implementable instructions encoded in a non-transitory computer-readable medium and data associated with the programs for execution by a processor such as the server 110. The storage unit 175, electronically connected to the server 110, may include memory and non-transitory computer-readable media encoding instructions such as those in programs 112a-112i for execution by the processor and data for use by the processor for computer-based management of a software system and for operating a front-end 104, providing a user-friendly interface. The instructions and data that define a 3D world and for the programs 112a may be stored in storage 175 in a master database 310 that is organized in a system of databases. The master database 310 may store information related to the instructions and data related to core functions of the software system, its 3D model, and development of both.

As shown in FIG. 3, the master database 310 may contain structure for storing and transmitting the set of entries for providing the functionality of the dynamic 3D visual programming environment with polymorphic, dynamic 3D structures. Specifically, the characteristics, attributes, and code for the environment's functionality and operations may be organized into the following databases.

A profile database 312 may contain structure for storing and transmitting the set of entries for defining profile, permissioning, and password information related to a user and providing the functionality for creating profiles and authorizing usage of the system 100, such as information accessed, processed, and controlled by the profile subprogram 221*f* of the user management program 112*f*. An exemplary entry in the database 312 may be represented by the following pseudocode:

profile: {email: "user@domain.abc", email_verified: true, name: "Dan X", given_name: "Dan", family_name: "X", . . . }.

An active database 342 may contain structure for storing and transmitting the set of entries defining the software system currently in use, including the data and instructions related to the JSON and system objects of the software system. An exemplary entry in the database 342 may be represented by the following pseudocode:

active: {"speaking": false, "runScene": true, "threeNeedsUpdate": true, : "mouseTrack": false, "runFuncArray": Array(0), . . . }.

A StringWorld database 316 (also known as the "Env.active.StringWorld" database 316) may contain structure for storing and transmitting the set of entries for building or storing a software system and its 3D model, including the data and code associated with the software system's entities and components and the 3D elements of the software system's 3D model. The database 316 may be an array of rows, columns, and depths for containing the text information and JSON metadata for the software system and its 3D model.

A VoxelWorld database 318 (also known as the "Env.active.VoxelWorld" database 316) may contain structure for storing and transmitting the graphical object pointers linked to StringWorld, e.g. Document Object Model elements. The database 318 may be an array of rows, columns, and depths for containing the graphical object pointers.

A camera database 322 may contain structure for storing and transmitting the set of entries for providing the operation and functionality of the camera, including creating views of the 3D world. As shown in FIG. 3 the database 322 may contain the information related to the camera's characteristics, attributes, and code, including X,Y,Z user coordinates, real-time camera data, and instructions for operation and functionality of the camera. Exemplary entries in the database 342 may represented by the following pseudocode:

cam: {offset: { . . . }, changeXYZ: { . . . }, trueXYZ: { . . . }, pxXYZ: { . . . }, cubeIntXYZ: { . . . }, . . . };
changeOffset: {boolean { . . . }, boolean { . . . }};
changeXYZ: {x: 0, y: 0, z: 0};
contactFlag: false;
cubeIntXYZ: {x: 16, y: 39, z: 3};
degRotate: {x: 0, z: 0};
faceVec: {x: −0.014543897651584068, y: 0.9998942319271075, z: 0};
offset: {boolean { . . . }, boolean { . . . }, sum: { . . . }};
pxXYZ: {x: −2459.000000000037, y: −5881.000000000004, z: −487.5};
radRotate: {x: 1.3264502315156894, z: 6.268640896746299};
trueXYZ: {x: 16.39333333333358, y: 39.20666666666669, z: 3.25};
xForm: {endXYZ: { . . . }, stepsRemaining: 0, endRotateX: 90, endRotateZ: 90, spinRight: true, . . . }; and
xyOmegaHide: true.

A "save" database 324 may contain structure for storing and transmitting the set of entries for preparing the data defining the 3D grid for longer-term saving, including shareable, compressed text string versions (of the strings stored in the StringWorld database 316, for example, data, instructions, and other information not currently in use. An exemplary entry in database 324 may be represented by the following pseudocode:

save: {active: { . . . }, undo: Array(10), autoMax: 10, autoRate: 120000, autoClock: 0, . . . }.

The following databases as shown in FIG. 3 together may contain the structure for storing and transmitting the set of entries for defining components for association with entities of the software system, in order to impart selected characteristics to entities such as functionality and appearance to the entity's 3D models (cubes).

A CubeFunc (also known as "cubeType") database 330 may contain structure for storing and transmitting newly created and pre-loaded entries of cube types for providing functionality to cubes. The cubes may be "refreshed" or reloaded at each new session to avoid another user substituting a different function. Exemplary cube type entries in the database 330 may be represented by the following pseudocode:

| Cube Type | Description: |
| --- | --- |
| Boot | Function: When system has loaded, Boot automatically runs or clicks a nearby cube.<br>Exemplary Entry: boot: f bootFunc(thisXYZ, thisDiv, event, ignoreInput) |
| Button | Function: Upon click of cube by user or user process, click another cube at position (X,Y,Z).<br>Exemplary Entry: button: f buttonFunc(thisXYZ, thisDiv, event, ignoreInput) |
| Camera | Function:<br>Record camera position with X,Y,Z position and X,Z axis rotation.<br>Upon click or activation of cube, transition camera to recorded position over time 't'.<br>Exemplary Entry: camera: f cameraFunc(thisXYZ, thisDiv, event, ignoreInput) |
| Clicker | Function: Upon click by user or user process, click cubes N, S, E, W, Up, or Down of clicked cube.<br>Exemplary Entry: clicker: f clickerFunc(thisXYZ, thisDiv, event, ignoreInput). |
| Code | Function: Upon click by user or user process, edit or execute a saved string of code.<br>Exemplary Entry: code:f codeFunc(thisXYZ, thisDiv, event, ignoreInput) |
| Display | Function: Create or load an HTML iFrame pointing to an image or webpage<br>Exemplary Entry: .display: f displayBlockFunc(thisXYZ, thisDiv, event, ignoreInput) |
| Notepad | Function: Edit or display a string of plain text, with linebreaks.<br>Exemplary Entry: notepad: f notepadFunc(thisXYZ thisDiv, event, ignoreInput) |

Other exemplary cube type entries in the database 330 may include the following logic and math commands represented by the following pseudocode:

and: f logicBlockFunc(thisXYZ, thisDiv, event, ignoreInput);
ceiling: f colorBlockFunc(thisXYZ, thisDiv, event, ignoreInput);
clock: f clockFunc(thisXYZ, thisDiv, event, ignoreInput);

color: f colorBlockFunc(thisXYZ, thisDiv, event, ignoreInput);
divide: f logicBlockFunc(thisXYZ, thisDiv, event, ignoreInput);
eightball: f eightballBlockFunc(thisXYZ, thisDiv, event, ignoreInput);
flipsign: f logicBlockFunc(thisXYZ, thisDiv, event, ignoreInput);
floor: f colorBlockFunc(thisXYZ, thisDiv, event, ignoreInput);
geo: f geoFunc(thisXYZ, thisDiv, event, ignoreInput);
gift: f giftFunc(thisXYZ, thisDiv, event, ignoreInput);
headline: f headlineBlockFunc(thisXYZ, thisDiv, event, ignoreInput);
if: f logicBlockFunc(thisXYZ, thisDiv, event, ignoreInput);
inv: f logicBlockFunc(thisXYZ, thisDiv, event, ignoreInput);
layer: f spriteFunc(thisXYZ, thisDiv, event, ignoreInput);
led: f ledFunc(thisXYZ, thisDiv, event, ignoreInput);
minus: f logicBlockFunc(thisXYZ, thisDiv, event, ignoreInput);
model: f (thisXYZ, thisDiv, event, ignoreInput);
multiply: f logicBlockFunc(thisXYZ, thisDiv, event, ignoreInput);
nor: f logicBlockFunc(thisXYZ, thisDiv, event, ignoreInput);
not: f logicBlockFunc(thisXYZ, thisDiv, event, ignoreInput);
or: f logicBlockFunc(thisXYZ, thisDiv, event, ignoreInput);
plus: f logicBlockFunc(thisXYZ, thisDiv, event, ignoreInput);
rug: f rugBlockFunc(thisXYZ, thisDiv, event, ignoreInput);
polygen: f polygenFunc(thisXYZ, thisDiv, event, ignoreInput);
printer: f printerBlockFunc(thisXYZ, thisDiv, event, ignoreInput);
ramp: f colorBlockFunc(thisXYZ, thisDiv, event, ignoreInput);
speak: f speakFunc(thisXYZ, thisDiv, event, ignoreInput);
spinner: f spinnerBlockFunc(thisXYZ, thisDiv, event, ignoreInput);
sprite: f spriteFunc(thisXYZ, thisDiv, event, ignoreInput);
stair: f colorBlockFunc(thisXYZ, thisDiv, event, ignoreInput);
switch: f switchFunc(thisXYZ, thisDiv, event);
texture: f textureFunc(thisXYZ, thisDiv, event, ignoreInput);
turtle: f turtleBlockFunc(thisXYZ, thisDiv, event, ignoreInput);
wall: f colorBlockFunc(thisXYZ, thisDiv, event, ignoreInput);
warp: f warpFunc(thisXYZ, thisDiv, event, ignoreInput);
web: f webBlockFunc(thisXYZ, thisDiv, event, ignoreInput);
worldCube: f (thisXYZ, thisDiv, event, ignoreInput); and A document.styleSheets[ ] database 340 may contain structure for storing and transmitting the set of entries for defining the CSS Style Sheets explicitly linked into or embedded in the 3D software system model. The document.styleSheets may contain visual styles in CSS sorted by cubeType.

A functions database, not shown, may contain structure for storing and transmitting the set of entries. An exemplary entry in the functions database may be represented by the following pseudocode:
{initAva: f, socketInit: f, setDbTarget: f, writeStream: f, reqStream: f, . . . }.

An input database, not shown, may contain structure for storing and transmitting the set of entries. An exemplary entry in the database 360 may be represented by the following pseudocode:
input: {pressShift: false, pressZ: undefined, pressSpace: false, pressAlt: false, pressX: false, . . . }.

A switches database 370, may contain structure for storing and transmitting the set of entries related to system settings. An exemplary entry in the database 370 may be represented by the following pseudocode:
switches: {playSFX: true, multiSend: false, multiListen: false, multiTrust: "author", maxUndo: 10, . . . }.

Other databases that relate to the functions of the software system, its 3D model, and development of both, may be represented by the following pseudocode:

| Database | Exemplary Entry: |
| --- | --- |
| aceEditor | aceEditor: Editor {container: pre#aceEditor.ace_editor.ace-tm, renderer: VirtualRenderer, commands: CommandManager, textInput: TextInput, keyBinding: KeyBinding, ...}<br>Note: The Ace standalone code editor is maintained by the Mozilla community. |
| Ava | ava: {cB_1: {...}} |
| avaTimer: 0 | avaTimer: 0 |
| data | data: {fpsAvg: 60, blankNode: " ", worldSize: {...}, worldSizePx: {...}, worldPanel: Array(0)} |
| gblockBuffer | gblockBuffer: "" |
| lists | lists: {blockVariables: Array(18), blockFunctions: Array(13), namedColors: {...}} |
| mods | mods: {threeJS: {...}, {...}} |
| multiAva | multiAva: { } |
| player | player: {handle: "defianttrack", avaId: "default", headDiv: null, bodyDiv: null, xyz: Array(3), ...} |
| socket | Socket: {io: Manager, nsp: "/", json: Socket, ids: 0, acks: {...}, ...} |
| words | words: {adjArray: Array(313), verbnounArray: Array(438)} |
| world | world: {def: {...}} |

A copy of the instructions and data that define a 3D world may be also stored in storage 165 of the server 160 in a User DB: Azure SQL Save/Info) database 162, which may have entries similar to those disclosed above.

1.5. System Screens Descriptions

The GUI for one embodiment of the system for the development, testing, and maintenance of a software system and its multi-dimensional model using multi-dimensional visual programming with polymorphic, dynamic multi-dimensional structures may employ the following screens and forms.

1.5.1. Default Developer Screen

The GUI for a dynamic, polymorphic multi-dimensional visual programming environment as disclosed herein may present tools and User Interface panels for access to system functionality.

Figure 4:
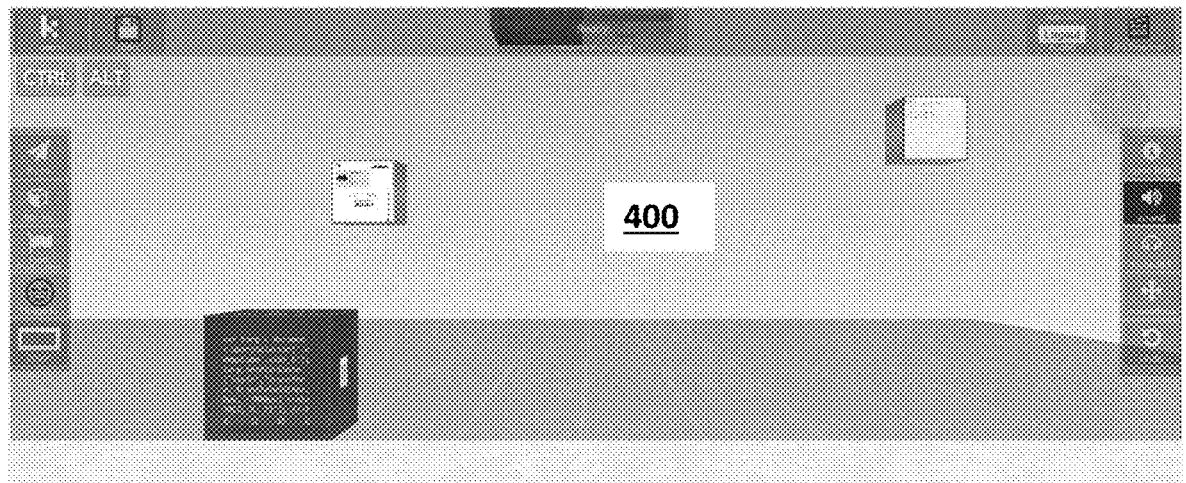
FIG. 4 and FIG. 5A are screen shots of embodiments of graphical user interfaces for a dynamic, polymorphic multi-dimensional visual programming environment of the current invention.
Figure 5A:
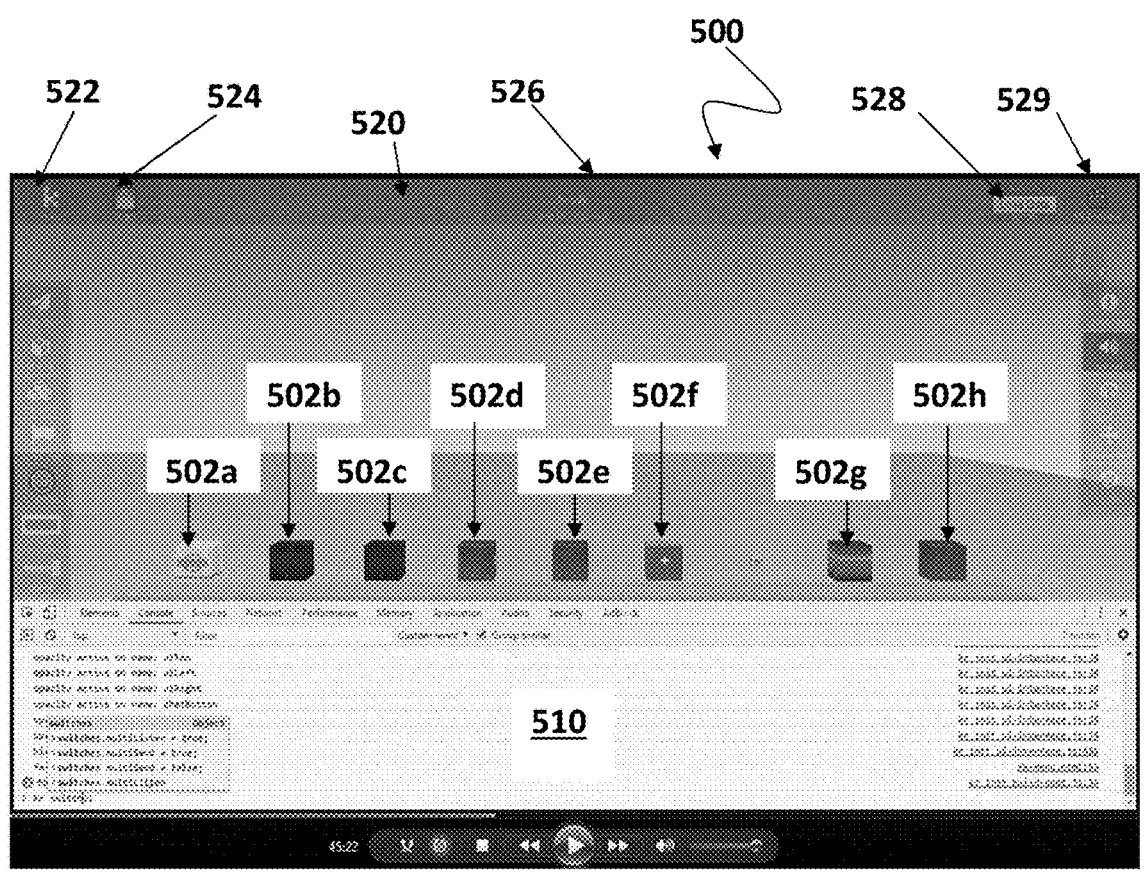

One such GUI is shown as a default developer screen 400 shown in FIG. 4. Another such GUI, shown as a default developer screen 500 shown in FIG. 5A, may have a default developer screen 500 having a top panel menu bar, Menubar 520, a left panel bar, Leftbar 530, a right panel bar, Rightbar, a compass 550 to display the orientation of the cardinal directions (north, east, south, and west) on the grid, and two access bars 560, 570 below the World display space to present options for managing access to components of the dynamic multi-dimensional visual programming environment.

The bar 520 above the default developer screen may have the following buttons and fields: 'Menu' 522, 'Data' 524, 'Ready' 526, 'Authenticate' 528, and 'XR Preview' 529.

Figure 5B:
FIGS. 5B-5C are screenshots of further detail of the graphical user interface of FIG. 5A.

Selecting the 'Menu' button 522 may present a pull-down menu 523, shown in FIG. 5B, which lists the following options: 'Quick help', 'World text', 'World setup', 'Open world', 'Open save', 'Clear world', and 'About'.

- Selecting the 'Quick help' option may cause a 'Help' screen to appear, where the developer may be provided assistance related to the dynamic multi-dimensional visual programming environment in any conventional manner
- Selecting the 'World text' option may open a 'Text world' screen, where a developer may copy and paste a world as a string of text (or vice versa).
- Selecting the 'Open world' option may open an 'Open World' screen, where a developer may select a world available for opening and open it for display in the developer's world space on the screen. The world may be loaded by name from the currently-set cloud or local folder.
- Selecting the 'Open save' option may open a cloud save operation of a multi-dimensional world in a remote storage that is defined in a user profile, such as the profile of the current user of the system, or another user that the current user may designate, or a master user associated with control of the 3D world being saved. One example of a remote storage is the Azure SQL database 167,
- Selecting the 'Clear world' option may clear the screen of the world being displayed (it does not delete the world, the information about which resides in at least one of the databases disclosed herein in the same state as it held at its last modification). In response to selection of the 'Clear world' option, a version of the "Env.active.StringWorld" database area may be moved into and stored in the "Env.save.undo" area. If a user ends a session, these backup copies may be wiped for security, unless the user declines that option.
- Selecting the 'About' option may open information about the developer of the dynamic multi-dimensional visual programming system embodiment described here.

Selecting the 'Data' button 524 may present a data pull-down menu (not shown) to list options relating to data, providing the user with access to a list of save files, either to save or load, and includes a send function. The options for data may include a 'Save' option, a 'Load' option, and a "Send' button.

- The 'Save' option may provide a videogame console-like 'Save Slot X' button to allow a user to send a file of data and/or instructions to a remote storage, such as the Azure SQL database 167, to store the file. The information in the file that a user wants to save may be represented in a variety of other ways, such as in a string representing a world or as a loadable block. The file may be stored in a SQL Table for a population to which the user belongs; for example, should the user be a student in a selected school, the User-population would be the set of students in the selected school. The saved file record in SQL may be identified with the User's profile name, slot number, and a world name, and contain the data and instructions to reproduce the world named and contained in the save file by populating and loading a StringWorld with which the string is associated.
- The 'Load' option may provide a 'Load Slot X" button to allow a user to request a record from a remote storage, such as the Azure™ SQL database 167. Once the most recent version of the record associated with the user profile is associated with the authorized user profile of the current user of the system and a slot number is locally available to the client, the system may load the StringWorld of the most recent version of the record. The system may also load a "hotbar" that may be included in the Save File operation to record a one-dimensional array of StringWorld with an (X,Y,Z) grid address for each cube included. The hotbar, also known as a copy and paste bar, may be used as quick access to and copying and pasting of recently used cubes (for example, by clicking on a displayed name of a recently used cube or, for up to 9 cubes, by entry of a number such as 1-9) and for metadata for world name and description.
- The 'Send' button may begin a process that allows a user to send a record to another user, upon confirmation of an administrative check or user granted permissions, if any, to avoid overwriting, or loading instead of, the user's slot records.

The 'Ready' field 526 may show the readiness of the computer system to accept an instruction. It also presents messages from the system processors about system status and problems. Clicking it may allow a user to access a more detailed view, which may be a JavaScript™ console, a larger display, or a display with integrated adjustment controls.

The 'Authenticate' button 528 may enable cloud access by invoking authorization, which may be conducted in any conventional manner. The authorization system may be provided with a capability to allow a user who has logged in recently (within a selected period, which may be adjustable, such as a 12-hour window), to have confirmed authorization without requiring entering new credentials.

The 'XR Preview' button 529 may enable a user to request a preview of the world for applications involving augmented reality and virtual reality. Selecting the 'XR preview' button may cause a preliminary version of the world to be displayed, in which a second coordinate system is overlaid on the 3D world (the Cartesian coordinate system employing X,Y,Z axes typically being used to in the display of worlds).

Figure 5C:
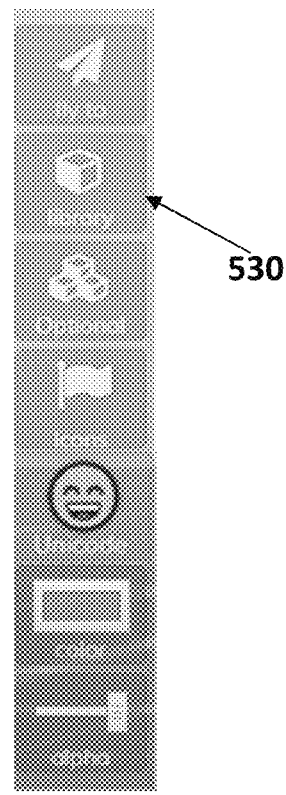

The bar 530 on the left of the default developer screen, shown in greater detail in FIG. 5C, may have the following buttons: 'Fly To', 'Library', 'Optional', 'Icons', 'Unicode', 'Color', and an optional opacity slider.

- Selecting the 'Fly To' button may enable a zoom of the screen display to a user-selected endpoint. Selection of the 'Fly To' button may enable an array to be passed to the Camera module for calculating a simple linear path described by the difference vector <x2−x1|y2−y1|z2−z1> between the user's current view point and the desired endpoint, using the current location x1,y1,z1 and the end location x2,y2,z2. (Vector length)/(desired number of subdivision steps) may be used to provide the normalized ratio for the camera transform vector. Values for the 'Fly To' button may be equal to values for the Camera cube.
- Selecting the 'Library' button may enable preview of a selected set of cubes on a 2D background. Clicking a displayed cube of any cube type may enable loading a cube into the clipboard or "hotbar" area to be accessed by the developer and added into the currently displayed world. Selecting the Glyph button may enable access to a library of alternative, optional components or cube types.

Selecting the 'Optional' button may enable loading of additional decorative or functional cubes according to the user's interests.

Selecting the 'Icons' button may enable display of a grid of icons and symbols. The symbols and icons may then be copied to the system clipboard for pasting into HTML areas or onto compatible cubes that accept HTML strings, and subsequent displaying.

Selecting the 'Unicode' button may enable display of a grid of common Unicode characters, which are standard characters for the consistent encoding, representation, and handling of text. The standard is maintained by the Unicode Consortium of Mountain View, Calif. The Unicode characters may be copied to the system clipboard then pasted into titles, editable text areas, code, and other compatible fields.

Selecting the 'Color' button may enable display of a system color picker dialog window, which allows the user to paint the floor tiles beneath the cubes.

The bar to the right of the default developer screen may have the following buttons: 'cubeHelp', 'Sound', 'rightClick', 'mouseLook', and 'Undo'.

Selecting the 'cubeHelp' button may enable display of a persistent 'Help' screen to present information related to a selected cube, such as its grid address or other properties or current information about the data or code associated with the selected cube.

Selecting the 'Sound' button may open a sound screen, through which a developer may change the characteristics of the computer system's audio in any conventional manner Selecting the 'rightClick' button may toggle the right mouse button to lock on or off when enabled.

Selecting the 'mouseLook' button may enable the mouse to point to a grid location to which the camera may be pointing (in a manner similar to conventional arrow keys).

Selecting the 'Undo' button may enable the computer system running the dynamic multi-dimensional visual programming environment to undo the developer's previous instruction(s) by loading an auto-saved version of StringWorld and repopulating the visual field from the loaded version.

1.5.2. Other Screen(s)

Figure 6A:
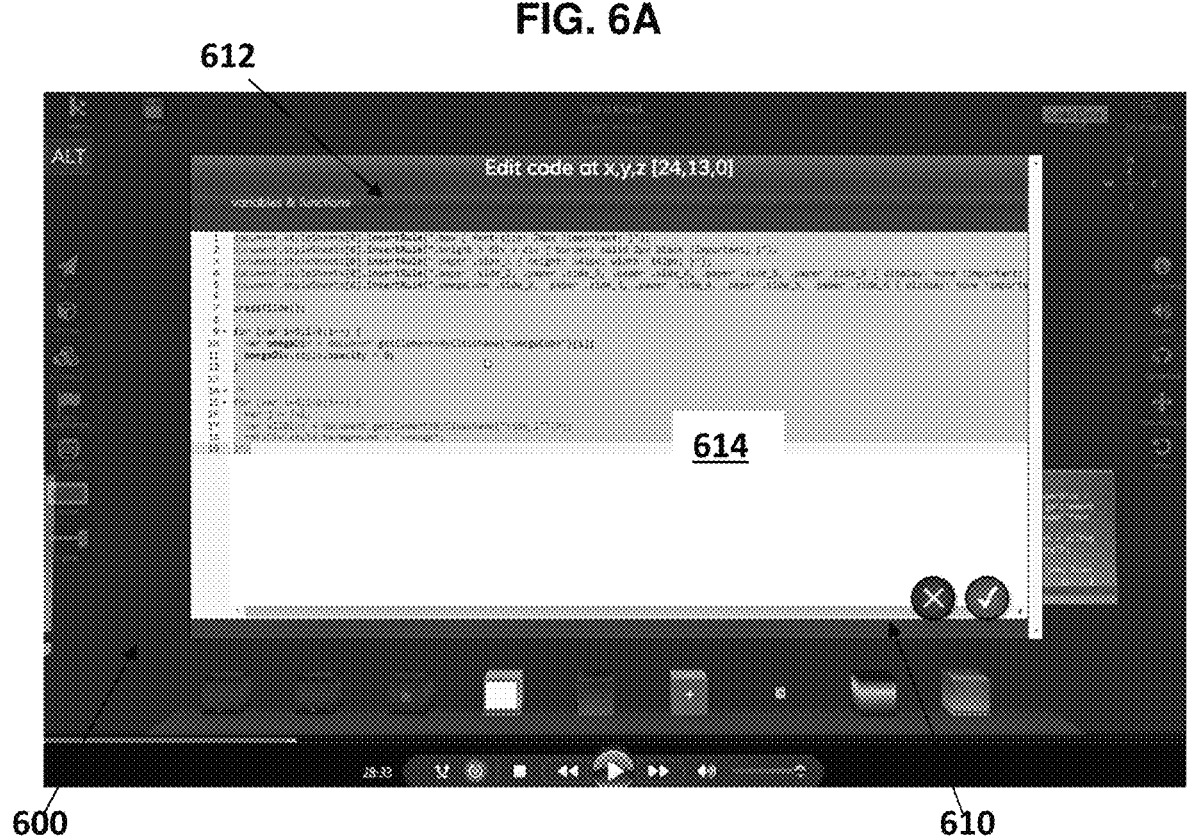
FIG. 6A is a screen shot of an editor screen 610 for a dynamic, polymorphic multi-dimensional visual programming environment of the current invention.

As shown in FIG. 6A, a default developer screen 600 may have an editor screen 610 for editing code cubes with a Functions and Variables section 612 for defining variables and functions to be associated with the graphical item under development and the entity that the graphical item models. The editor screen 610 may also have an 'Edit code at X,Y,Z' text space 614 for viewing the code associated with the graphical item and the entity that the graphical item models. In the illustrated example, the graphical item under development may have a grid address of (24,13,0). Using the text space 614, a developer may delete, add or edit code, invoking variable values and instructions for a cube at the identified grid location, using any conventional third-party syntax highlighting plugin.

Figure 6B:
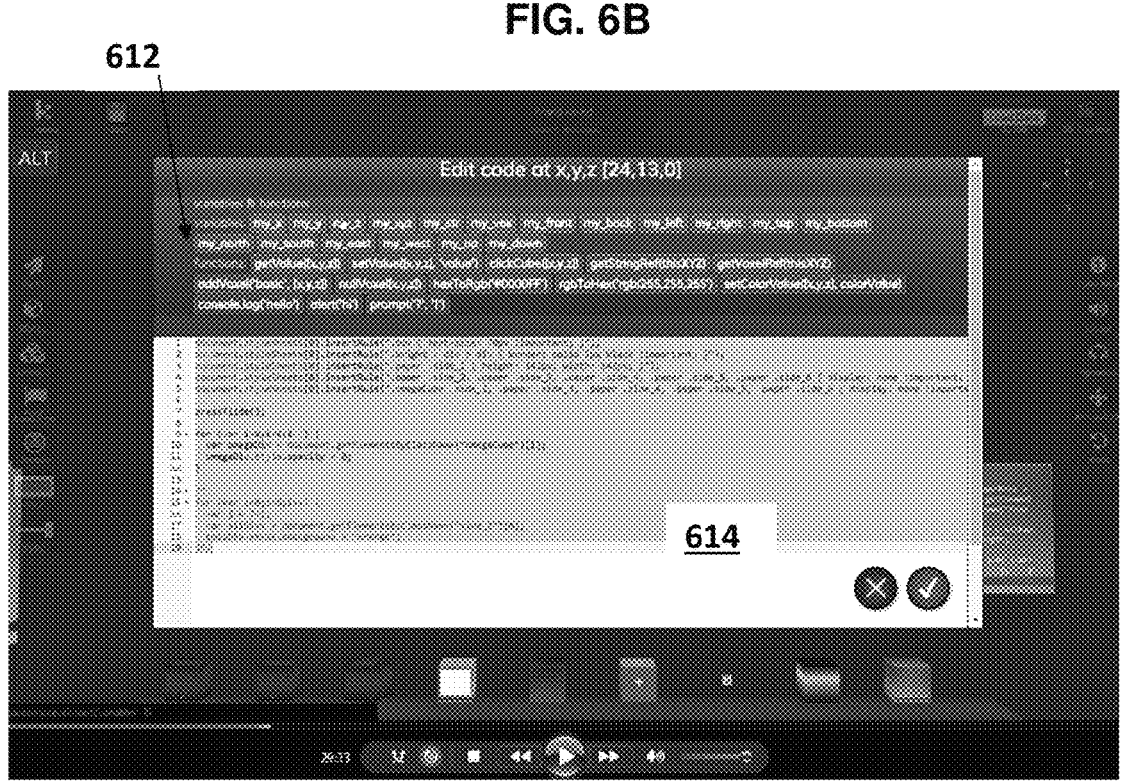
FIG. 6B is a screen shot of more detail of the editor screen 610.

FIG. 6B shown the Functions and Variables section 612 of the editor screen 610 filled out with handles for defining functions and variables to be associated with a graphical item at (24,13,0).

1.6. Workflow Diagrams

FIGS. 7A-7F show an exemplary embodiment of workflows for the development, testing, and maintenance of a software system and its model using visual programming with polymorphic, dynamic multi-dimensional structures. The workflows are developed for use with the system 100 described in this embodiment, but it is to be understood that the workflows may be adapted to work with other embodiments of systems for multi-dimensional visual programming using polymorphic, dynamic multi-dimensional structures.

Figure 7A:
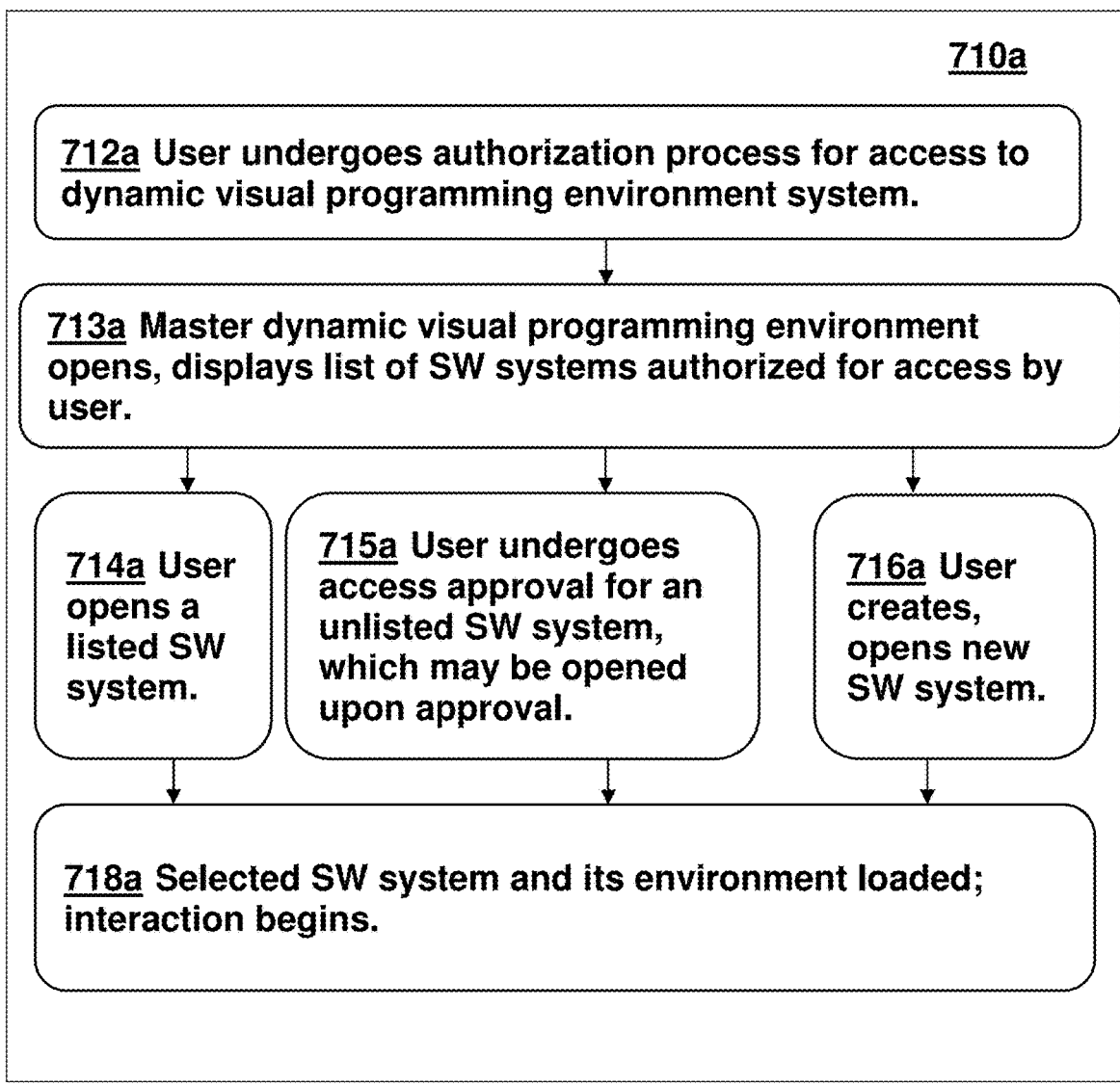

1.6.1. Workflow 710a: Accessing the System 100 and Creating or Opening a Software System FIG. 7A shows a workflow 710 for creating or opening a software system and, if the user has development access authorization for the software system, for preparing it for editing. In a stage 712a, using the profile subprogram 221f, the user undergoes an authorization process for access to the dynamic visual programming environment system by identifying him or herself and in so doing, submitting a request to access the dynamic multi-dimensional visual programming environment system 100. The processor determines whether a user profile exists for the user and, if not, prompts the user to create a user profile for the user.

In a stage 713a, the master dynamic visual programming environment opens, and the system 100 opens and displays a list of software systems for which the user has access authorization. In a stage 714a, the user selects a listed software system. If the software system for which the user wants access is not among the systems for which the user has prior authorization, in a stage 715a, the user identifies the unlisted software system and undergoes access approval for the desired system. Once authorization is obtained, the newly authorized software system is added to the list of software systems for which the user has access authorization, and the user may now select the desired system. Alternatively, in a stage 716a, the user instructs the processor 114 to create a new software system.

In a stage 718a, the selected software system and its associated environment is loaded and displayed on a monitor for the user's computer system, and the interaction between the user and the software system begins.

Figure 7B:
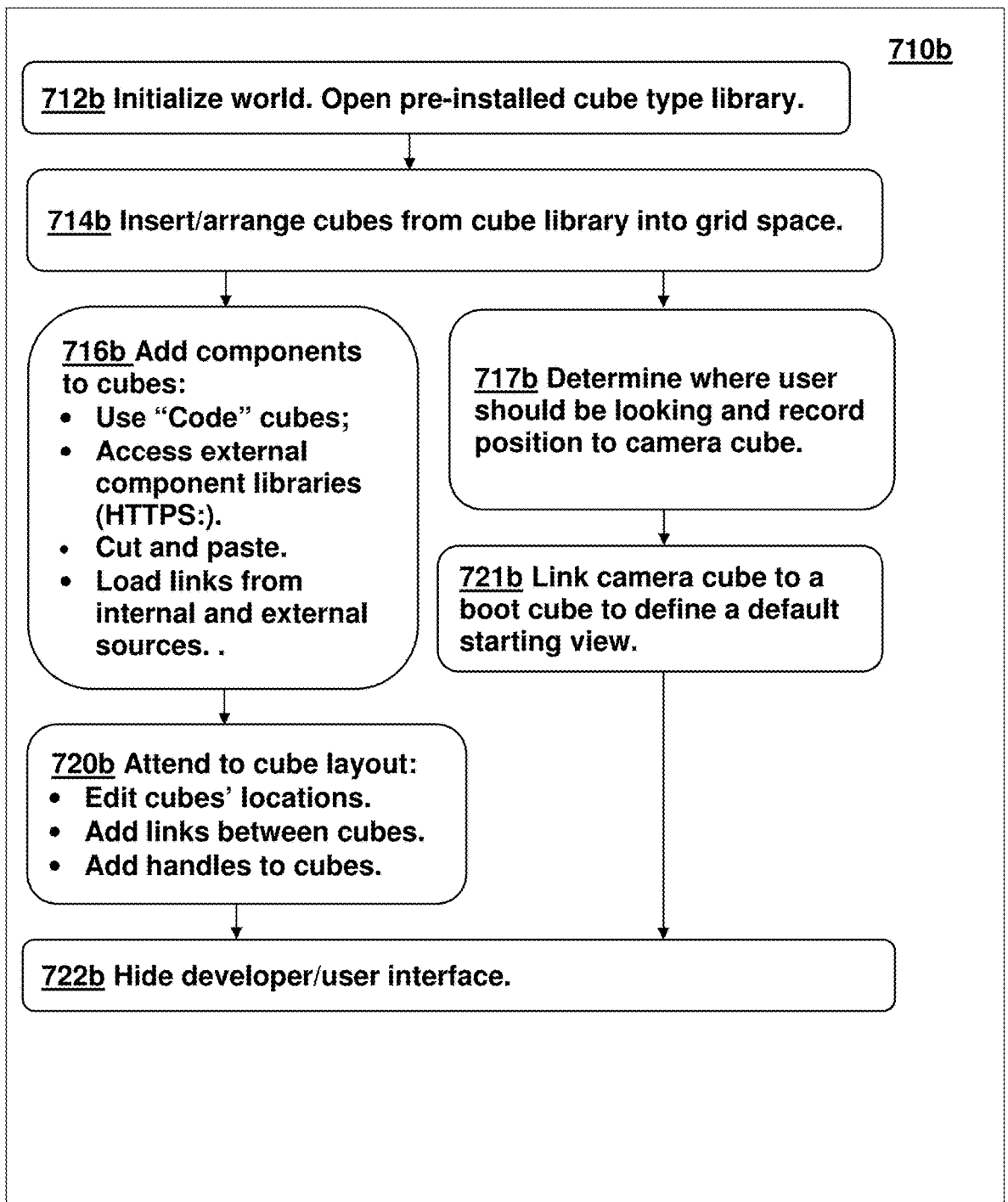

1.6.2. Workflow 710b: Creating or Editing a Software Entity and Associated Components FIG. 7B shows a workflow 710b for creating or editing a software entity and associated components, including the development and editing of the multi-dimensional model of the software system.

In a stage 712b, the user, once identified as having development authorization, may initialize operation of a software system under development. The developer may invoke an initializing program to start a new software system (and by extension a new multi-dimensional world). The new software system initializing program begins by the system 100 displaying a 2D representation of a blank grid of regions sized to be voxels of a selected size and dimension in the grid.

The initializing program for initializing a new software system begins with the browser underlying system 100 loading and sending a confirmation that it has loaded the entire file package for the dynamic, polymorphic multi-dimensional visual programming software environment, and can begin the environment initialization.

The front-end 104 elements may be loaded and organized, so that buttons and menu-options are available at Top Panel, Left Panel, Right Panel, and Bottom Cube Bar. Functions related to the front-end 104 are defined for common tasks, like 2D windows being popped up for editing code and other conventional user tasks.

Keyboard, mouse, and touchscreen event handling interactions may be loaded by appropriate modules and associated with elements, including buttons and/or fields, of front-end 104. These pass information that can be acted on by programs for operations such as camera logic, database I/O, voxel logic, and save/undo functionality such as are available in the embodiment of a computer-based software system development system shown in FIG. 1 or in the inner loop of the embodiment of a computer-based software system development system shown in FIG. 13.

The StringWorld representation of the new software system may be built by the StringWorld building program 112*a*, in the form of a three dimensional array that may be represented by the following pseudocode:

```
var A =                        // create 1 X-axis array with 1 YZ
                               plane
[                              // create 1 Y-axis row inside X=0
                               YZ plane
   [ Data for X=0, Y=0,        // create 1 Z-axis item at X=0, Y=0,
     Z=0 ]                     Z=0
   ],                          // end Y-axis row array
[                              // create new Y-axis row array, X=0,
                               Y=1
   [ Data for X=0, Y=1,        // create 1 Z-axis item as array (or
     Z=0 ]                     object)
   ],                          // end X=0, Y=1
[                              // create X=0, Y=2 row
   [ Data for X=0, Y=2,        // create Z-axis item at X=0, Y=2, Z=0
     Z=0 ]
   ] ]                         // end
```

The StringWorld representation for the new software system may be created as an empty set by creating a selected number of (e.g., 32) empty Y arrays inside each of 32 empty X arrays, for 1024 total empty arrays, one array for each integer x and y (but, in this but not necessarily other embodiments, not z) of the voxels in the world. Each of the 1024, or $32^2$, empty arrays may be filled with between zero and 32 structured objects, or arrays with similar content, all containing basic component attributes related to that particular addressed entity to be represented visually and interactively in the scene.

In this embodiment, the data objects making up each of 32 possible Z coordinate addresses may be displayed by what objects are put into each array and do not need to be defined or initialized as "empty." Such empty addresses may be ignored until given a value such as Z=1, which would be the $2^{nd}$ slot in the containing Y array. That Y array may be stored in a containing X array. The first slot in the Y array may be empty, or undefined, to be visually undisplayed and given no component.

The VoxelWorld representation of the new software system may be created by the VoxelWorld program 112*b*, through operation of the DOM based on the existence, or non-existence, of data and cube entries in the StringWorld database.

If empty, the VoxelWorld representation may contain one wireframe cube of a size associated with the number of arrays with which its associated Stringworld representation is constructed (such as 32×32×32 ordinary cubes in dimension). This frames the active (X,Y,Z) grid space. A checkered floor may be created in which each floor tile may be used to add one cube at the (X,Y,Z) grid address directly above it.

A library, which may pop up by clicking the library button on the Left Panel GUI, may be built as a preview and selection document from a list of "Built-In Blocks" stored in the Master database. The "Built-In Blocks" list is a list of names that represent and are associated with components with certain visual styles. Voxel preview representations may be generated, but need not be part of the grid, the StringWorld representation of the software system under development, or save files.

The programs for operations such as camera logic, database I/O, voxel logic, and save/undo functionality may initialize the computer-based software system development system to constantly update the VoxelWorld representation and the active world transform string contained in the Camera database, and to respond at very low latency to any keyboard or mouse activity by the user on the client. The programs for operations such as camera logic, database I/O, voxel logic, and save/undo functionality stay as simple as possible because they may run at a speed such as 60 frames per second or ~16 ms.

The programs for operations such as camera logic, database I/O, voxel logic, and save/undo functionality may also check the executions stack, which is a list of components to be run and the grid addresses of the cubes at which they are being run, and may complete the execution stack each frame before moving to the next. If loads are heavy, frame rate may be slow but not drop operations or stack instructions.

User profile information and multiplayer features, including database connectivity to Azure SQL storage and the cloud, may be called. The developer may begin to build the new software system in accordance with the workflow 710*b* by starting its stage 714*b*.

When the developer wants to continue development of an already existing software system, the developer may request or automatically be presented with a set of software systems for which the developer has development access authorization, and the developer may select one of the software systems for display on the 2D display. The 2D display will present the multi-dimensional world that models the selected software system on a grid, ready for the developer to start making amendment thereto. The developer may begin to edit the software system in accordance with the workflow 710*b* by starting its stage 714*b*.

In a stage 714*b*, the developer may add cubes to the grid. The developer may select cubes from the library's collection of available cube types, and insert them into the grid space. The developer may also select a blank cube to insert into the multi-dimensional world. The appearance of the multi-dimensional world is thus altered, with the newly added cubes featuring the style(s) associated with the cube types of the cubes added to the grid. If the user wants multiple component selections available, the system may have numerous slots (such as nine of them) to select to be loaded into (from library or cut or copy) and then pasted back out of when active. Zero cancels any active selection.

By adding cubes to the grid, the developer develops the software system, associating software elements with cubes added to the software system. In the current embodiment, the software elements in this embodiment are known as software entities (or simply entities). A software entity associated with an added cube may feature the functionality that is associated with the cube type of the added cube.

In a stage 716*b*, the developer may add components to software entities. The developer may open a component library, such as the CubeFunc["type"] Database 330 or the "document.styleSheets[ ]" Database 340, from which the developer may select a component to add to entities and their associated cubes in the world. The developer may associate the selected component to an entity by adding a component tag (which also constitutes assigning a CubeType) to the entity using the StringWorld program. In response to the association of the selected component to the entity, the appearance of the cube that models the altered entity is altered to reflect the newly associated component by a change to the "classname" attribute which the browser, or the front-end 104, maintains visually in association with component style descriptions in CSS. Upon changing the classname, any existing styles in the "document.styleSheets" database 340 may be retrieved and applied by external sub-systems, described in more detail below with reference to the Document Object Model (DOM) cross-platform and language-independent application programming interface.

Alternatively, the developer may select components from other internal or external component libraries (via HTTPS) to associate with the cube. The developer also may choose to cut and paste data and instructions that encode component functionality or appearance from an already existing component into other components, modifying the data and instructions as desired.

By associating components to cubes and entities, the developer continues developing the software system, with the functional components defining additional functionality for the software system and the style components defining changes in appearance to the cubes in the world.

In a stage 720*b*, the developer may attend to cube layout on the grid, editing cubes' locations, adding links between cubes, and adding handles to cubes as desired to edit the order of operation of the entities modified by the cubes.

Sequentially or concurrently, in a stage 717*b*, the developer may select where in the grid to place a camera cube, to define the initial view of the grid and to record the initial position of the camera cube (grid coordinates and rotation) for use in developing new positions (grid coordinates and rotations) of the camera cube to present new views of the grid when desired by the developer. In a stage 721*b*, the developer may link the camera cube to a boot cube, and so record the initial position of the camera cube, to define a default starting view for the camera.

In a stage 722*b*, the developer may seamlessly alternate between the view of the end user (visitor), or the view of the developer, in which changes to the visitor's experience are made. As an example, reference is made to FIG. 11D, which shows the block world with the audience's view on the left, and the developer's view on the right. The developer's view is comprised of logical and coding blocks while the end user's view is comprised of presentational, interactive, and output blocks.

Figure 7C:
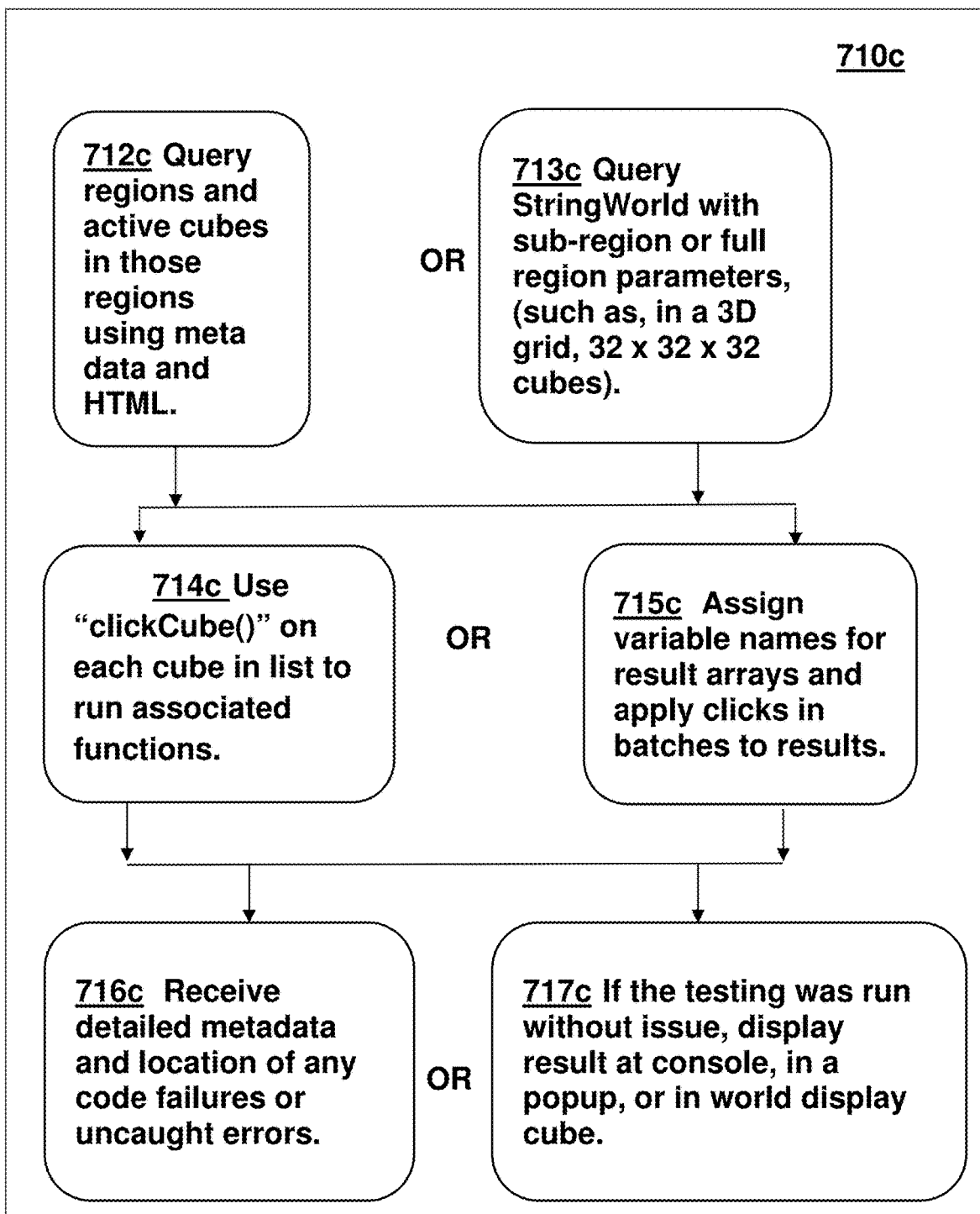

1.6.3. Workflow 710*c*: Testing the Selected Portions of the Software System FIG. 7C shows a workflow 710*c* for testing selected portions of the software system by a user possessing tester authorization. In a stage 712*c*, regions in the selected portions of the software system and active cubes in those regions are queried using metadata and HTML. In another method of querying, in a stage 713*c*, the StringWorld grid may be apportioned into sub-regions or full region-apportioned areas (for example, in a 3D embodiment, into 32×32× 32 cubes), and queried.

Continuing with a 3D example, in a stage 714*c*, "click-Cube( )" may be used to run associated testing functions on cubes in each of the portions of the software system undergoing testing. Alternatively, in a stage 715*c*, result arrays may be developed from the query results from stages 712*c*, 713*c*, with names assigned to the variables in the result arrays; and clicks may be applied in batches to the results to run associated testing functions.

In a stage 716*c*, the testing results in identification of code failures or uncaught errors or identification of the errors and failures themselves, and detailed metadata and location associated with such code failures or uncaught errors is received using conventional system control output systems. Alternatively, in a stage 717*c*, if the testing was conducted without issue, the results may be displayed at a console, in a popup, or in a world display cube.

1.6.4. Workflow 710*d*: Saving a Software System and its Multi-Dimensional World FIG. 7D shows a workflow 710*d* for saving a software system and its multi-dimensional world locally, to a cloud location, or in a text file. The save process may start in a stage 712*d* by clicking the System button in the top left edge of the display screen (shown in FIG. 5B). For saving the software system and its multi-dimensional world locally, in a stage 713*d*, a developer clicks the "Local Save" button in the System button's pull down list 523 to save a copy of the entire world in local storage. In a stage 714*d*, the system checks for any size parameter issues in the length of the saved string, or stringified JSON.

For saving the software system and its model to a cloud location, in a stage 715*d*, a developer who is logged into and authorized to access the cloud location selects a save slot to store the world string or, using conventional SQL database record management procedures, identifies a "rewritable record number" to enable storing of the world string in a SQL database.

Figure 10A:
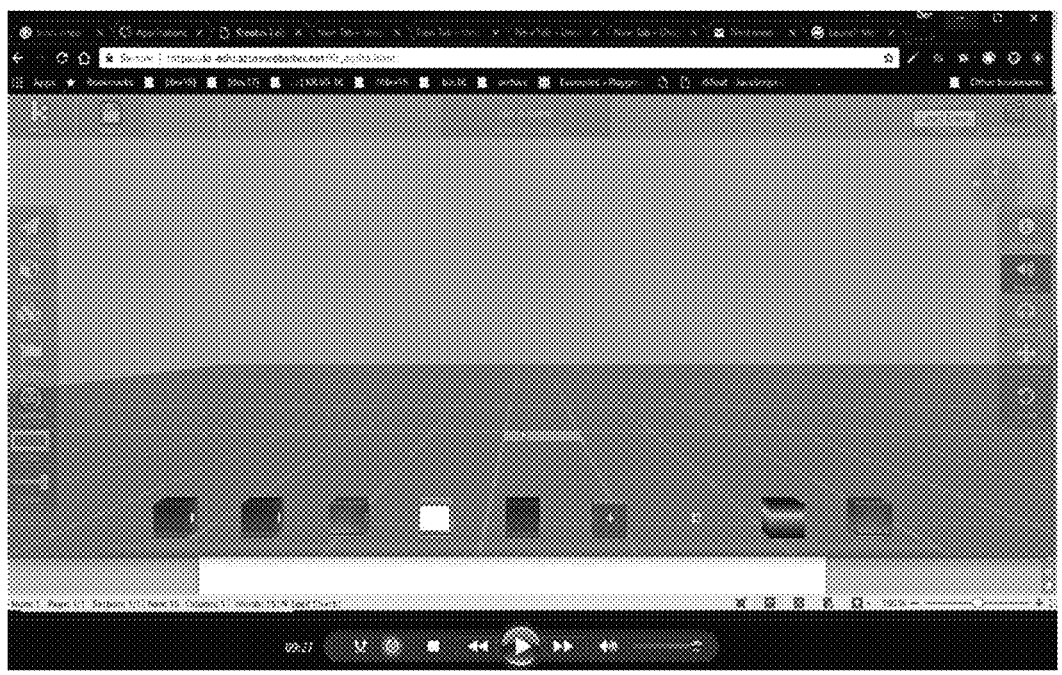
Figure 10B:
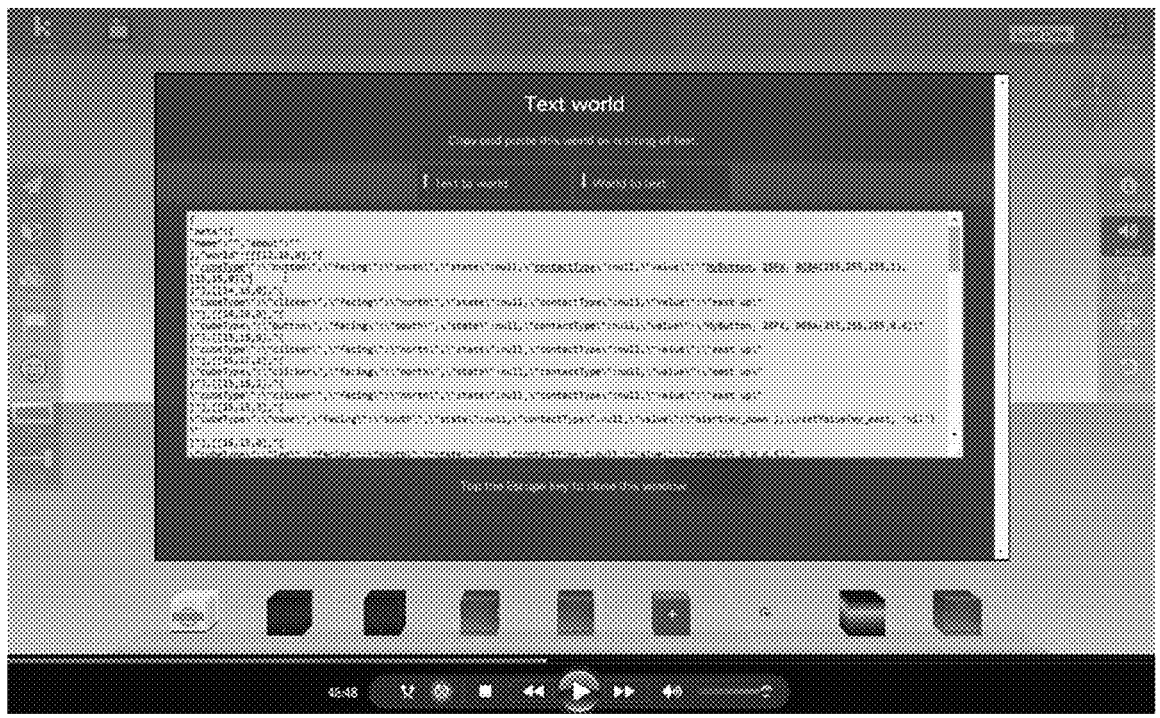

For saving the software system and its model as text, in a stage 716*d* a developer clicks the "World Text" button in the System button's pull down list 523 to invoke the display of the Text World screen (shown in FIG. 10B). In a stage 717*d*, the developer enters text constituting a reusable string (also known as a stringified JSON) that can reproduce the current world. The developer may type the text into the string or copy it from another location (such as from the local location described above); and in a stage 718*d*, the developer may click the "World to Text" button on the Text World screen to effect saving of the reusable string. Alternatively, in a stage 719*d*, the developer may click on a shortcut button on the top bar of the main screen shown in FIG. 5A to copy the whole current model and thus achieve the same result of saving the reusable string.

In a stage 720*d*, the selected saving location (be it local or in the cloud) receives and stores the reusable string.

1.6.5. Workflow 710*e*: Register a New Component "NewComp"

Figure 7E:
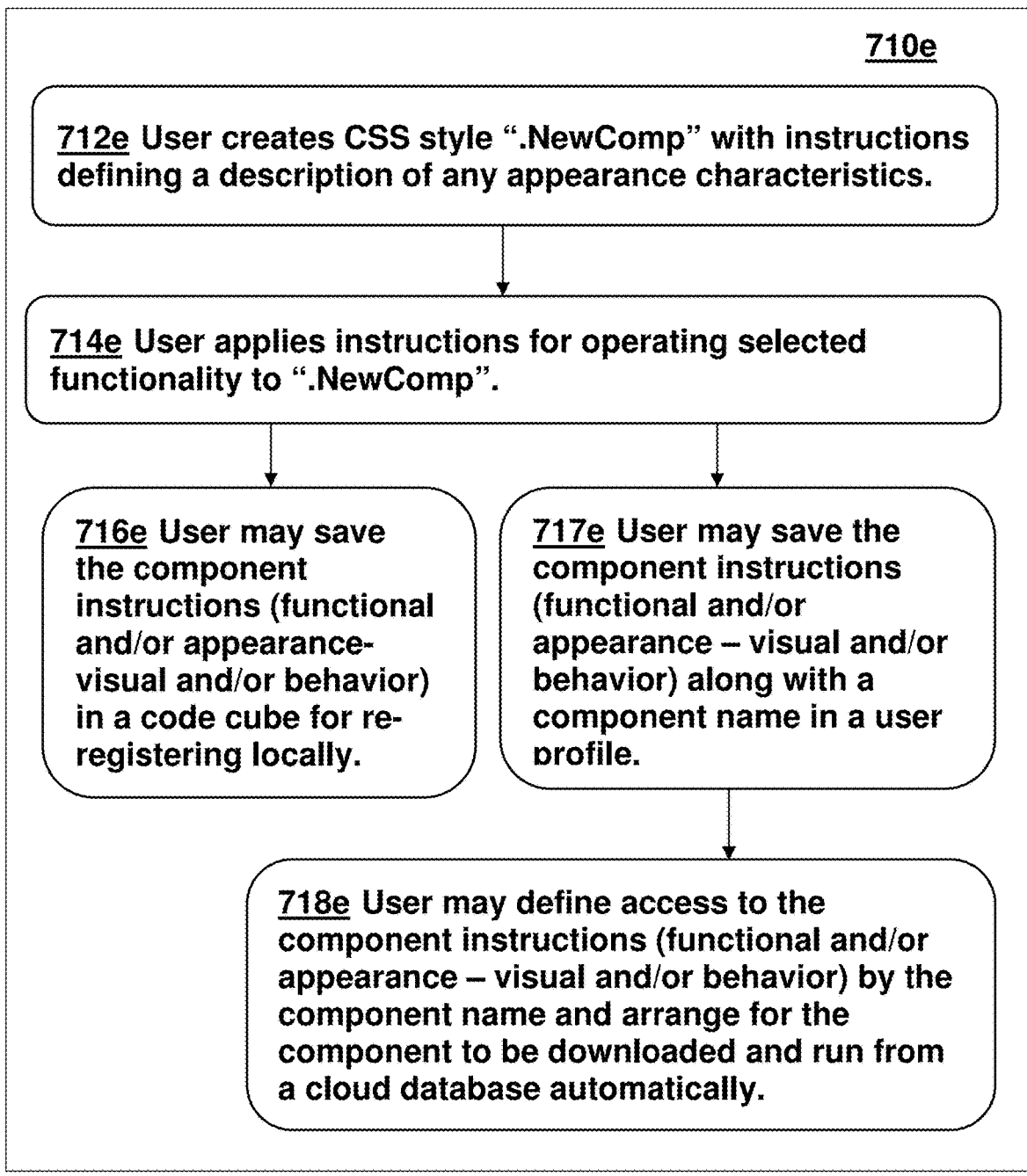

FIG. 7E shows a workflow 710*e* for registering a new component. The new components registration may begin in a stage 712*e* by a developer creating "NewComp" component, which may be in a CSS style or in another style that a computer professional may develop, with instructions defining a description of any appearance characteristics, including, for example, behavior or visual style such as a the faces (.front, .back, etc.), of the cube(s) with which the ".NewComp" component may be associated. For example, for a visual style, the description may be described in instruction code such as may be represented by the following pseudocode:

".NewComp {background-color: blue;}" or
".NewComp.front {background-color: orange;}".

For a behavior, the description may be described in instruction code such as may be represented by the pseudocode:

".NewComp:hover {border-color: orange;}"
".NewComp {scroll-behavior: vertical-scroll;}" or
".NewComp {behavior: pulsate;}".

If the registered component has no style or behavior associated with it, a transparent, highlight-enabled and selectable cube appearance may be used.

While certain components may have built-in functionality that runs when the "addVoxel" command (described below) constructs a cube, in certain embodiments, instructions defining a selected software functionality may be specified in the ".NewComp" component. In a stage 714e, instructions for operating the selected functionality may be created. For example, instructions for operating the selected functionality may be represented by the following pseudocode to allow a response to the following parameters:

event (object with developer click event details),
(X,Y,Z) (which cube address is activated),
ignoreInput (a switch to turn off developer modifier keys, such as shift and alt).

If the registered component has no function associated with it, a default function may be used that acknowledges a click and reports its location.

In a stage 716e, the component instructions (functional and/or appearance—visual and/or behavior) may be saved in a code cube for re-registering locally, or, in a stage 717e, they may be stored along with a component name, for example "Com1," in a user profile in a cloud database. In a stage 718e, the developer may define access to the component instructions (functional and/or appearance—visual and/or behavior) by the component name "Com1" and arrange for the component instructions to be downloaded and run from a cloud database automatically.

Figure 7F:
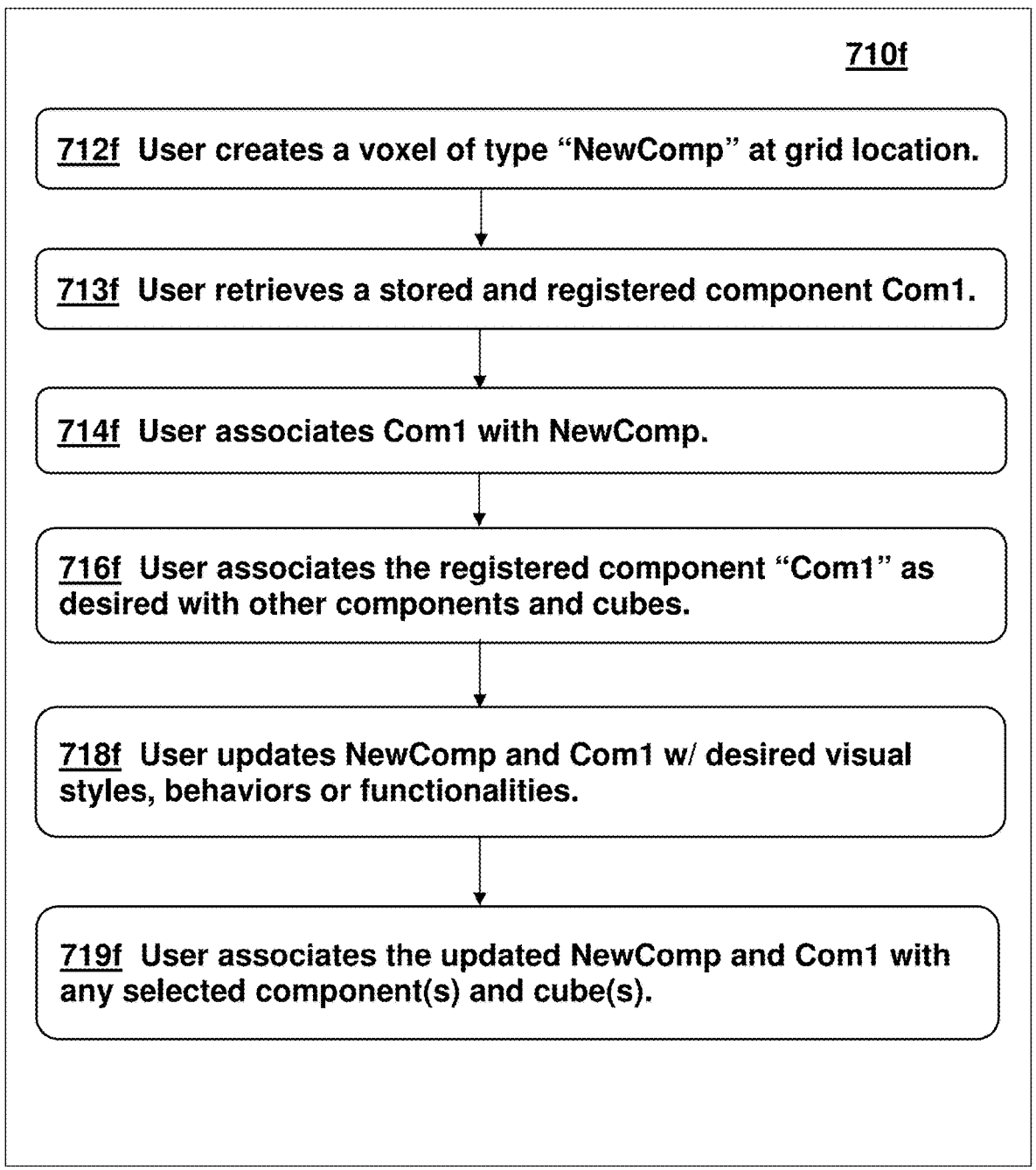

1.6.6. Workflow 710f: Reuse a Registered Component from the Cloud or a Text File FIG. 7F shows a workflow 710f for reusing a registered component from the cloud or from a text file. The reusing process may begin in a stage 712f by the developer creating a voxel of type "NewComp" at a grid location, for example, x:0, y:0, z:0, for example by running a command such as "addVoxel([0,0,0], 'NewComp')." In a stage 713f, the developer may retrieve a registered component such as "Com1" associated with a desired behavior, style (document.styleSheets) and/or software functionality (cubeFunc). The registered component "Com1" may be pulled from a custom array or from a level or user profile. In a stage 714f, the developer may now associate the registered component "Com1" with the new voxel located at (0,0,0) so that "Com1" may participate in defining the behavior, visual style and/or software functionality associated with the new voxel.

In a stage 716f, the developer may associate the registered component "Com1" as desired with other components and cubes; and, in a stage 718f, the developer may update the registered component "Com1" with any desired behaviors or styles (document.styleSheets), or software functionality (cubeFunc) that the developer chooses. In a stage 719f, the developer may associate the updated registered component with any selected component(s) and cube(s).

2. COP-Based Software Elements and their Multi-Dimensional Models 2.1. Entities
2.1.1. Entities, General A COP-based software system is organized into system entities, interrelationships between entities, and components defining attributes or behaviors of entities. An entity may represent (also known as carry or contain) enough data and instructional capacity to be its own mini-program. Graphical items modeling entities associated with code components may be distributed around the grid to perform specified activity or provide specified functionality. In the described embodiment of the present invention, graphical items are typically blocks of a defined height, width, and depth. In certain embodiments, the defined block may be a cube and one cube type may be a "code cube," described below as a cube with which portion(s) of code may be associated. In the current but not necessarily preferred embodiment, the grid in which the software system is modeled may be quantized into 3D grid locations that are of the size of a standard cube, the 3D footprint of the cube known as a voxel. It is to be understood that the voxel need not be cube-shaped. For example, it may be of any convenient geometric shape, such as a rectangular block. One software system development tool for the described multi-dimensional visual programming environment controls locations of the cubes on the multi-dimensional grid, so that the cubes may be ensured to be located on unique grid addresses and a cube's grid address may be used as an address to records in system storage of definitions that define the functionality or appearance to be associated with the cube. For example, the cube's unique grid address may call software for a specified activity, specified functionality or specified software that invokes one or more specified entities that determines where and when in the operation of the software system the specified activity is to be performed or the specified functionality is to be provided, or, further, how interactions between entities, with their competing or collaborating activities and functionalities, are to occur.

Defining entities by not only their associated components but also by their location on the grid relative to other entity models extends the scope of software entities' definitions from simply features and functions to also include parameters for the operation of the software system itself. Because definitions of software system entities in the current embodiment are so extensive as to also define their graphical items, a graphical item's grid address itself may operate as an entity.

Entities are instantiated when given data, as when creating a new entity using a command that may be represented by the following pseudocode:
addVoxel(cubeType, xyz-addr, value, facing, state)
where the arguments are simple strings, true/false values, or numbers.

Because an address is required, a graphical item's grid address may operate as an address to database storage of the entity's definition.

An entity of a COP-based software system may be graphically represented, for example, by a geometric form (also known as graphical object, image, displayed image, item, displayed items, graphical item, image, shape, or block), with the type of entity displayed as an individuality of the appearance of a geometric form, such as a circle, polygon, or irregular shape, and, in a 3D visual representation of the entity, a block, sphere, polyhedron, or irregular shape. As noted before, the graphical items of the dynamic multi-dimensional visual programming environment are typically cubes.

A programmer may create a new entity of a COP-based software system with desired data by using the multi-dimensional visual programming language to create new data or pointers to desired data and associate the new data or pointers to the new data with the new entity. Alternatively, new entities may be created by copying suitable data from elsewhere in the software system or from a database (and altering the copied data as desired) and associating the data with the new entity. A new entity may also be created with desired functionality by creating new code for the desired functionality or creating pointers to code for the desired functionality and associating the code pointers with the new entity. Alternatively, suitable code may be copied from elsewhere in the software system or from a code library (with the copied code altered as desired) and associated with the new entity. Because in this embodiment, an entity develops an entity type by associating components to an entity, and because the type of component associated with an entity is identified by an individuality of appearance applied to a graphical item that represents the entity, as described in further detail below, a new graphical item may be assigned with a new individuality of appearance to represent a new type of entity.

Using the multi-dimensional visual programming language, an existing graphical item may also be copied and pasted into a desired location on the grid to create a new graphical item and a new software system entity associated with the pasted item. According to rules of the visual programming language with dynamic multi-dimensional objects and as described below, copying and pasting an existing entity's graphical item causes a new item to be created, with the information associated with the copied item to be associated with the new item, such that the new item assumes the individuality of appearance of the copied item, and the new entity associated with the new item has the same information (associations, data, features, components) as the entity associated with the copied item, except for the location of the new image on the grid (grid address).

The programmer may choose to alter the new entity and the information associated with the pasted item as desired to represent desired features of the new entity. For example, she may choose to change the definition of the entity by using a conventional programming language to edit the stored information associated with the new entity to reflect the desired type of entity, or by using the rules of the dynamic multi-dimensional visual programming language to alter the new entity's image in the grid to the individuality of appearance associated with the desired type of entity. Using dynamic cubes to interpret data "neighborhoods" (data for the target dynamic cube and other dynamic adjacent or near to the target dynamic cube in the grid), the definition of the entity associated with the target dynamic cube may be changed, which is to say distinctive and particular variables including component labels may be accessed, modified, or added. In certain embodiments, an "entity get/set" cube with abstracted interface may be built in by a macro or by a user-developer, or a third party as an encapsulation technique, or to control access of protected layers of information. In response thereto, the display of the image will change to display the individuality of appearance of the desired type of entity, and the client machine will modify the information associated with the new entity to match the information associated with the desired type of entity. The "entity get/set" cube allows functions to access or write data that create a layer of separation or encapsulation.

In the current but not necessarily preferred embodiment, a graphical item on the grid is defined as being 3D, having a height, width, and depth; and its actual display footprint will include not only the grid address associated with the graphical item but also the neighborhood of locations on the grid around the grid address dictated by the height, width, and depth of the graphical item. That quantity of space in the grid taken up by the graphical item is known as a "voxel," the volumetric representation of a pixel.

2.1.2. Entity Characteristics

Certain entity variables are so commonly applied in a software system that they may define an entity type. Examples of such variables include:

Data, code, functionality, pointer(s), mono-component, multi-component;

Value—for user data; raw data to be associated with a characteristic of the entity, and placeholder for meta-data;

Number and attributes and behaviors of the components associated with the entity;

Orientation in the grid: the associated item faces (north, south, east, and west);

State of the system data: The default developer screen 510 shown in FIG. 5A displays icons 502*a*, 502*b*, 502*c*, 502*d*, 502*e*, 502*f*, 502*g*, and 502*h*, each of which represent entity types and, when a developer clicks on the icon, are arranged to invoke instructions that add, to the grid, a graphical item of the entity type associated with the selected icon.

The above characteristics of an entity may be associated with an entity through components having the defined characteristics. One or more components defining variables may be associated with an entity, with the variable definition specified in the component itself, by the component invoking a global variable, or by the component referencing (pointing to) script or data stored externally.

Component variables are a step removed from the entity. The components themselves do not lose or gain information when an entity with which they are associated is created or destroyed; the entity is an instance of that component, but the component itself is left intact. Components may safely persist data inside an object, such as a JavaScript™ object, similar to a folder, which is nested inside the "Master Database" and therefore may store component variables and data that are in use during the session even if all grid addresses are wiped out. It is reset when a brand-new window is created or when the application is restarted. The persisted data may be used to build a new data holding sub-object similar to a folder for that component:

(Env)."component name". "name of variable or data item or function"

Examples of component variables include the following sub-characteristics:

Lasts during the entire client session even if grid changed or erased;

Can maintain a sub-list of entities being created and deleted in real-time; and

Safely stores critical functions or data objects that are both synchronized and dynamic.

For example, an "accounting" type cube may have instructions associated with it that generates a series of "sub-task" cubes that may be deleted when complete. To maintain a list of completed tasks after the tasks are gone, the accounting cube may also have a component variable associated with it that allows pointing to a completed list in the form:

(Env).accounting.complete-tasks-list=["task-name-1", . . . ]

Then, the accounting cube may have instructions associated with it to freely create and destroy sub-tasks without losing the component record of the sub-task activity.

As an example of one or more components defining variables to be associated with an entity, a special purpose entity defining a giraffe named Betty may be derived from a generic entity by a command for generating a multi-dimensional graphical item at a grid address, for example grid address (0,0,1): The command may be represented by the following pseudocode:

```
Grid-address [0][0][1]={
    Component: "giraffe",
    Name: "Betty",
    Address: "0, 0, 1"
}
```

A component variable stored in an object may be represented by the following pseudocode:

```
cubeFunc['newComponent']=function (input data) {
Env.newComponent.listOfMembers=[xyz1, xyz2, xyz3];
Env.newComponent.theme="bright";
globalColor="gray";
}
var entityData=getStringRef([1,0,1]);
entityData.newVar="this will be saved with the world, or deleted if entity is deleted";
```

In an embodiment of a method and system for multi-dimensional visual programming of an object-oriented software system using polymorphic dynamic multi-dimensional structures, multi-dimensional graphical items may be encapsulated in order to prevent variables associated with them from inherently becoming associated with other graphical items modeling other classes or inheritance structures. For example, defining a giraffe named Betty as an accountant could inadvertently, through multiple inheritance, name all giraffes Betty and make all accountants giraffes.

2.1.3. Adding a Voxel

The four basic functions of software programming are often referred to as CRUD functions, specifically—create, retrieve, update, delete. While the term 'CRUD functions' was originally suggested in the context of persistent storage functions, the ability to perform CRUD operations is fundamental to the development of code for software systems. In the described dynamic multi-dimensional visual programming environment, the software development is provided by creating code and an associated multi-dimensional model of the code, specifically a voxel with components associated with it and a grid address assigned to it to a voxel-footprint-sized location on the grid that no other voxel may occupy until the newly created voxel is moved or deleted by operation of the CRUD functions.

At an information level, a three-dimensional matrix of the voxels may be developed having an array of cells, with one matrix entry (or cell) uniquely associated with one voxel and populated with information related to the associated voxel (including the components associated with the voxel), with the cell location in the matrix defined by the grid address of the voxel with which the cell is associated, and with the voxel defined and acted upon by operation of the CRUD functions.

The "Add Voxel" command is an example of how to add a new graphical item (at a voxel) in the described dynamic multi-dimensional visual programming environment. The following pseudocode may be used to represent the "Add Voxel" command:

```
// "Add Voxel"
//declare function (variables)
Function add-voxel (xyz-vector, cube-type, string-data, facing, state) {
//use x,y,z integers from Math.floor(xyz-vector.x, ... )
string-world [x][y][z]={xyz: xyz-vector, ct: cube-type, val: string-data, ... };
//store graphical representation of X,Y,Z based on consistent string-world set voxel-world[x][y][z]= function ( ) {
    var dv=Document.createElement('div');
    //can fill in stylehere
    dv.setAttribute('className', 'cube-type');
    Scene.appendChild('dv');
    Return dv;
}( );
}
```

The "xyz-vector" defines the address of the new graphical item at a voxel footprint-sized location on the grid. Given a vector and a location, a fresh wrapper or as much detail as desired may be added to the entity that is represented by the new graphical item at the grid address.

The code "function add-voxel" in the pseudocode representing "Add Voxel" command includes an identification of the properties that defines the voxel and the entity that it models and the operations that the entity is expected to perform. The code "function add-voxel" is a form of Javascript™ code. Thus, the "Add Voxel" command operates as a simultaneous definition of the StringWorld grid data and the VoxelWorld representation of the voxel and the entity that it models. The properties that may be defined in the "Add Voxel" command, such as cube-type, value, facing, contact type—comprise a shortlist of properties that together define the attributes and functionality in the complete set of entity types for the graphical items in the multi-dimensional model of the software system.

The visual representation, or style, property of a cube that models an entity may be constructed and implemented directly using the "cube-type" property of the entity. In the current embodiment of the present invention, an entity's cube-type may be identical to the CSS "classname" property of the cube that models the entity.

"Classname" is a standard property of HTML objects that is called when an "Add Voxel" command runs. The "Add Voxel" command specifies a "Classname," which creates an automatic, and instantly updated, connection to the document.styleSheets database to invoke and apply the behavior or style associated with the identified "Classname" to the entity or cube, as appropriate. Thus, "Classname" instruction thus eliminates the need to alter widely-used versions of Document, document.styleSheets, or Classname generated by most modern browsers to apply a behavior or style to an entity or cube.

A developer may modify existing cube-types by creating new CSS strings, also called rules, using a standard browser-controlled command such as "document.styleSheets[0].insertRule( ... )", by deleting rules, or by manipulating visual representations or style rules using similar commands, and storing them in records in databases such as the CubeFunc ["type"] Database 330 or the document.styleSheets[ ] Database 340.

In addition, a developer may program each side of standard cubes with the common command "clickCube([X', Y', Z']),", which is a look up call to records associated with a world grid to activate the entity modeled by the cube at the identified X, Y, Z address to perform a specific behavior. Event information specifying which side of the cube the click occurred on, such as ".front or .back" may also be passed.

Entity types interpret and interact with value, facing, and contact. Developers may use this information to distinguish between entity types and individual entities of the same type (e.g. value A vs. B). Each software system will be different, but a simple taxonomy may be used to distinguish entity types from each other in the entity set.

In the dynamic multi-dimensional visual programming environment described in reference to FIGS. 1A-3, the multi-dimensional form of graphical units allows for logic that creates new possibilities for functionality. For example, the sides of a cube may provide different functionality. For example, the front of a cube may display the title of the cube, while the back of the cube may carry text. A top of the cube may carry a handle that enables activation of another cube (analogous to switches on appliances and switchplates); a back of a cube may carry a logo; one side may carry a link to a different camera cube, another side may carry a button that will allow a bird's eye summary of the contents of the cube (triggering a projection that displays explanatory text and images), and a bottom of the cube may display a link to another location internal to the grid or to a location accessible over the Internet. In other embodiments, a cube side may operate as an activation switch so that selecting a side face of the cube causes execution of the code associated with the cube.

As described in more detail below, distinguishing among entity types will facilitate accurate, speedy addressing to entity database records so that complex but reliable systems may be created using the available entity types and addressing in JavaScript™ code.

2.1.4. The Code Cube

One type of graphical item that represents an entity type is a "Code cube," which has associated with it a JavaScript™ instruction that calls for the client to perform software code also associated with it. One function associated with Code cube is "Eval" which is a common function which invokes a JavaScript™ interpreter to immediately execute, or evaluate, dynamic code stored in a string. With a Code cube, a string of code may be created and associated with the entity that a Code cube models. For example, 'Eval("javascript code")' may be used to execute a string of new code from a user. The Code cube enables modular programming, a software design technique that emphasizes separating the functionality of a program into independent, interchangeable subprograms, such that each contains everything necessary to execute only one aspect of the desired functionality.

Code cubes are powerful because the code with which they are associated essentially collects valid JavaScript™ instructions and lets a developer wrap that code in a system container that says 'run' or 'eval' to any valid instructions pasted inside them.

Code cubes allow the developer to pack either a little or a lot of functionality into a graphical item, depending on the developer's needs and objectives. Previously, code has been visualized using 2D graphical items. For example, JSFiddle is an online community from JSFiddle, LTD of London GB, for testing and showcasing user-created and collaborational HTML, CSS and JavaScript™ code snippets, known as 'fiddles.' The JSFiddle platform allows for presentation of JavaScript™ code in a flat pane.

The following exemplary pseudocode may be used to represent the "code: function codeFunc(parameters)" command for a Code cube:

```
function codeFunc(thisXYZ, thisDiv, event, ignoreInput)
{
    console.log('code cube click! event:', event);
    var x=thisXYZ[0]; var y=thisXYZ[1]; var z=thisXYZ[2];
    var stringRef=Env.active.StringWorld[x][y][z];
    var voxelRef=Env.active.VoxelWorld[x][y][z];
    var altFlag=getAltFlag(event);
    if (altFlag && !ignoreInput) {
    // Open Edit Window
    var title='Edit code at x,y,z ['+x+','+y+','+z+']';
    var explanation=' ';
    explanation+='<div onclick="toggleCodeHints( );" style="cursor: pointer;">';
    explanation+='<h4>variables & functions</h4>';
    explanation+='<div id="codeHintWindow" style="display: none;">';
    explanation+='variables:';
    var variables=Env.lists.blockVariables;
    for (v=0; v<variables.length; v++) {
        var name=variables[v];
        var link="javascript:evalInsert('variables',"+v+")";
        explanation+='<a class="evalLink" href="'+link+'">'+name+'</a>';
        if (v<variableslength-1) explanation+=' ';}
    }
    explanation+='</div>'; // open window to edit this block, then save it
    EnvPrompt(title, explanation, thisXYZ, stringRef.value);}
    //once prompt is loaded via front-end, fill in values for semantic variables
    //flash a visual light using VoxelWorld references and CSS
    function turnOn( ) {
        voxelRef.className+="showLight";
    }
    function turnoff( ) {voxelRef.className='box code';}
} //end of function
```

The editor screen 610 shown in FIG. 6A shows the 'Edit code' text space 614 for viewing and editing the code associated with the graphical item at a grid address of (24,13,0) and the entity that the graphical item models.

The Functions and Variables section 612 of the editor screen 610 in FIG. 6B shows the results of adding handles such as "myLeft"', "myRight", "myFront", and "myBack"' to the variables and functions already associated with the graphical item at (24,13,0).

The use in the dynamic multi-dimensional visual programming environment of the present invention of semantic tags (such as "myLeft") interpreted within editors associated with an (X,Y,Z) grid address (updated as address changes) simplifies activation of one entity by another entity, because activation may be arranged by placing in adjacency the multi-dimensional models of the entity originating the activation and the activated entity. In addition, the use of cube type names as a metadata link to visual and other sub-properties simplifies reference to entities because it reduces the need for developers to memorize locations of entities in the software systems or their multi-dimensional models in the grid. In addition, identifying cubes by cube types and providing a search functionality that allows for displaying the cubes of a selected cube type will yield a subset of the cubes to review, thus provide more efficient identification of a cube of interest.

As disclosed in more detail below, a grid address (such as (24,13,0), shown in FIG. 6A) may be used as a shortcut or a pin to the variables and functionality already embodied in a graphical item, such as the one located on the grid at (24,13,0). By accessing the code associated with the graphical item at that address, the developer may copy the code or even copy the graphical item itself to use the variables and functionality embodied in the code in another graphical item and therefore elsewhere in the software system.

A developer may search for the desired grid address by clicking on Cube Help (which displays a 'Help' screen to present information related to a selected cube, such as its grid address or other properties or current information about the data or code associated with the selected cube). The developer may also mouseover to a graphical item on the grid and, by hovering over the item, obtain its grid address. The system may also be provided with a set of keyboard key shortcuts so as to provide frequently accessed functionality such as identifying the grid address of a selected cube by highlighting a selected cube and holding down a pre-programmed keyboard key to obtain a display of the grid address of the selected cube. In this case, holding down the key 'L' and clicking on a cube may show a dialog box with a valid cube address that the user can cut and paste.

Figure 8A:
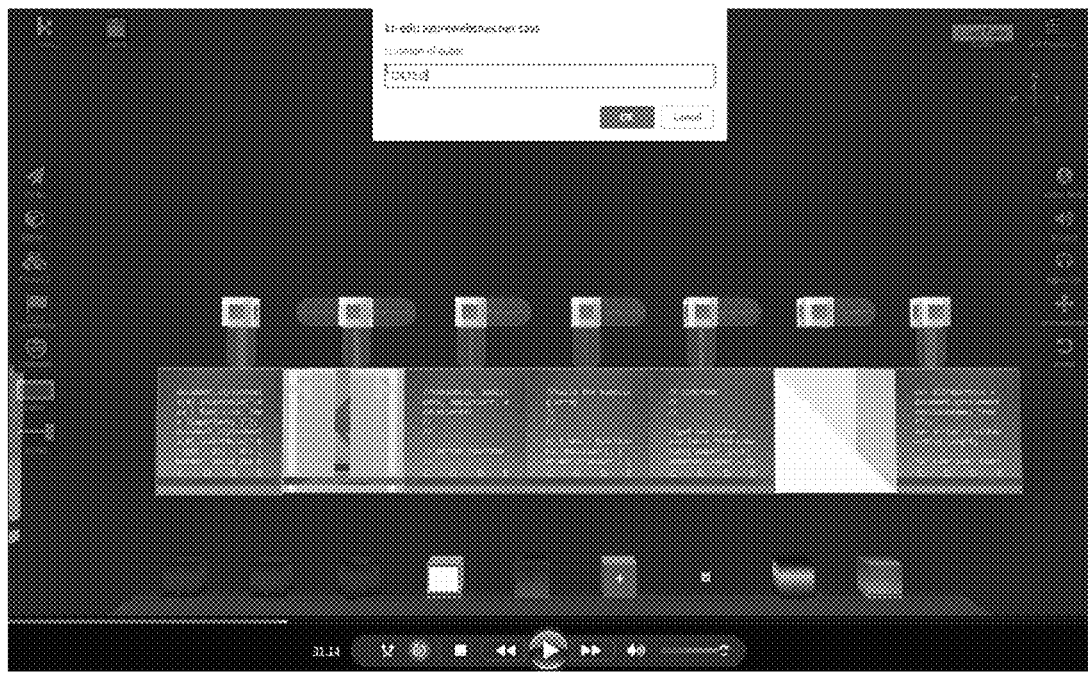
FIGS. 8A-8D are screen shots of a developer screen for a dynamic, polymorphic multi-dimensional visual programming environment of the current invention.

As shown in the developer screen shown in FIG. 8A, a developer may also access a graphical item at a known grid address by opening a "Location of Box" query box and entering the known grid address, such as (24,13,0) into the box.

2.1.5. Copy-and-Pasting Cubes

Figure 8B:
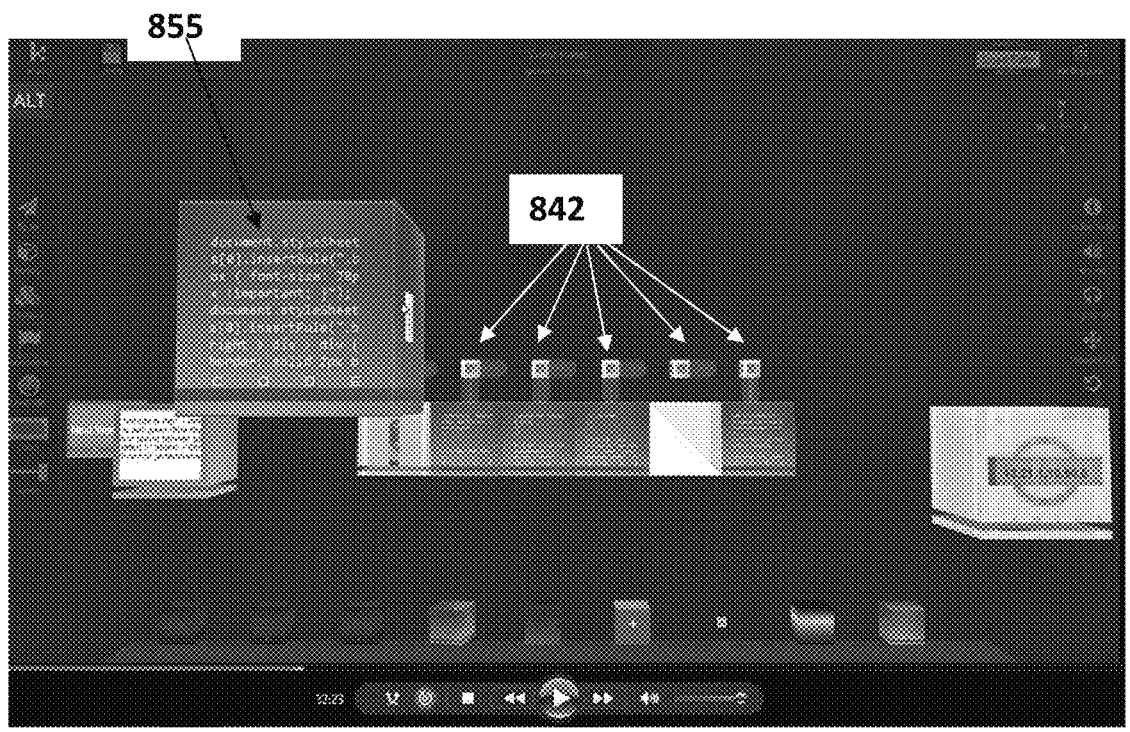

As an example of copying a graphical item and placing the copied item on a location in the grid, the default developer screen shown in FIG. 8B presents the moving of a graphical item 855 (which is of a 'code cube' entity type) to another location in the grid. To perform a move, the developer may use another keyboard key shortcut to operate the X key to select the desired code cube 855 and drag-and-drop it into another location (e.g., (26,22,1)).

In the illustrated example, the code associated with the Code cube 855 does not relate to its proximity to other graphical items on the grid. An example of non-proximity required code includes code containing instructions to change the manner in which the grid is presented on the 2D screen. Because the code associated with the Code cube 855 does not require proximity of other graphical items, the code associated with the Code cube 855 is executable as is. When the code associated with the code cube 855 does require proximity of other graphical items to be executable, it may still be moved, but its code will not be executable unless it is moved to a location on the grid with proximate cubes, and the execution of the code of cube 855 relative to its proximate neighbors at the new location is still consistent with (and certainly not harmful to) the objectives of the software system under development, for example by interfering with the execution of the code associated with the new proximate neighbors of the code 855 or by causing harm to entities modeled by its new neighbors. In other words, in moving cubes, a skillful developer considering a movement of the cube 855 will take care to ensure that the contemplated move does not have harmful unintended consequences to the software system under development. The developer may presuppose the consequences of moving a Code cube, like a chess player moving a knight. Movement of the cubes allows testing of the developer's ideas.

Figure 8C:
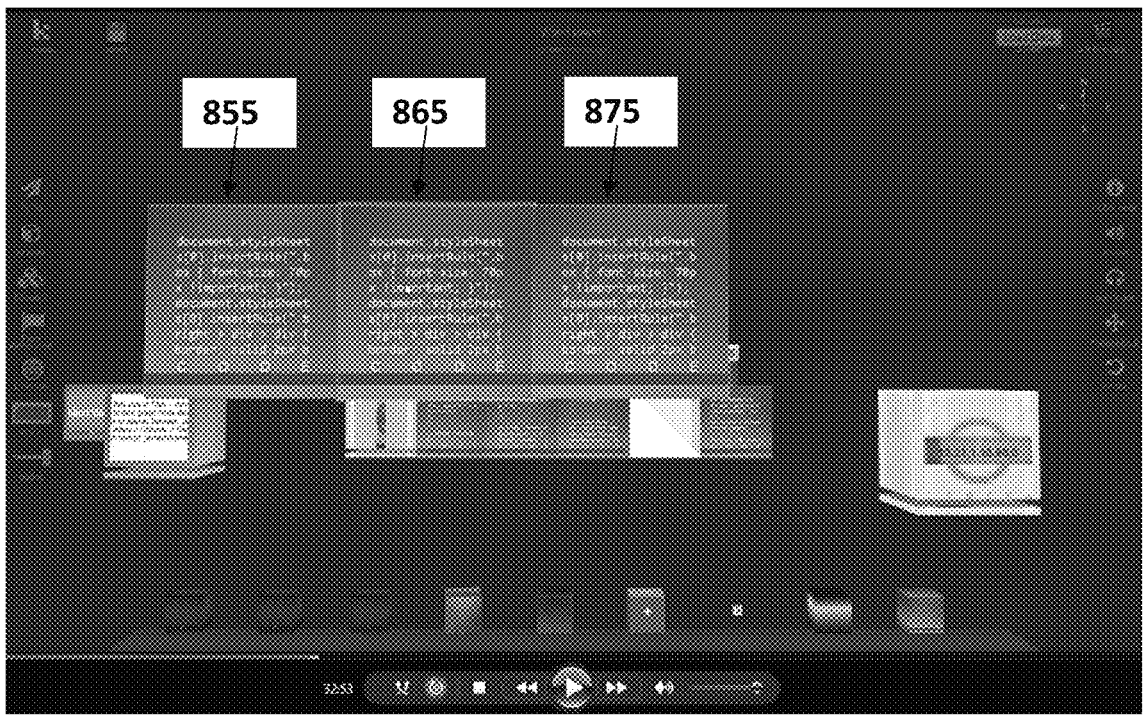

The Code cube 855 may be copied to other locations on the grid, such as on the default developer screen shown in FIG. 8C, in which the Code cube 855 is copied twice (cubes 865, 875) at locations contiguous to the grid address of the Code cube 855.

Copying and pasting cubes does not destroy the original, and each and all may be edited. Because cubes 855, 865, 875 are at three different (X,Y,Z) addresses on the grid, they will not be mixed or muddled in any way. In addition, cubes may refer back to a common reference point. Establishing a common reference point imposes a relationship between each of the copied cubes and a cube at the common reference address. Upon execution of any of the three copied cubes, or upon execution of the cube at the reference address, or not requiring execution at all, the relationship invokes the value (the content) of the graphical item at the reference address, causing changes to the cube at the reference address to be echoed in the three copied cubes. To explain a bit more, the reference point, whether grid address or named variable, may be a useful "master" or "fact source" for branched activities or ones requiring centralized verification checks. For example, a set of cubes throughout a 3D world may act as factory floor light switches, and each switch may refer back to the master circuit cube which will run safety and system integrity checks before updating the whole set of cube switches.

Accordingly, a developer may create addressing chains that impose automatic content changes in multiple graphical items. Addressing chains may be simplified by handles applied by the developer to a graphical item and a geometric instruction for the handle in an (X,Y,Z) space. The handles and their geometric instruction are recorded in the Variables and Functions section of the editor screen for a graphical item. As an example, a developer may apply a handle such as "myRight" to the Variables and Functions section of the editor screen for a desired graphical item and a geometric instruction such as "execute the cube to the right of the graphical item bearing this handle" to provide the functionality of executing the cube to the to the right of the graphical item bearing the handle.

2.1.6. Creating Code

Figure 8D:

When a developer creates code in the dynamic multi-dimensional visual programming environment, he or she may create a cube at any location, so long as the location is not already occupied by another cube and the new cube does not interfere with the desired operation of the developer's software system, for example by establishing conflicts for or between already existing cubes in the grid. For example, when a developer creates a cube at grid location grid address (26,13,0), a system 100 may open a fillable text space into which the developer may type or copy code for the newly created cube. The developer may type or copy code that will impact the newly created cube, or code that will cause operation of another graphical item (such as an adjacent cube). In creating code that will cause operation of another graphical item, the developer will identify in some way the other graphical item, for example by addressing the item by its grid address in the new cube's code or by using a local operator. For example, referring to FIG. 8D, at line 59 in the 'Edit code' text space of the editor screen, the developer may type a line of code:

clickCube(my_left)

The command is intended to cause clicking of the new cube to trigger execution of the code associated with the cube adjacent to the left of the new cube on the grid. When the developer reaches an ending point, he may store his code in the JSON database 322 in a JSON database record associated with the grid address (26,13,0) of the cube he created. He may also store the record in a StringWorld grid database object.

2.1.7. Removing a Voxel

An example of how to remove a new graphical item (a voxel) in the described dynamic multi-dimensional visual programming environment is shown in the following exemplary pseudocode for a "Remove Voxel" command:

//"Remove Voxel"
Delete string-world [x][y][z]; //delete entry data
Scene.removeChild(voxel-world[x][y][z]); //delete lingering visual display, refresh
// trying to access string-world [x][y][z] will now return 'undefined', no data is stored When a voxel is removed, the records in VoxelWorld Database 318 of the grid address are updated to show that the location is now available for use by another cube. Using the deleted grid address as an address into the JSON database 322, the record of the software entity that the voxel modeled is also removed. It may also be removed from a record in a StringWorld grid database object.

2.2. Components 2.2.1. Components, General

Components of a COP-based software system define the attributes or behaviors of entities, and a component may be modeled in the dynamic multi-dimensional representation of the software system as an individuality of appearance in the graphical item(s) that model the entit(ies) with which the component is associated. Potential individualities of appearance of a graphical item include, for example, size, color, property or intensity of color, outline weight/color, no outline, text, presentation of the text (underline, bold, font size), dashed lines, hashing, or texturing.

The association of a component with an entity may be added or removed by changing the physical appearance of the multi-dimensional graphical item that models, using the user interface of the computer system and the multi-dimensional visual programming language described here, the physical appearance of the graphical item may be changed to reflect the individuality of appearance of the desired component. The visual manifestations, or "styles," of graphical items may be used to convey information about values (e.g., data, variables, code) associated with the components of entities modeled by the graphical, thus facilitating analysis and modification of the software system by developers familiar with the values that the styles represent.

Because components are distinguishable from each other by the individualities of appearance assigned to them, the style of a graphical item modeling an entity with which a component is associated may take on a style (an appearance) that indicates to a developer the internal rules that govern an entity's functionalities and limitations.

Further, types of specialized components may be developed to be associated with kinds of values. The developer may then more efficiently select a graphical item to model an entity according to the type of components associated with the graphical item, knowing what types of components are more suitable to the modifications that the developer wants to make.

Cascading Style Sheet (CSS) classes may be used to associate programming to a multi-dimensional graphical item in the dynamic multi-dimensional visual programming environment here described, and by extension, to the entity that the multi-dimensional graphical item models. A component may be associated with a multi-dimensional graphical item using a CSS script found in a component look up table, in which a record contains a component name and a definition of style or functionality associated with the component name. The component name may also be used to access a set or "class" of style to impart to the multi-dimensional graphical item. If no style is defined by the program or programmer for the multi-dimensional structure being created, the system may draw a default or "unstyled" graphical item, which, in the case of the dynamic multi-dimensional visual programming environment here described, may be a cube with six blank sides and having a component name and handle which identifies the cube as representing a "top level" entity but has no other information associated with it.

2.2.2. Component Creation or Modification

A programmer may create a new component representing a desired attribute or behavior for an existing entity, by using the multi-dimensional visual programming language to create a new component with new data, code, or definitions to invoke the desired attribute or behavior, to define an individuality of appearance for uniquely presenting the new component in the display, and to associate the new component with appropriate entities. The visual display of the software system is thus altered to present the graphical items that represent the entities with which the new component is associated with the new visual representation associated with the new component. Alternatively, the programmer may use the multi-dimensional visual programming language to copy a component from elsewhere in the software system (or from a code library) and to alter its associated information to match the desired attribute or behavior. Once a new component is created from the copied and altered component, the programmer may use the multi-dimensional visual programming language to define an individuality of appearance for display of items associated with the new component, and associate the new component with appropriate entities whose associated images will change in the display accordingly.

The programmer may also associate an existing but desired attribute or behavior with an existing entity in the software system by using the multi-dimensional visual programming language to associate an existing target component embodying the desired attribute or behavior with the existing entity. She may identify the target component by finding a pointer to information related to the target component in a look-up table stored in the database, or by finding a matrix element $a_{jk}$ that refers to information related to the existing component in an m×n matrix A maintained for the set of m entities and the set of n attributes or behaviors that may be associated with the entities. The information, be it the information itself or pointer(s) to other information, may be copied into records for the existing entity, thus associating the target component with the existing entity. The existing entity henceforth will have the target component's attribute or behavior, and the displayed item associated with the existing entity will change to reflect the copied component's individuality of appearance.

Alternatively, the programmer may use the multi-dimensional visual programming language to associate a target component with an existing entity by altering the display of the item representing the existing entity to an individuality of appearance associated with the target component. In response thereto, the client machine changes the appearance of the displayed item to reflect the target component's individuality of appearance, and modifies the information or pointers associated with the existing entity to associate the existing entity and the target component. The developer may also open the cube and add instructions and data representing a new component to the selected cube.

An example of how to create a new component to impart a selected style and function to any entities with which the new component becomes associated (cubeFunc[newComp], .newComp) in the described dynamic multi-dimensional visual programming environment is shown in the following exemplary pseudocode for a 'Create new component' command:

```
//"Create new component"
cubeFunc ["brandNew"]=function ( . . . ) {
}
(add to stylesheets).brandNew {
   CSS visual style goes here
}
```

Referring to an earlier presented example, when a "giraffe accountant" cube is clicked or activated, two functions will run simultaneously or in rapid serialization, cubeFunc["giraffe"] and cubeFunc["accountant"]. An accountant giraffe may run each click in a defined order, for example, forward or reverse, possibly with different results, depending on the properties defined for the operation (A*B!=B*A, or NO commutative property). For example, for an entity type Giraffe Accountant, a programmer may elect to run "cubeFunc[giraffe]," then run "cubeFunc[accountant]." However, a programmer may also write a function such as one that looks for another item at the same grid address and delays its own action. Technically a component's function may even catch or edit the call stack itself, but this may also be prevented for security reasons.

2.2.3. Component Operation

An example of how to invoke functionality associated with an entity, which has a component that may be called to identify itself (for example, by identifying itself as (X,Y,Z) with a value of N). Another way is to call 'clickCube([1, 2, 3])' for clicking at X:1, Y:2, Z:3. In the described dynamic multi-dimensional visual programming environment, functionality may be invoked by clicking on a graphical item (called a cube here), for example using the following exemplary pseudocode for a 'Click Cube at X,Y,Z'" command:

//"Click Cube at X,Y,Z"
Env.runFuncArray.push (
  {type: 'paper-cube', xyz: [x,y,z], event: . . . , ignore-input: true}
);
//push this pointer to the "run function array" which looks up the correct function
//for 'paper-cube' and runs that function WITH access to the variables in (X,Y,Z)

The 'Click Cube at X,Y,Z' command provides a functionality that operates to invoke operation of a functionality of an entity when the 2D image of the graphical item that represents the entity on the grid is clicked, so that clicking on the 2D image on the screen causes the entity to function.

The entity/component system of a COP-based software system may be used to distribute the functionality and data associated with an entity. When an entity is defined in the COP-based software system, components may be associated with the entity to specify and organize the data and functionality of the entity; thus, the entity's data and functionality may be distributed across multiple components associated with the entity. When the entity is then modeled at location (X,Y,Z) in the grid by a graphical item, the components associated with the entity (and thus the data and functionality of the entity) are modeled by individualities applied to the appearance of the graphical item. Clicking on an item may differentiate among multiple components and hence multiple functionalities by invoking the item's tag name, or by invoking a series of tags for multi-components.

The order of operation, left to right or right to left, may be defined at the convenience of the programmer, for example by passing all immediate events, whether user or machine originating, to "runFuncArray[ ]" which is a hopper or execution stack, to call "cubeFunc" functions serially. The "runFuncArray" command on a data level is a dynamic 1D array of strings that each correspond precisely to component labels in a component library. Queued, or upcoming events are pushed to a "nextFuncArray[ ]" command, which is similar to "runFuncArray" but becomes the next component execution stack.

A component function database, also known as cubeFunc database, which may be modeled on a name-to-function paired lookup table, may be used to apply unique names to components so that attributes or functionality associated with a selected component may be executed by invoking the component's unique name.

In the dynamic multi-dimensional visual programming environment described here, functionality may be associated with an entity by associating the entity with a component having instructions and data that may invoke the desired functionality. A Code cube may also build new functionality in pieces that interoperate without a new component. The 'cube type' name unites the style and the functionality in an entity, and style, function, and a unique name is what distinguishes one type entity from another.

The 'names' function will execute on the entity represented by a graphical item at the grid address, returning the name(s) of that entity. As an example, a component named "grass" may be associated with an entity having its graphical item (a "cube") at location (X,Y,Z) on the grid. Naming a cube "grass" does not in itself impart grass-like characteristics to the cube or to the entity that it models. In order to impart grass-like characteristics, a developer associates code to a grass cube, by either providing data and instructions related to grass characteristics, or pointers to same.

In an exemplary but not necessarily preferred embodiment, the component registry may be modeled on a lookup table that identifies components by names and includes attributes or functionality associated with a named component. Thus, the cubeFunc database organizes and stores definitions and names for functions or pointers to such. The "addVoxel" constructor may also have code for executing the functionality or pointers to such code.

Returning to the example of a "grass" component, in operation, a processor such as processor 114 in FIG. 1A may make a request for an action associated with the "grass" component by transmitting the name "grass" to a lookup table in RAM and a graphical item's grid address to access a function found by cross-referencing name-to-function in RAM. The lookup table, which is created and maintained by the browser DOM (described in further detail below), allows the dynamic, polymorphic multi-dimensional visual programming environment to associate a unique word, like "grass", with a set of visual, text, and other data nodes. The name "grass" would return, for example, a list of DOM object links to each grass cube, being an instance of the grass component, in the world.

Due to standard operation of the StringWorld "AddVoxel" function process, each cube contains an attribute in the DOM called "position" which exactly reflects its (X,Y,Z) grid address in the dynamic, polymorphic multi-dimensional visual programming environment. This (X,Y,Z) address is an information and execution link to the live, active StringWorld database.

There is also, loaded into each face of any cube created by the environment, a pointer back to the grid address of the originating cube. Therefore, in the DOM, an attribute exists for each of six faces of each cube in the environment stating which (X,Y,Z) grid address the side belongs to, along with metadata for which side such as "front", "back", etc.

Having found the graphical item's grid address, the processor can access a function found by cross-referencing the component name using the cubeFunc database to a function in RAM.

In the case of multiple entities associated with the grass component, numerous graphical items will demonstrate the "grass" functionality at the numerous locations in the grid. For example, using a visual example, in which the "grass" component imparts a wiggling, spiky green plant growth, graphical items will demonstrate a wiggling, spiky green plant growth. Characteristics of the wiggling, spiky green plant growth (such as density, height, extend and direction of wiggling) may differ among the multiple graphical items at multiple locations on the grid, the differences of which, in some (but not necessarily preferred) embodiments, may be imparted by use of sub-components of the "grass" component, described in further detail below, or by including functionality in the "grass" component to alter its own members' appearances in a categorized or randomized manner.

In an example of developing software code, a developer may choose to create an informational workflow to visually interpret and easily edit an image media query to an information source of images, such as the Wikipedia™ on-line encyclopedia, which is available from the Wikimedia Foundation of San Francisco, Calif.

The software system for the information workflow may be modeled with the following component or cube types:

Basic Search string: a Code cube block containing basic parameters for querying the Wikipedia™ media library;

Parameter, or text query string: a notepad, or paper cube type that stores plain language search terms, such as "car." This string is quickly editable with right click, rather than having to edit the code cube directly. It also may display the query term helpfully in a large font on the front of a cube.

Search button: This executes the search by "clicking" the code cube which reads the code "next to it" from the query cube.

Output cube(s): One of many display cubes, output cubes are created and loaded with images as results are returned by querying the Wikipedia media library.

On editing the 'parameter' note cube and clicking 'search' button cube, the user may receive the output of the search result as a series of display cubes. For example, searching 'car' might return images of twenty cars, from which may be formed twenty display cubes, each with a different thumbnail and full-size expanded view of the selected image when a user clicks on the associated display cube (operated by display component, value set to the address of the returned query result). These cubes may be cut and pasted or interacted with as typical entities in the dynamic, polymorphic multi-dimensional visual programming environment.

In CSS, the z-index property specifies the stack order of an element. An element with greater stack order may be placed in front of an element with a lower stack order. An index works on positioned elements (position:absolute, position:relative, or position:fixed). Z-indexing of an onscreen item allows the 2D graphical interface to be displayed on top of items in the (X,Y,Z) grid.

2.3. Interrelationships 2.3.1. General

The interrelationships between two or more entities of a COP-based software system may be represented by one or more solid, dashed, wavy or curved arrows, lines (straight, zigzag, or irregular), arcs or other visual distinctions representing the software system elements. For convenience here, the visual representation of an interrelationship will be referred to as a conjoiner.

In certain spreadsheet applications and in certain embodiments of the dynamic multi-dimensional visual programming language of the instant invention, conjoiners need not be a separate data type; they may also be suggestive and invoked by description or GUI interrelationships. In certain embodiments of the disclosed multi-dimensional visual programming language, they may be displayed through adjacencies of graphical items associated with selected components or cube types or by adjacencies of a chain of graphical items so that activation of one cube may be achieved through activation of a "clickCube(xyz)" function or a "clicker" component directly on an adjacent cube on another cube in the chain of adjacent cubes. "ClickCube(xyz)" functions and "clicker" components may be defined to operation in one or more directions from the cube with which they are associated, such as the 'myLeft', 'myRight', 'myFront', and 'myBack' handles described above. When the interrelationships among a set of entities are so numerous that they cannot be displayed by adjacencies alone, other representations of links between entities, such as visual distinctions as described above, or non-visually displayed image distinctions, such as direct pointers to a grid address or a pointer to a graphical item uniquely defined in another way, may be particularly useful.

2.3.2. Link Creation or Modification

A programmer may create a relationship between entities by using the multi-dimensional visual programming environment to create a new link with new data, code, or information to define a relationship, define a conjoiner having a visual distinction for display in the grid to uniquely represent the new link, associate the new link between appropriate entities, and arrange for the new link's conjoiner to be displayed between the graphical items representative of entities so linked. Alternatively, the programmer may use the multi-dimensional visual programming language to copy a link from elsewhere in the software system (or from a library) and alter its associated information to match the desired relationship. Once the link is created from the copied and/or altered link, the programmer may define a conjoiner with an individuality of appearance to uniquely represent it in a display of the new link, and associate it with appropriate entities whose associated images represent the conjoiner representative of the link between them.

Alternatively, target entities may also be linked by altering the visual display of the software system. For example, the programmer may use the multi-dimensional visual programming language to select and copy an existing and displayed conjoiner representing a desired type of link between existing and displayed entities, and to add (paste) the selected conjoiner between graphical items representing target entities. In response thereto, the computer system's client (See FIG. 1B, element 110), which executes the dynamic multi-dimensional visual programming environment, may alter the display of the software system to present the conjoiner in its associated link's individuality of appearance as joining the graphical items representative of the target entities, and modify the information or pointers associated with the target entities to associate the target entities and desired link between them.

Figure 9:
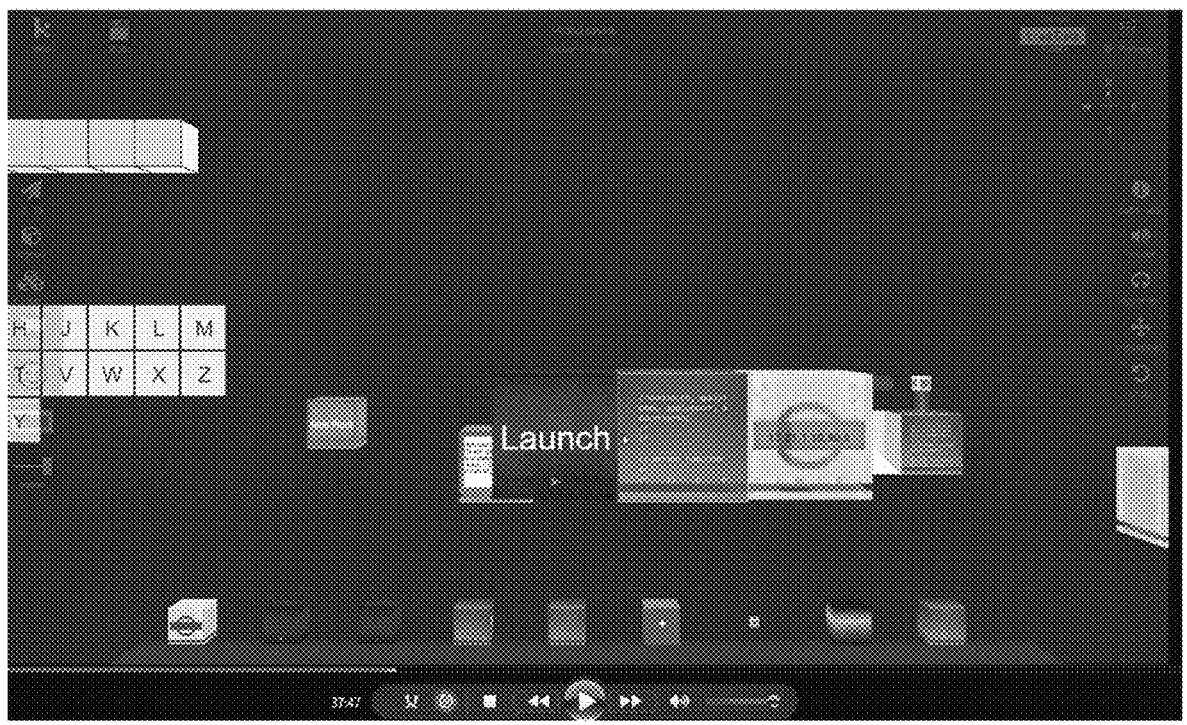
FIG. 9, FIGS. 10A-10C, and FIGS. 11A-11H are screen shots of editor screens in use in developing an exemplary software system using the dynamic, polymorphic multi-dimensional visual programming environment of the current invention.

Alternatively, as shown in FIG. 9, the programmer may define a cube with a launching component to contain or point to code that launches a piece of code associated with a graphical item adjacent or near another graphical item in the grid. Wrapper functions may be represented in the multi-dimensional world by conjoiners, physical connections, clicker or launch buttons, or highlighting to be applied to a cube in which the activity is to originate and potentially to the cube on which the activity is intended to occur.

Associating one entity of a software system with another is not completely compatible with traditional Object-Oriented Programming (OOP), which is based on a hierarchical architecture in which objects are defined as sub-classes of general master classes. Using OOP for visual programming binds the software developer to OOP's hierarchical and defined class foundations, which inherently limits the developer's flexibility. While OOP may be adequate for developers to display elements of a software system, OOP's limitations may render programming of element interactivity more difficult.

3. Use of a Multi-Dimensional Grid for Visual Display of a Graphically Represented COP-Based Software System

3.1. General

Although the visual display of a software system may be presented on a 2D screen or monitor, the software system may be modeled onto a grid, with locations on the grid provided with a grid address such as (X,Y,Z) from the Cartesian coordinate system, or from a coordinate from another suitable coordinate system, or as a vector v=(X,Y,Z); and with graphical items representing elements of the software system assigned to a location on the grid at a specified grid address.

Referring to FIG. 10A, an exemplary empty grid is shown in a perspective view in a 2D display. Each of the squares in a displayed floor of the empty 3D grid represents a grid address (X,Y,0) on the floor ready to be filled with a graphical item. The floor represents a set of addresses that have been given neither form nor function, but each square, such as the one shown as highlighted, represents a grid address. The square may also be considered the feet of a voxel, or, as used elsewhere in this description, a voxel-footprint sized location. Upon which one (and only one) graphical item may be positioned. Although only one floor is displayed, it is to be understood that several such planes exist in the grid along each axis and may be presented in the 2D display of the grid.

The following exemplary pseudocode for a "3D Array definition" command for 3D array creation and operation and basic 3D world operations in a dynamic multi-dimensional visual programming system such as the KREATOS 3D Array Operation (KR3D) language from Fasility, LLC of Wayland, Mass., allows vectors carrying information to describe a location on a grid:

//"3D Array definition"
array3D=[[['0,0,0']]];
console.log(array3D[0][0][0]);
// returns '0, 0, 0'

In explanation, an array of 3D is defined, and a Console.log is a Javascript™ convention, to report the existence of a 3D array to the developer console, and to report that the 3D array may be referred to in the notation "array3D[0][0][0])." Once such is reported to the developer console, a user may access any point in the system as "array3D[0][1][2] array3D[0][0][1]", etc., and the computer system will recognize the references as vectors of information.

Vectors provide powerful, n-dimensional information nodes so that clusters within a vector field themselves may operate on the vector field or provide new data or readable data to be consumed and used in the evaluation of that data field. Therefore, an extensive amount of information may be captured in vectors that can be either used manipulating the model of the software system and in so doing, operate and modify the software system itself.

The 3 closed brackets indicate that array3D is a three-dimensional array. While bracket conventions represent a single set, [x], as a classic representation of a 2D (flat planar) array, an array [[[x]]], with three sets of brackets, represents a three-dimensional array for elements in a multi-dimensional world. The use of the 3-bracket convention enables a model of reference that, when the bracket rotation is used and data assigned to a reference with that notation, a user (and the computer system operating the dynamic multi-dimensional visual programming environment) will recognize that a reference in the notation "array3D[0][0][0]" is an address to an item in the grid and not, for example, a pointer to a shared object.

Organizing the software elements in a grid, with locations on the grid provided with a grid address, facilitates a visual, tangible representation of a software system as a whole and at its element level. A displayed graphical item is associated with a software element representative of one or more features or functionalities, and the item is assigned a grid address based on its location on the grid. The grid address may be used as a database address to a record that may provide visual information and functional information for the software element represented by the graphical item. In a COP-based software system, the graphical item represents an entity and may also present visual information that identifies component(s) associated with the entity.

The lines of code (variables, code) that an efficient developer has to remember is huge. Every developer has a "flat dictionary" of variables and code in his or her memory. Associating names with Code cubes that store a set of lines of code turns the Code cube into a shorthand for the set of lines of code. The grid address may operate as a name for the Code cube at the grid address, so that the set of lines of code are accessible to a programmer by recalling and invoking the grid address. Further, organizing the code within the multi-dimensional model of the computer system in which proximity is meaningful and referenceable (akin to the organization scheme of a paper thesaurus), allows for another tool into retrieval of code and data without resort to extensive memorizing.

Further, a programmer may organize the lines of code associated with a graphical item by subdividing the code into sub-components, which may also facilitate recycling of the code into other entities that may be similar but not identical to the entity from which the code originated.

Locating items on a grid facilitates keeping track of items relative to each other, and in so doing facilitates organization of the software system elements with which they are associated, facilitating keeping track of software elements relative to each other and facilitating modifying the software systems, adding, removing, organizing, moving, and reorganizing software elements by adding, removing, organizing, moving, and reorganizing the graphical items associated with the software elements.

Further, a modifiable visual representation of movable software elements and interrelationships between them may facilitate analyzing, troubleshooting, debugging, and determining the impact of changes in one element or a set of elements on the other elements of the software system, because changes in the software system (reorganizing elements, modifying features, actions, and links between the software elements) may be easily made by changing the physical appearance of graphical items in the grid.

In a COP-based software system, the location of items on the grid may be used, along with the syntax of the employed multi-dimensional visual programming language, to represent the relationship between the entities and components that the items represent. Item grid addresses demonstrate proximity of items on the display, which in turn, based on the syntax, may define the effect of one entity upon another entity of the software system. Further, an item may represent a component that has been subdivided, with the sub-components representing sub-features or sub-functionality, and the grid address of the item may be kept constant so that the item's location stays constant relative to other items on the grid, and the relationship of the entity represented by the item to other entities or components is unchanged while the sub-components undergo alteration.

Sub-components may be utilized as a form of adding a fourth dimension to a multi-dimensional model of the software system under development. Further, subdividing a component into sub-features or sub-functionality facilitates modification of the attribute or functionality represented by the component without losing the display of graphical items representing entities associated with the component and their relationships to other entities. Item adjacencies and other displays of links between graphical items preserve the organization of the software system even while components of the system undergo modification. Further, subdividing a component allows some sub-functionality to undergo modification while other component sub-functionalities remain unchanged, allowing a programmer to analyze attribute or functionality represented by the component at a deeper level of detail. Thus, a dynamic multi-dimensional visual programming environment allows programming flexibility provided by metadata, tags, wrapping functions, and composing functions, without their traditional disadvantages: namespaces and hierarchies that must be mentally maintained by the user.

An anchor may lock an item to a space in the X,Y,Z grid. Anchors may be associated with an item to prevent its movement in the grid while other items are moved away from or nearer to the anchored item. Further, even though the item may be anchored, the functionality of the entity associated with it may be altered by changing the attributes or behaviors is associated with it or by subdividing the entity into sub-components.

An item may have visual information and functional information and may be associated with another item in a way such that the data associated with the other component is not rewritten or impacted in another way. As an example, the rules of the display may provide that display of an item of a selected size and labeled "code" in a certain visual style (hereinafter Item L1) is associated with a defined functionality such that clicking once on the Item L1 causes code associated with an item adjacent to Item L1 to run, but executing an "Alt click" on the Item L1 causes a powerful editor to be invoked.

Knowing the definition associated with an Item L1, a programmer may use the multi-dimensional visual programming language to add an Item L1 to the display adjacent to an Item L3 and to add a conjoiner between items L1, L3 so that Item L1 is conjoined to Item L3 and the code associated with Item L3 may be run by clicking once on Item L1. Thus, a programmer may use and modify as desired any item on the grid with a specified set of functions and behaviors.

Further, it may be seen that any entity may be reprogrammed (have its functionality changed) by altering the item representative of the entity, by altering the physical appearance of the item to alter the component(s) associated with the entity, and also by altering the definitional rules for the component(s) already associated with the entity.

The grid system foundation is particularly useful when it is joined with some of the following features in a visual software programming system. For example, when dynamic multi-dimensional visual programming is performed on COP-based software systems, the placement of items relative to each other may show an association of the entities represented by the items and/or cause one entity to act upon the other, and the movement of items relative to each other may change the association of the entities represented by the items and/or change the action by one entity on the other.

In one example, items B1, B2 representative of entities in a COP-based software system may be placed adjacent to each other on a grid. The syntax of the multi-dimensional visual programming language in use for programming the COP-based software system may define item adjacency as representing that the entities associated with adjacent items have a selected relationship, so that placing item B1 adjacent to item B2 causes the computer system's client, which executes the dynamic multi-dimensional visual programming environment, to establish the selected relationship between the entities associated with items B1, B2.

Additionally, or alternatively, the syntax of the multi-dimensional visual programming language may specify that item adjacency invokes the operation of a subroutine on entities representing adjacent items, so that the entities represented by items B1, B2 will undergo the operation of the specified subroutine upon recognition that the items B1, B2 have been placed adjacent to each other.

A dynamic multi-dimensional visual programming environment facilitates development, management and modification of a software system when elements of the system may be presented in graphical form on a display, with graphical items representing the elements of the software system, with the graphical items having a grid address and movable on the screen, and with the movements of the items triggering operation of the elements, thus facilitating editing and debugging of the system's code and examining the effect of the operation of one element upon another. Such item movements may be adding, removing, organizing, moving, and reorganizing items relative to each other, which constitutes adding, removing, organizing, moving, and reorganizing features or functionality of the elements that the items represent.

Additionally, when the software system is COP-based, the system elements are entities that have a physical appearance that identifies the components associated with the entities, with their interrelationships represented by a conjoiner item or adjacencies in the visual display.

3.2. Conservation of Entities' Graphical Item Locations in the Multi-Dimensional Grid The conservation of locations of graphical items in the graphical model of a software system are conserved such that graphical items representing elements of the software system have unique locations on a grid and only one graphical item may be located at a time in a voxel's grid address in a multi-dimensional world.

Conservation of graphical items in the multi-dimensional model prevents accidental multiplying of graphical items, superimposing graphical items or stacking them on top of each other, and developing confusing pointers to graphical items. It also prevents a common problem faced particularly by new users of visual programming languages, namely of creating a temporary object in the same space as another object under the misperception that their new object is a durable persistent object, and then finding that the temporary object has disappeared when they attempt to perform an operation on it.

Conservation of graphical items in the multi-dimensional model also allows the grid address of an item to be used as an address to a database record in which is stored data or information (such as the type of entity or other definition or functionality) related to of the entity that the item represents. The (X,Y,Z) address of the item representing the entity on the (X,Y,Z) grid (also known as the grid address) may operate as a pointer or vector pointing to the unique location of the associated item on the grid and as a database address to a selected record in a storage that contains information related to the entity associated with the selected item, with the information constituting data, code, or pointers to same in more remote storage.

Each array element in a multi-dimensional world has a string of data associated therewith that would include information about the element and/or the a grid location (X1,Y1,Z1), such as element address, pointer(s) to additional information about the element, data, code, graphical representation of the element (shape/color/size). Previously, in order to bridge between a point in space such as grid location (X,Y,Z) and information in the database that relates to that location in space, a programmer would need to refer to the long string of data associated with the element represented by the item at (X1,Y1,Z1) and pull the necessary information or pointer to the information from the long string.

Providing the database for information related to the dynamic multi-dimensional elements with the same dimensions as the display grid in the dynamic multi-dimensional visual programming environment allows the multi-dimensional coordinates of an item representative of a dynamic multi-dimensional element to operate as an address to the record in the database associated with the dynamic multi-dimensional element. Therefore, the visual programming environment may use a dynamic multi-dimensional element's grid coordinates to refer to a point in space and to point to a record in the database associated with the multi-dimensional element without reference to a long list of accessors required to connect the point in space in the 2D representation of the dynamic multi-dimensional element.

Establishing database addresses that also operate as grid addresses is advantageous in testing and debugging, because, with quick access to information about an entity in a database, a programmer may mouse over a displayed item, and obtain information on the recent history of the item, such as how the entity associated with the item may be used, what access to or interaction with the entity has occurred recently, and/or what was the impact of the access or interaction.

In the description of the "Add Voxel" command described above, it was noted that the entity properties that are listed in the code "function add-voxel" (such as cube-type, value, facing, contact type) are examples of some of the properties that define the attributes and functionality in the complete set of entity types for all of the graphical items in the multi-dimensional model of the software system. A simple taxonomy may be used to distinguish entity types from each other in the entity set. Distinguishing among entity types facilitates accurate, speedy addressing to entity database records so that complex but reliable systems may be created using the available entity types and addressing of records in user bases.

For example, the cubeType in the JSON object may indicate whether the object presents code or a different data structure. In the case of the dynamic multi-dimensional visual programming environment described here, a JSON object may have a subprogram that executes to perform an operation. For example, a cube whose subprogram is "click on this location" may activate an entity whose graphical item is located at the specified address in the grid by using the location address as the database address to identify the record in storage of the software system represented by the graphical item in the grid at the address, which will in turn identify the components associated with the entity and activate the components.

With conservation of graphical item locations in the multi-dimensional model of a software system and use of a graphical item's grid address as the address of its entity's data base record, a complex structure may be quickly and efficiently built and managed. By changing the location address, the execution chain may be passed from location to location (and accordingly entity to entity to entity) so that extensively interwoven structures may be created and operated.

It is to be understood that using the grid address to access information related to the item at the grid address does not restrict the use of virtual addressing or other addressing or pointer technique to manage storage in a computer system. Setting the grid address as the database address to retrieve or store information or pointers is an embedded solution in the described dynamic multi-dimensional visual programming environment and as such does not impact the ability of the computer system to efficiently manage information in other ways.

Conservation of entity locations provides improved data safety for the user and increased stability of the user experience because of the rigor imposed by unique placement of graphical items on the grid. Each entity retains its own address. Even if the graphical item that models an entity is moved around, there is only one graphical item at any given quantized spot and it retains its data. A programmer may clone an item from a first location on the grid and add the cloned item to another location (with the placement of the cloned item forcing a change in the grid address of the cloned item because no two items may share the same space on the grid), but he cannot superimpose the cloned component on the voxel containing the grid address of the original component.

Should the programmer wish to sub-divide a grid address, a new component may be introduced which reads a cubeType of "subdivided" and then activates components stored in the contained grid space. For example, a subdivided cube may be divided into an even integer number of slots, for example 8 cubes which are 50% smaller in each dimension compared to regular cubes, and each stored in the subdivided cube's value as JSON, using instructions that may be represented by the following pseudocode:

```
[1,1,2], //grid X:1, Y:1, Z:2
{cubeType: subdivided,
   contactType: null,
   state: null,
   value: {
     divisions: 8,
     subCubesList: [{cube1 data}, {cube2 data} ... ],
     show-layers: all //may also show top, or bottom, or
       number slices
   }
}
```

To visualize the sub-divided elements, one may switch slices or layers of the sub-divided data on and off so that no data item is unviewable or unclickable due to other data being present.

3.3. Establishing Grid Addresses as JSON Based Data-Model Nodes, Including JS or URLs JSON is an acronym for JavaScript™ Object Notation, a language-independent data format for storing information in an organized, easy-to-access manner and thus facilitating data portability. Establishing database addresses that also operate as grid addresses with JSON based data-model nodes, including JS or Uniform Resource Locators (URLs), is an extension of conservation of entity locations in the multi-dimensional component system. A unique grid address of a selected item may also locate the database record of information related to the entity associated with the selected item, with the information constituting data, code, or pointers to same in more remote storage.

An example of how to provide a JSON object definition for a voxel in the described dynamic multi-dimensional visual programming environment is shown in the following exemplary pseudocode for a "JSON Object Definition for Voxel" command:

```
//"JSON Object Definition for Voxel":
MyVoxel={
   xyz: [0,0,0],
   cubeType: paper,
   value: alert('this is code!'),
   facing: south,
   contactType: solid (physics properties)
}
addVoxel(MyVoxel, [1,1,1]);
//adds a new voxel of type "default" or "basic" at grid
   X,Y,Z:<1, 1, 1>
//addVoxel, as a function, generates a JSON object, stores
   it in "StringWorld",
// and then generates visual styles and stores them in
   "VoxelWorld" database
```

One advantage to constructing the grid address/database address as JSON data-model nodes is data portability, so that meaningful data and cube worlds may be reused in other applications.

A JSON description of a warehouse inventory, for example, may be loaded into the dynamic programming environment to run accounting or inventory visualizations, and then returned to the same site as JSON to be used in the external site without having to reformat or convert it to a separate format.

Entities may have a payload that may or may not be in JSON format. In many conventional entity component systems, an entity has no data of its own associated with it. In one embodiment of the dynamic, multi-dimensional visual programming environment disclosed herein, an entity may both store and retrieve data and instructions. Further, a user may access data and instructions specific to the first entity to invoke functionality, but the data and instructions may be stored in or invoked by a component that is associated with a cube at another grid address. Thus, an entity's data and instructions may be separate from its components.

For example, the first entity modeled by a first graphical item may carry a "click" functionality to run a selected component associated with another entity modeled by another graphical item at a selected grid address, for example, to change the length of grass at grid address (0,0,1). Upon a user clicking the first graphical item, the selected grid address is used to find the other graphical item, and the selected component is looked up and is instructed to start running.

A developer may change the data specific to the click functionality; for example, he or she may change which component, which graphical item, or which grid address to invoke. If the graphical item associated with the selected component is moved on the grid, the developer may change the grid address of the graphical item (or the grid address may be automatically updated when the graphical item is moved). However, should the developer want to change the functionality of the selected component (for example, to change the length of the grass at a desired grid location), the developer may access and alter the stored data and instructions of the selected component, not any of the graphical items or entities with which the selected component is associated. Therefore, without separately changing the component being invoked, a click command may invoke a component to make a change to the length of the grass at grid address (0,0,1), without the length of the grass at grid address (0,0,2).

3.4. Interpreting Each Grid Address or Data Node as 1) a Program and 2) a Style Defined by a Component With definition of the multi-dimensional world by quantized space and enforcement of graphical item placement within that quantized space, the attendant uniqueness and stability of location of graphical items in the grid makes possible imparting software functionality to software entities based on the grid addresses of one or more graphical items that model the software. Certain styles, like visibility or height and width dimensions and positions of surfaces, may impact functionality in practical ways. Further, because CSS is compatible with most modern applications, the attendant uniqueness and stability of location of graphical items in the grid may make possible imparting style to software entities based on the grid addresses of one or more graphical items that model the software.

Components may be assigned to entities through direct addressing (in which a target entity is identified via its model on the grid which may contain internal instructions on which grid address will be referenced and/or activated), absolute addressing (in which the target entity is identified with a direct reference to the grid address of its multi-dimensional model in content associated with an entity that has functionality to act on a target entity), and relative addressing (in which the target entity is acted on by an entity with action functionality because the target entity meets specified proximity criteria in content associated with the entity, the specified proximity criteria being based on the locations of the multi-dimensional models of the entity and the target entity).

As an example of direct addressing, a user may click on any face of a graphical representation of a cube without knowing its address, and an internal grid address (grid address (X,Y,Z) instruction will pass those details to the main execution stack. As an example of absolute addressing, a component (such as a Trigger, Click, or Code cube component) associated with a first software entity may be defined with instructions to cause an entity associated with the component having the functionality to act to impart a selected style and selected behavior on a target entity that is modeled by a graphical item in the grid that is located at a specified grid address.

As an example of relative addressing, the action component may be defined with instructions to cause an entity associated with the action component to act to impart the selected style and selected behavior on any entity that meets specified proximity criteria that are based on the grid location of the multi-dimensional model of the entity associated with the action component.

Examples of proximity criteria include:
Adjacency to or contiguousness with the graphical item associated with the action component or proximity within a selected number of voxel lengths from the graphical item; and
Direction from the graphical item modeling the entity with the proximity criteria in its action component (using positional component handles such as "facing" to identify the orientation (north, south, east or west) of the entity's graphical item in the grid, and component handles such as "myLeft", "myRight", "myFront", "myBack", "myTop", "myBottom" to identify the direction from the graphical item associated with the action component of candidate graphical items).

It should also be noted that an entity associated with an action component and bearing proximity criteria may be arranged to perform its programmed actions upon execution on any entity with a graphical item on the grid at a location that fits the proximity criteria, even if no graphical item on the grid meets the proximity criteria. If no graphical items meet the proximity criteria, the entity executes, but the executed action has no impact on any entity.

In other embodiments, an entity associated with an action component and bearing proximity criteria may be arranged to perform its actions upon execution only if the proximity criteria have been met. In such an embodiment, if no graphical items meet the proximity criteria, the entity associated with an action component does not execute and no action is performed by the entity.

The following components may be defined to provide selected functionality and style to their associated entities and the graphical items that model their associated entities based on direct, absolute or relative addressing:

A Clicker component, which allows a first entity to invoke behavior and style in another entity which has a multi-dimensional model graphical item that is adjacent to the graphical item that models the first entity;

A Trigger button, which allows the entity to trigger behavior and style in another entity;

A Launch component, which allows a line of entities to launch;

A Code cube component, which allows for associating value (text, data, code) with the entity with which it is associated and allows for executing the value;

An AddVoxel component, which allows for adding a graphical item to the multi-dimensional world; and A RemoveVoxel component, which allows for removing a graphical item from the multi-dimensional world.

A Clicker component that is associated with two or more entities may cause conflicts in the order of execution of entities. Conflicts may be resolved using conventional mechanisms in control software for the processor as to which entity to allow to go forward first. If the execution of the one entity is selected and results in an ending of a set of execution, the system may back up to the unchosen entity to allow execution of the originally unselected entity. The Clicker component may itself be associated with code and instructions that re-order an order of execution, deprioritizing execution of one cube in a frame in favor of another in a manner predetermined by the developer of the software system being operated.

In forcing a decision by the control software of the processor as to order of execution of graphical items, the control software may look to the images on the top of the cubes in FIG. 8B, which are Clicker enhancements 842, components that allow directional activation of neighboring cubes. A developer may position Clicker cube enhancements 842 to provide a cube with the functionality of triggering activity in another entity. In operation, when a user clicks on the 2D display of the Clicker enhancement 842, the clicking action causes execution of the code associated with the entities modeled by the graphical element that is located on the grid next to the Clicker enhancement 842 in the direction(s) that the Clicker enhancement 842 points.

FIG. 10B shows a text string that is entered into the text space of a "Text world" screen in the example presented below of multi-user environments. The text string shows definitions of graphical items at specified grid addresses. For example, the first grid address definition is

[12, 16, 0],
{cubeType: button,
 facing: south,
 state: null,
 contactType: null,
 value: MyButton, 28 px, RGBA(255,255,255,1), [15, 15,0]
}

*note—quotes and slashes have been omitted for legibility

Figure 10C:
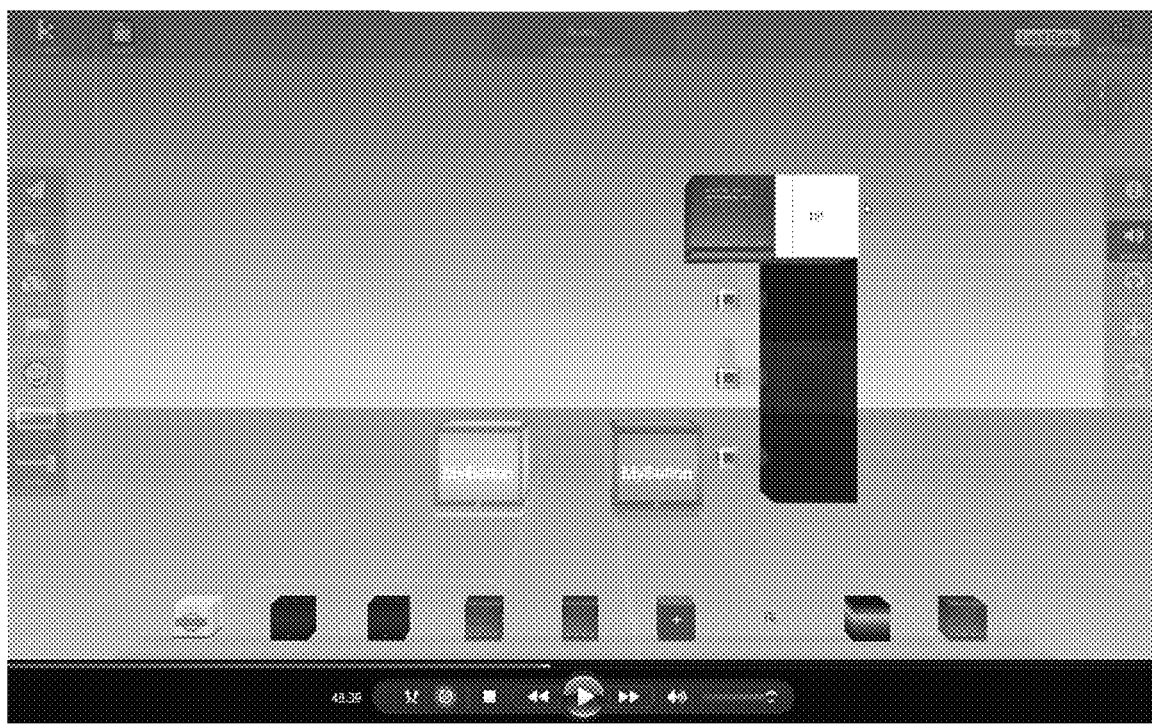

This particular grid entry defines a cube at a grid address [12, 16, 0], expanded internally to refer to (X:12, Y:16, Z:0), to be a south-facing button cube of "null" state and "null" contact type, meaning it is not in a custom activity state or being collided with, and bearing an edge and the text "MyButton". The RGBA color defines a color to paint the whole button cube in the world, and the grid address (X:15, Y:15, Z:0) will be the target address for the cube to activate, with a virtual user click. The cube so defined may be seen in the grid shown in FIG. 10C, another screen shot used in the multi-user example.

Technically, the multi-dimensional graphical item, which, for example, targets grid address [15,15,0], models an entity of the COP-based software system having a button component associated with it, where the button component provides the functionality of assigning a color, edging, orientation, and label to the graphical item and a button with triggering capability to click on a grid address. Note that the addressing here is not like the earlier described Launch cube, which launches items that are to the right of the cube. The cube so defined here performs an operation on an item at a distinct address. It can be seen that a developer may invoke operations on an entity in multiple ways:

By directly triggering the graphical item that models the entity directly,

By triggering that item with relative addressing like "myLeft" and "myRight", or By absolute addressing.

3.5. Use of a Multi-Dimensional Model to Display Causality of Action During Program Execution Generating a multi-dimensional model of a software system under development in which dynamic multi-dimensional structures model software entities allows for a display of interrelationships between software entities and by extension the flow of causality through the software system. Interrelationships among software entities are displayed in the model through visual tools such as proximal placement in the grid of graphical items that model entities that interact, placement of visual links between graphical items that model entities that interact, and placement of Clicker cubes adjacent to the cubes to demonstrate the flow of triggering throughout the software system.

Such visual tools direct flow but do not dictate flow, nor do they prevent more than one flow from propagating simultaneously through execution of the software system. Further, the visual tools may be manipulated to allow flow through a subset of the graphical items to allow for analysis (for example, debugging) of a portion of the software system. In a software system that has been organized hierarchically, activation of a portion of the software system may be restricted to software children objects by inactivating flow between the parent objects.

In the system 100, flow may be restricted more flexibly, to objects at any level of the program, by temporarily moving the visual tools (like links or enhancements) or by moving a graphical item modeling an activity that is not part of the portion of the software system under investigation. In this way, a graphical item that it is no longer adjacent to a graphical item modeling a proximate action may not be activated, so that flow is stopped.

The visual tools also allow a spectrum of what is causally linked to what else, and how that link is visually represented. Some tools, such as Clicker cubes, provide a strong visual path through the (X,Y,Z) grid to show a causal clicking chain. Other tools, such as the Button cube, can click a neighbor or a distant grid address and may register a first and last click, rather than each step along the way.

In addition, the tools allow programmers to click a graphical item, to which is applied proximity tools or links, to allow for chains of behavior emerging out of one activation click. In this way, a "domino effect" may be achieved simply by placing either a Launch cube or a Clicker cube to set many processes in motion at once.

3.6. Multi-Dimensional to 2D Translation

A two-dimensional representation of a multi-dimensional world of graphical items may be accomplished by using any conventional translation system. For example, a two-dimensional representation of a 3D world of graphical items located on a grid display may be accomplished by using a conventional multi-dimensional to 2D translation system such as the 3D to 2D translation system available with the THREE.js™ cross-browser JavaScript™ library described above. In other not necessarily preferred embodiments, the translation may be implemented using cross-platform and language-independent application programming interface such as the Document Object Model (DOM) API, which is a hierarchical definition of a web page, and its scripts or programming languages.

The DOM is defined by the Web Hypertext Application Technology Working Group (WHATWG) community, which is steered by the Mozilla Foundation and the Mozilla Corporation, Apple Inc., Microsoft Corporation, and Google LLC. The DOM is a well-known definition for accessing a loaded HTML page in a browser window. It does not dictate COP or OOP, but resembles both with constructors, "elements" similar to objects, and "get-Attribute" or "set-Attribute" style functions that provide encapsulation and separation between classes of element and the overall data structure. DOM has no multi-dimensional object or visualization tools of its own, although its CSS3D specification does provide planar transformations.

Since modelling HTML, SVG, or XML documents as objects is not part of the JavaScript™ language, the DOM model represents a document with a logical tree. Each branch of the tree ends in a node, and each node may contain objects. DOM methods allow programmatic access to the tree to change the document's structure, style or content. Event handlers may be attached to nodes and activated in response to receiving an event.

While the grid and the elements located thereon may be displayed on the two-dimensional computer screen, the display is changeable to present views of the grid on the screen from multiple viewpoints within the grid and outside of it. For example, features like "zoom-in," "zoom-out," "fly-over," and "peek-around" may provide flexible viewing of the grid and the elements on the grid.

3.7. Camera

In certain, not necessarily preferred embodiments, a camera is provided to define a user's viewpoint in the display. A grid address, e.g., (X,Y,Z) coordinate may be associated with the camera, and a camera vector developed to operate as a displacement vector between the user and graphical items in the display. The camera vector provides the ability to perform contiguous processing—the camera vector is kept track of as a displacement vector. The camera vector is a CSS transform being interpreted through the displacement vector, even though the display is presented on a 2D surface.

3.8. "Peeking Around the Neighborhood"

Occasionally, it is useful to analyze not only the behavior of a selected entity or component(s) of the selected entity, but also the behavior of entities or components related to a selected entity. Graphical items that are on the grid nearby the selected item are likely candidates for such analysis because they are likely to have direct or near relationships with the selected entity.

The definition of the multi-dimensional world by quantized space and enforcement of conserved graphical item placement within that quantized space allows for the development of functionality to search for entities that are modeled by graphical items in the multi-dimensional world and are proximate to each other in the grid, according to criteria that may be defined by the searcher. The proximity criteria may include not only a search along the X, Y, Z directions away from a desired location on the grid (implemented, for example, by incrementing and decrementing grid addresses), but it may also include searching around a grid location using a measured distance from the desired location.

Typically, ray-casting (ray-surface intersection tests in computer graphics and computational geometry) is used to determine the object selected by a user click, to identify proximal collisions between items, to remove hidden surfaces, and to help render volumes. However, ray-casting is not conventionally applied to 2D environments on the web, because a click by a user on an object returns that object directly. By using conventional HTML elements to represent a multi-dimensional space, no ray-casting is needed to allow the user to activate cubes at any distance.

A tool based on the conservation of item locations in dynamic multi-dimensional visual programming may provide "peek around the neighborhood" functionality to identify graphical items nearby on the grid to the item representing a selected entity. If desired, this tool may conduct controlled testing of the entities that the nearby items represent.

"Peeking around" a selected item on the grid (the "neighborhood" tool) may be accomplished by incrementing or decrementing selected values of a grid address of the subject item to find items adjacent to the subject item. For example, if the selected item had a grid address of (10,10,10), the programmer may invoke a conventional software program or a functionality of the multi-dimensional visual programming language to increment the value of the coordinate for one axis of the grid address, such as (10,10,11), (10,10,12), and so on until an adjacent item is found; and then he may use the grid address of the adjacent item as the database address to a record for the entity associated with the adjacent item, and run tests on the identified entity to analyze its behavior and understand its operation and context. The value of the coordinate for the same axis in the grid address for the subject item may also be decremented, such as (10,10,9), (10,10,8), and so on until an adjacent item is found on the other side of the subject item. Further, the values of coordinates for another axis in the grid address for the subject item may also be incremented and decremented to explore the item's "neighborhood" for other adjacent items. Further, the values of the grid location may be modified using more than one axis at a time (searching along diagonals) to find adjacent items.

The "neighborhood" tool is helpful for speeding up coding and debugging, especially for inexperienced coders, because it allows an intuitive control of the testing space. Targeted testing by subspace allows pinpointing of the source of a coding problem without using a lookup table.

An example of how to scan 3D Arrays with conventional iterators, and how to activate a cube, to facilitate scanning of whole arrays, is shown in the following exemplary pseudo-code for a "3D Array Scan" command to scan a $32^3$ (32 cubed) 3D space (being a 3D array of size 32×32×32):

```
// "3D Array Scan"
// this is an example of scanning the 3D array with
    conventional iterators i,j,k
// any "empty items" are not returned (i.e. are ignored)
for (var i=0; i<32; i++) {
    for (var j=0; j<32; j++) {
        for (var k=0; k<32; k++) {
            if (typeof array3D[i][j][k]!=='undefined') {
                console.log('position:', Env.active.Voxel-
                    World.getAttribute('position'));
                //this would show the position attribute in the
                    browser console
                return array3D[i][j][k];
            }
        }
    }
}
```

The exemplary scan operation is constructed to review defined locations in the grid. The scan operation may be considered a type check that reviews only defined locations (grid locations that are associated with a voxel). If a location is undefined, it is passed over (not reviewed).

The scan operation may step through all locations of space and identify whether a voxel is defined at a location. Such operations, often called global scans, involve running a program that steps through a list of $32^3$ (or 32,768) possible (X,Y,Z) grid addresses to checks for grid addresses that are identified as "undefined" or "has a value." While the global scan is performed almost instantly using current computer technology, a global scan is not always the most efficient process for identifying the location of voxels. All voxels will be identified in a global scan. Other type scans identify a smaller number of voxels. Specifically, one type of scan, a "neighborhood scan," an area or volume (a "neighborhood") is defined around the grid location of a selected cube, and the grid locations in the defined neighborhood are scanned to identify the voxels that are proximal to the selected cube. A neighborhood scan is efficient because cubes related to one another are very often placed next or near to one another. Therefore, the voxels located in a neighborhood scan are more likely to be related to the selected cube.

The scan presented in the "Add Voxel" command described above is similarly efficient because it scans its own target, rather than scanning all voxels using a global scan. The "clickCube" command, which activates the cube (a graphical item) at a selected location, provides instruction to the client computer to look up the components associated with the entity represented by the cube in the "cubeFunc" component function database, which may be used to hold definitions for functions that can be invoked by name and coordinate, and employed to operate the function at the coordinates, with a lookup table. The functionality of the looked-up components may be executed by the client processor on the data contained in the StringWorld entity at that (X,Y,Z) grid address.

The described "clickCube" code instructs the client to activate the functionality of components of the entity representing the cube without additional intervention by the developer or the computer system operating the software system, which makes execution of a visually presented software system close to operation of an appliance: because of the association of components to entities of a software system, a developer and operator may "press the button" and watch the system operate.

"Peeking around the neighborhood" functionality provides for a portion of the software system rather than the entire software system, to be scanned. This may be valuable in many use cases, including debugging. When selecting a neighborhood to evaluate, a developer may select a portion of the multi-dimensional model of the software system, for example, the sub-space near to a grid address (L,M,N) or near to the line between grid addresses (X,Y,Z) and (A,B,C). In one embodiment, a "movement" function creates an anchor that represents one end point of a rectangular solid (also known as a "cuboid") on the grid, and then another anchor that represents another end point of the rectangular prism along a diagonal of the rectangular solid, and operates in the sub-space defined thereby to identify and select the identified graphical items. This avoids the need to refer to lookup tables or other stored information, or pointers to same, or to an Integrated Development Environment (IDE) to perform the desired operations.

Searching for a set of entities that are modeled by graphical items in the multi-dimensional world located near to each other in the grid (so-called "peeking around the neighborhood") has benefit because it is useful to analyze not only the behavior of a selected entity or component(s) of the selected entity, but also the behavior of entities or components related to the selected entity. Graphical items that are on the grid nearby the selected item are likely candidates for being related to each other. Peeking around the neighborhood is also helpful in debugging.

3.9. Processing the Entity's Value as Arguments, not Creating Entities from Code Values Not every command or line of code needs to be translated into a visual element or to take up a grid address. Examples are formulas in the Microsoft Excel™ spreadsheet program. A user does not see a cell formula, such as "SUM(A1: A1000)," unless he or she decides to edit the cell with which the formula is associated. Instead the user sees a representation of the formula.

Similarly, information associated with an object or its components is isolated from information associated with other objects adjacent to that first object. Changing one object will not necessarily affect its adjacent objects, unless adjacency is required by the action being applied, like watering a group of flowers instead of one flower by itself.

3.10. Executing the Dynamic Multi-Dimensional Visual Programming Environment on the Client-Machine with Multi-Dimensional World Data Sent to a Server for Storage The dynamic multi-dimensional visual programming environment may be executed on the computer system's client (as opposed to executing the environment on the server) and the server may be employed to store data relating to the state of the software system as modeled on the grid, which frees the server from processing complex interactions, allowing the server to engage in speedy transfer and management of data. In one embodiment, the server may be employed to store data relating to a single state of the software system.

Thus, data related to a state of the multi-dimensional world may be requested by the client in a limited number of requests and the data may be sent to the client in a limited number of transactions rather than the client having to request and the server having to send the data in multiple chunks, which would have been necessitated were the server also occupied with processing complex interactions. In one embodiment, data related to a single state of the multi-dimensional world may be requested by the client in a single request and the data may be sent to the client in a single transaction.

3.11. Executing a Dynamic, Multi-Dimensional Visual Programming Environment without Additional Hardware or Compiled Software Previously, creating a meaningful multi-dimensional interactive environment required additional hardware or compiled software. Often it required downloading an extension separately, or using extensive pre-compiled software (for example in the C++™ general-purpose programming language, or the Java™ general-purpose computer-programming language), or using other code compiled on a server and sent to the client for execution.

Independence from precompiled software execution frees the developer from having to compile his or her world into binary and then run it. Instead, the world is executed on demand, without a further code download or compile process. This makes the developer's world more robust. Even if Wi-Fi or remote resources are not available, the developer's code is likely to run under any circumstances.

As described in greater detail below, 3D CSS camera-like behavior may be achieved using a rapidly updated single text string for the entire scene. The CSS transforms and translations of 3D or rotations of 3D properties are well known to average developers but using the dynamic multi-dimensional visual programming environment here described allows a single string CSS transform to update a whole HTML5 world efficiently by minimizing hardware graphics draw calls.

Existing solutions typically rely on the WebGL™ web graphics library, or another conventional graphics language, to show complex geometries at very low latency under 20 ms per frame (or 50 fps). The WebGL™ web graphics library is a JavaScript™ API available from the Khronos Group of Beaverton, Oreg., for rendering interactive 2D and 3D graphics within any compatible web browser without the use of plug-ins. Other solutions typically rely on the HTML5 Canvas element, which is part of HTML5 and allows for dynamic, scriptable rendering of 2D shapes and bitmap images. The HTML5 Canvas element is a well-documented 2D array of Red-Green-Blue-Alpha (alpha meaning opacity) pixels inside a web-page that can also depict 3D geometries if one creates a library to convert those to a 2D output, similar to WebGL. The HTML5 Canvas element is a low level, procedural model that updates a bitmap and does not have a built-in scene graph; however, through WebGL™ the HTML5 Canvas element allows 3D shapes and images.

These conventional solutions may be described as 3D geometries being converted via mathematical functions to a 2D pixel display which fits in an HTML webpage as a flat panel; however, none of them have the following features:

Clickability, or assigning links and code to click-sensitive surfaces and buttons;

Text entry and export, or the ability to easily create text areas and highlight pieces to copy and paste to the system clipboard;

Modern web HTTP(S) data pipelines, or the ability to easily import inline frames, commonly referred to as "iFrames," containing entire web applications and HTML-formatted sources of audio, image, video, and data that would be used in modern webpages outside WebGL and HTML5 Canvas elements;

Searchability by modern web-indexing services, such as those available from Google LLC, or simple text.

In contrast, the dynamic multi-dimensional visual programming environment here described is not a 2D pixel grid inside a webpage. It employs a set of multi-dimensional geometries written into the page itself and retains all of the features above through its particular implementation details.

One of the obstacles overcome in using the CSS transform property described, which enables dimensional transformations within a webpage, is the inefficiency of generating a dimensional transform for each point and object in the scene. In the current embodiment, a CPU-efficient text string maintains reasonable frame rates on typical client laptop-style, phone, or tablet devices, so fluidity to the user is maintained.

A dynamic multi-dimensional visual programming environment in a COP-based software system provides a meaningful dimensional interactivity without additional hardware or compiled software by executing the dynamic multi-dimensional visual programming environment on the computer system's client, with reliance on the server to store information related to the environment, and by providing software functionality in which multi-dimensional arrays are combined with CSS transforms to present dynamic graphical items on the array grid on a variable 2D display of the grid.

CSS styled formatting and CSS transforms transform (translate, rotate, scale) items as desired in two-dimensional space, and so develop a changeable display address for an item that is distinct from the item's grid address representative of the location of the item on the grid. As the user's view of the grid changes from, for example, a side view to a perspective view to a top view to a view from another perspective, so does the display address of the item, but not the grid address of the item itself. Therefore, the grid address is available to operate as an address to a record containing information about the entity that the displayed item represents.

A multi-dimensional visual programming language may have functionality to execute the transformations and conversions that may be required to map between the coordinates of a point in a multi-dimensional world and items within an array for the multi-dimensional world. Those transformations and conversions may be performed in any conventional way, for example, by using CSS transforms.

The combination of multi-dimensional arrays, a database with matching dimensions, and CSS transforms that are organized to transform the grid display into a desired view while keeping grid coordinates in compliance with associated record addresses in the database allow quick, automatic access to records in the database associated with dynamic multi-dimensional elements. The grid display may be transformed into a desired view and may keep the multi-dimensional world frequently updated by operating the camera control programs such as the Camera Program 112e constantly or in near-constant use.

The grid coordinates are kept in compliance with associated record addresses by maintaining the software system under development through continual or near continual operation of a software system development software program such as the StringWorld building program 112a and continual or near continual operation of a multi-dimensional world development software program such as the VoxelWorld program 112b, while avoiding overlapping of or permitting interference between DOM elements through commitment to conservation of voxels.

Effective operation of the dynamic multi-dimensional visual programming environment is ensured by the direct mapping of the $32^3$ cubic database array with the $32^3$ on-screen voxel space. Efficient access to the databases of the dynamic multi-dimensional visual programming environment simplifies the associations between visible cubes so that a user, operating on a client processor, may easily locate objects in "neighborhoods", which may be considered to be analogous to adjacent buildings in a physical space.

Access to both a selected voxel and information stored for the selected voxel (and for the entity represented by the selected voxel) and, by extension, the voxels that are contiguous to the selected voxel (and their entities) may be streamlined and simplified through creation and use of a common address for identifying the location of the voxel on the grid and for accessing database records for the voxel.

For example, a process may determine the grid location of their virtual user footing in a 4D world (the grid location provided to the camera program as the location in a grid where the user is "standing") with the vector updated at "Env.cam.trueWXYZ" (where W,X,Y,Z is the virtual user footing in the 4D world). From that vector, the process may quantize the integer values (W,X,Y,Z) and use them as the grid address representing the closest grid address to the virtual user footing. That address (W,X,Y,Z) may refer to the record related to the voxel address representing the virtual user footing, whether or not a voxel is present there. This will provide information relating to the target location, an entity in that location, and provide access to voxels contiguous to that voxel.

Thus, with the dynamic multi-dimensional visual programming environment described here, programmers are able to quickly and automatically bridge between a point in space and information in the database that relates to that space. Further, using the "neighborhood" tool described above, the grid coordinate values of an item in a virtual world may be used to retrieve database records about the entity and component(s) associated with the item and the entity and component(s) associated with the items near the item in the virtual world, because the grid coordinate values of the nearby items are adjacent or near to the coordinate values of the item, and similarly, may be used to retrieve records in the database related to the nearby items. Thus, an easy peek into information related to adjacent components is made efficient.

Further, using grid addresses as record addresses to access data and code for complex information from a client machine of both a component and nearby components simplifies the operation of ray-casting for testing for potential cube collisions or movements, described in more detail above. In the dynamic multi-dimensional visual programming environment described here, in which a voxel may be defined, for example, at a 150 pixel cubed grid space resolution, ray-casting by voxel may be implemented in discrete grid steps of 150 pixel cubed voxels. This makes a ray-casting tool that tests using grid addresses an effective, inexpensive solution for implementing cube activation in the voxel-defined grid.

3.12. Providing Multi-User Perspectives and World Building 3.12.1. General

With a central server, the dynamic multi-dimensional visual programming environment on a user's computer system may be duplicated on computer systems for multiple users, resulting in a shared dynamic multi-dimensional visual programming environment for shared development of the software system.

An example of how to enable real-time multi-user sharing of the described dynamic multi-dimensional visual programming environment is shown in the following exemplary pseudocode for a "Multiplayer On-Switch" command:

```
// Multiplayer On-Switch
    Env.switches.multiSend=true;
    Env.switches.multiListen=true;
    // assume a standard web socket has been setup for
       sending strings
    // similar to add-voxel properties
    websocket.send ([xyz], "cube-type", etc)
    // now receiving clients will do the following to add a
       transmitted voxel
    If (multiListen===true) addVoxel ([voxel properties])
```

3.12.2. Sharing Dynamic Multi-Dimensional Visual Programming Environments by Broadcasting Succinct Location Strings The dynamic multi-dimensional visual programming environment is shareable in part by broadcasting succinct (X,Y,Z) strings with a payload to multiple systems. In a 3D example, a succinct (X,Y,Z) string is a sequence of characters having a data structure that uses a number of characters that is "close" to a lower bound in terms of information theory, but still allows for efficient query operations. Broadcasting succinct location strings having a coordinate and a payload may be conducted in an open channel which may then be sent to multiple systems.

Broadcasting succinct location strings is a proven, stable technique in which information is partitioned and broadcast quickly and effectively using off-the-shelf components to provide efficient transmission of data and code. The technique speeds up network building and environment sharing and is particularly useful in building and operating multi-player systems.

The dynamic multi-dimensional visual programming environment employs succinct location string broadcasting in a less standard way, specifically by using succinct location coordinates with the contents of a cube (representing a single entity and one grid address) and a value payload, and broadcasting the same in strings with similar structure and JSON formatting, of multiple cubes using conventional WebSockets. The content so broadcasted forms the basis of a reconstruction of the multi-dimensional world at a second computer system supporting the dynamic multi-dimensional visual programming environment described herein. The broadcast strings are turned into useable or reuseable code objects in the recipient's multi-dimensional world. Thus, an identical, second version of the StringWorld, ready for use, may be built from the transmitted strings.

3.12.3. Sharing Dynamic Multi-Dimensional Visual Programming Environments by Modelling Parallel Worlds Between Broadcasters Parallel world building may be performed by multiple users who have been granted access to the same world. Two conventional techniques for sharing models of software systems are "merging" and "forking". In merging, code is broadcast from one remote location to another, and is combined into a shareable common world. The combined common world is made available to users, who all access the common world and modify it as needed. In forking, a world is copied; the copies are transmitted to users, who work on their own copies using different channels, and the copies are later transmitted to a processor, which rejoins them.

Merged and/or forked repositories, for management of the modifications performed by multiple users employing forking and merging, tend to be large string collections. Further, with merging and forking, effective version control is required for successful sharing and parallel access. GitHub Inc. of San Francisco, Calif., is known to be a source of merging and forking repositories and the popular version control system "git".

Merging and forking are common techniques for sharing models of software systems; however, merging and forking are not conducive to efficiently sharing multi-dimensional worlds because even in 3D environments, too many choices present themselves in rendering 3D images. For example, several inconsistent standards exist to resolve code conflicts, to track changes in the software system and the 3D world it models, and to integrate version control. The data and instructions involved in managing software edits and in the 3D world that the software represents would be prohibitively complex for use in a real-time, collaborative context.

In the dynamic multi-dimensional visual programming environment disclosed here, parallel or shared world building may be performed by modular sharing of the multi-dimensional world between broadcasters. The multi-dimensional world may be broadcast to users in chunks or blocks and users are given the capabilities to receive as much of the multi-dimensional world as desired, to selectively turn on and off part of a broadcast, thereby copying a selected part of a shared multi-dimensional world. Thus, users can be selective in applying the broadcasted world into their own world. To obtain this access, users do not need to apply the entire multi-dimensional world to view the portion that they want to access.

Providing users with the option of accessing only a selected portion of the multi-dimensional world creates benefits in efficiency for the user because the user is not obliged to spend computer resources to execute portions of the multi-dimensional world that are not of current interest. There is value to the user in being able to process a broadcast of code in blocks and being able to separate those blocks and run sub-functions on only the separated group.

As an example, a first user may want to broadcast an entire software system; and another user may want to listen to a portion of that software system. In this context, listening means that the second user may choose to share the display of the first user's operation of the software system under development, including its multi-dimensional model, but not actively participate in the development effort. The second user may choose to be authenticated for access to the software system and its multi-dimensional model, and be logged into a system server, after which the second user may receive strings sent out on certain ports (which may not necessarily be port 80, a typical HTTP port). These strings come from other users (such as the first user) and contain small chunks of StringWorld data that may be reconstructed into a version of the software system under development and its multi-dimensional world, implemented on the second user's computer system, archived, or ignored. Once the StringWorld is constructed, the second user may be provided with the camera view selected by the first user, or, as described in further detail below, the second user may select his or her own camera view of the StringWorld.

The first user may upload all of the subprograms of the multi-dimensional world to allow the second user to gain access to his or her own copy of the entire software system and its multi-dimensional model, and the second user may choose to download only the subprograms of the multi-dimensional world that represent the portions to which he or she wants access. Broadcasting the multi-dimensional world in selected chunks allows both users their desired permission and access to the software system.

Providing users with the option of accessing only a selected portion of the multi-dimensional world also creates security benefits for the user and the originator of the multi-dimensional world because sharing may be as closely controlled as the users or their collaborators want.

4. Other Embodiments 4.1. Alternative Architectures

Other embodiments may have different hardware/software architectures. The functionality and workflows provided by a system having different hardware/software embodiments such as one shown in FIG. 13, may have functionality and workflows similar to such suggested in the embodiment shown in FIGS. 1A-12H, and implementations of such functionality and workflows may be similar to such suggested in the embodiment shown in FIGS. 1A-12H.

Figure 13:
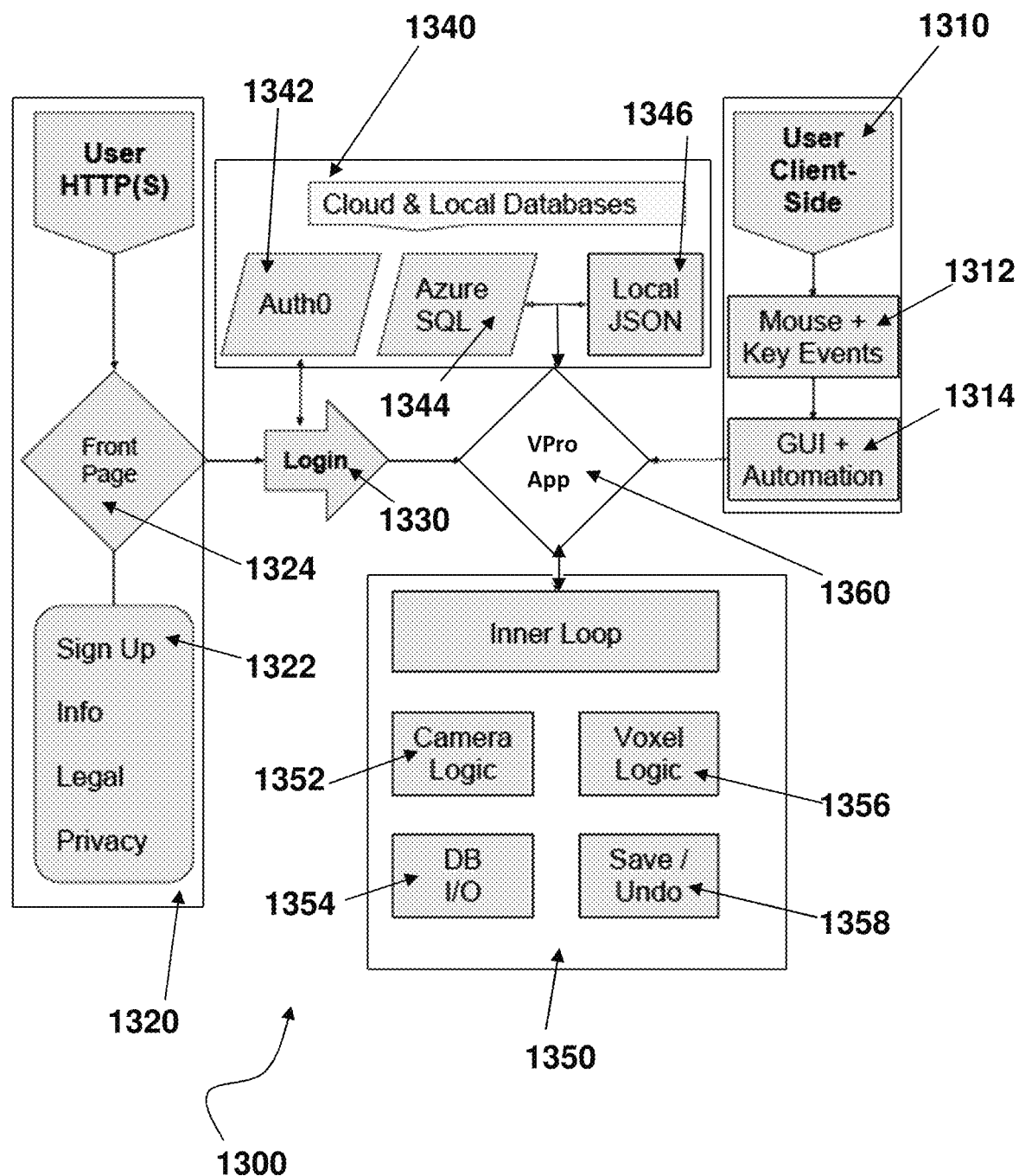
FIG. 13 is a block diagram of another embodiment of a computer-based software system development system using the dynamic, polymorphic multi-dimensional visual programming environment of the current invention.

A system 1300 implemented in accordance with FIG. 13 may have a user/client side 1310 that controls programs related to operational interactions of the user and a dynamic, polymorphic multi-dimensional visual programming environment such as the dynamic, polymorphic multi-dimensional visual programming environment of the current invention, and a user access side 1320 that controls programs for user authentication of, and access to and sharing of a master program 1360 (also known as VPro App) that builds and controls the dynamic, polymorphic multi-dimensional visual programming environment of the current invention, through which are developed the software system and its multi-dimensional model, described in further detail below, and the software system under development and its model.

Referring to FIG. 13, the user/client side 1310 may have programs 1312 for controlling mouse and key events, and programs 1314 for controlling GUI and automation, with the outputs of such programs providing inputs to and receiving outputs from the master program 1360.

The user access side 1320 may provide inputs to a login program 1330 for controlling a user login procedure, including subprograms for controlling the creation, display, storage, editing, operation and testing of user credentials and user profiles, and providing access by the user to the master program 1360I. The login program 1330 may provide inputs to and outputs from the master program 1360 and inputs to and outputs from an authentication database 1342 such as "Auth0" from Auth0 Inc. of Bellevue, Wash., in FIG. 13.

The user access side 1320 may also have a front page program 1324 from which the login program 1330 may receive inputs and to which the login program 1330 may transmit inputs. The front page program 1324 may have subprograms for controlling user access, including a networking subprogram for interacting with a user over a user's remote or local computer, for example, over the Internet, and a user interaction subprogram for controlling display of and access to messaging and forms for the user to use during his or her interaction with the master program, including sign up, login, authentication, or profile screen(s), status and other information, and legal and privacy notices.

The master program 1360 may control creation, display, storage, editing, operation and testing of the software system under development and its model. The master program may also control and arrange for storage of the software system and its multi-dimensional model to (and retrieval from) a system 1340 of local and cloud storage, such as an Azure SQL database 1344 and a local JSON database 1346. The master program 1360 may also control, provide inputs to, and receive output from the programs 1350 for an inner loop, may have camera logic subprogram 1352 for camera functionality, database I/O subprogram 1354 for database I/O functionality, voxel logic subprogram 1356 for voxel logic functionality, and save/undo subprogram 1358 for save/undo functionality.

4.2. Object-Oriented Programming (OOP) Based Software Systems

An OOP-based software system is organized into system entities represented by objects containing groups of encapsulated data and procedures. An object-oriented program is described by the interaction of the objects, and may be modeled in a spatial arrangement of dynamic, interactive multi-dimensional shapes comprising text and graphical images positioned at assigned locations in a multi-dimensional space, which may be rendered into a graphical display on a 2D computer screen.

In an embodiment for a dynamic, multi-dimensional visual programming environment for development, operation, and maintenance of an OOP-based software system, a system developer may design a dynamic, multi-dimensional visual programming environment similar to the COP-based dynamic, multi-dimensional visual programming environment described herein but designed for use in developing OOP software systems by increasing the use of data encapsulation and restrictive class abstraction/inheritance in organizing scenes and cube functionality. To build such an OOP-based dynamic, multi-dimensional visual programming environment, a system developer may adapt or delete the following features of a COP-based dynamic, multi-dimensional visual programming environment:

- Components, such as "Code cube," may be rewritten as OOP classes and may contain data and instructions to access the System or Core Class with access and write functions (also known as "get" and "set" functions, respectively) that did not broadly expose all system and core operations to other classes.
- Cubes may be made instances of a cube class with different sub-classes of the Cube class for variations of functionality, and classes may be constructed such that they are not automatically provided with access to one another.
- Cube Worlds ("Worlds"), StringWorld, and VoxelWorld may be written as classes with constructors and methods for each StringWorld array entry and its associated VoxelWorld entry or graphical representation.
- Databases may be constructed to use particular access and write functions, i.e. "get" and "set, to create an encapsulation layer between the data and the operation of the World, StringWorld, and VoxelWorld classes.
- Grid access may be provided as a method of World, String-World, or Voxel-World classes depending on the desired scope of grid functionality. For example, one World method may be deleting the whole grid; and one String-World class method may be accessing or rewriting one grid item's internal value (which one would separate from World and Voxel class behaviors).
- Calls to and from the execution stack, "(Env).active.RunFuncArray", may be managed via access and write functions. The stack and its dynamic function calls to the Cube class may be handled via methods of the Core class.

To summarize, many basic cube functionalities and overall environment behaviors may be reproducible in an OOP method. Class, constructor, and method organizational structures may be used to avoid reliance on COP structure, and layers of data separation with particular function calls may be used to restrict the sharing of data and access to functions.

5. Uses of a Dynamic Multi-Dimensional Visual Programming Environment: Examples 5.1. A Game Environment In a guessing game similar to the game "Hangman," players guess letters in a word and try to guess the word based on the guessed letters. One common behavior may be assigned to all of the letters—namely, that each letter, when clicked, disappears; and functionality is provided to check whether a "win" or "lose" condition has occurred. In one embodiment of a software system for a word guessing game for the English alphabet, the 2D display of the game board has a "word space" containing a string of blocks to represent the word, a "keyboard" of 26 graphical items to represent the 26 letters of the English alphabet, a button for requesting a new word, and a messaging space which allows a message to be displayed in any conventional manner to the player, such as "Success!" when the word is guessed within a selected number of letter guesses, or "Try Again" when the selected number of guesses have been exceeded. In one embodiment of the game, blocks may be created for the messaging space. In an embodiment that is built to show internal mechanics, not just the front face of the game, the messaging space is activated by a code cube and uses one wall of the included "omega cube" which is a large cube wrapping the entire scene. A new cube type may be introduced to receive changes from the game, or hangman letter cubes, and convert that input to a display.

In one software system for the word guessing game, a list of available words is stored in RAM in the computer system using any conventional methodology. In other embodiments of a software system for a word guessing game, a screen to add available terms to the RAM storage may be developed and presented on a 2D display.

Figure 11A:
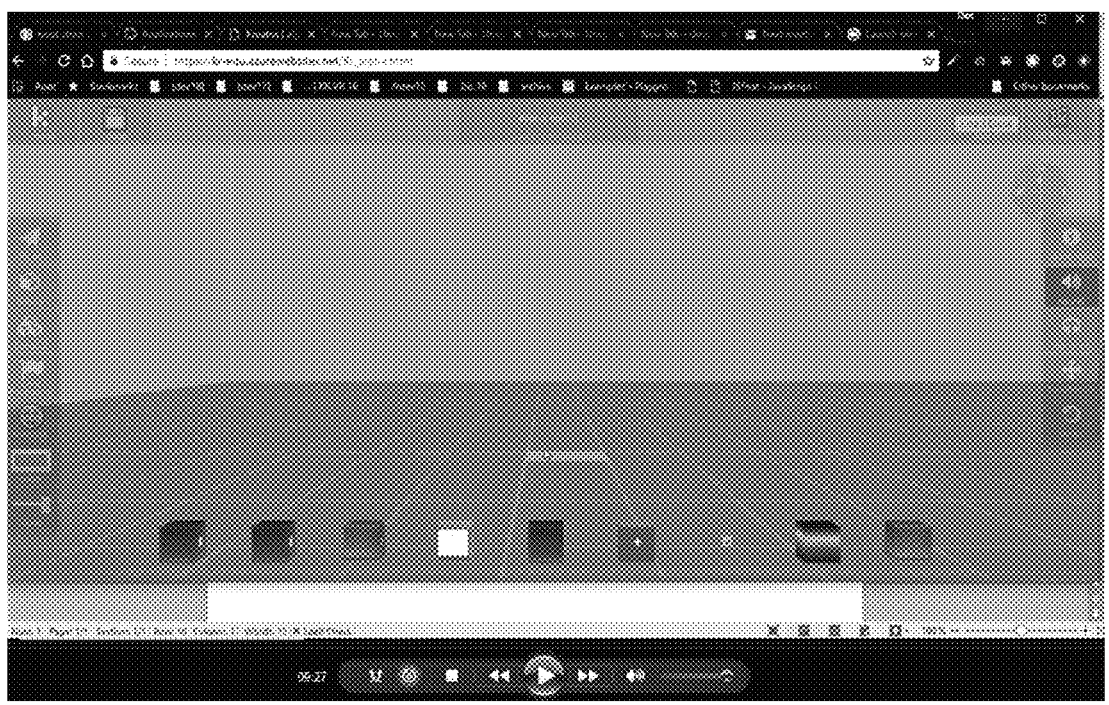
Figure 11B:
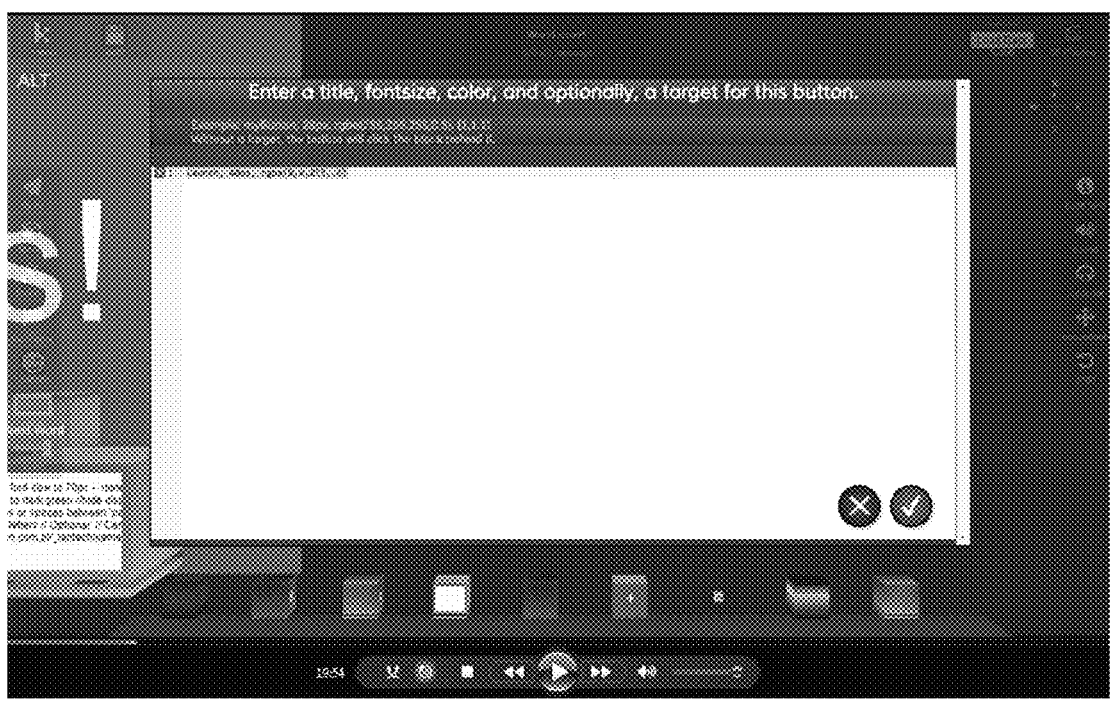

Returning to our example in which the software system is developed in the dynamic multi-dimensional visual programming environment, construction on the game board may start by a developer using a dashboard as a user interface to call for the display of an empty grid such as seen in FIG. 11A (often called "opening a world"). The squares in the floor of the empty grid represent a grid address on the floor ready to be filled with a graphical item. The set of cubes in the foreground represent cube templates available to the developer in constructing software systems.

Figure 11C:
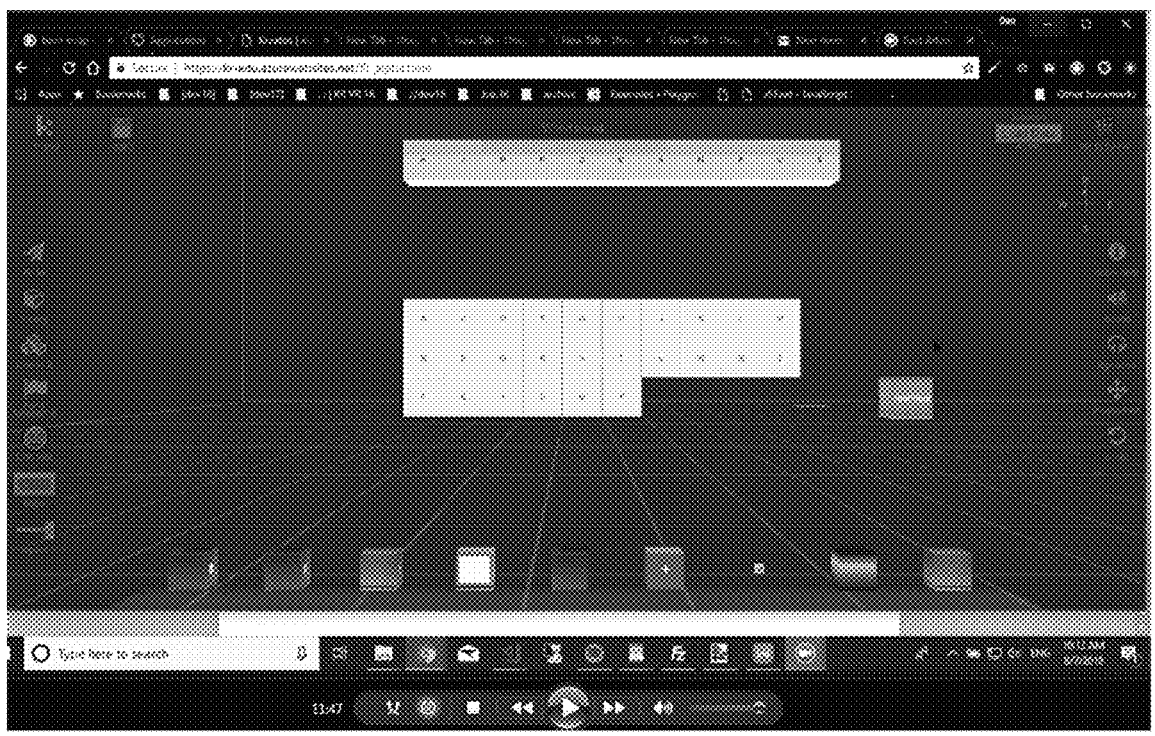
Figure 11D:
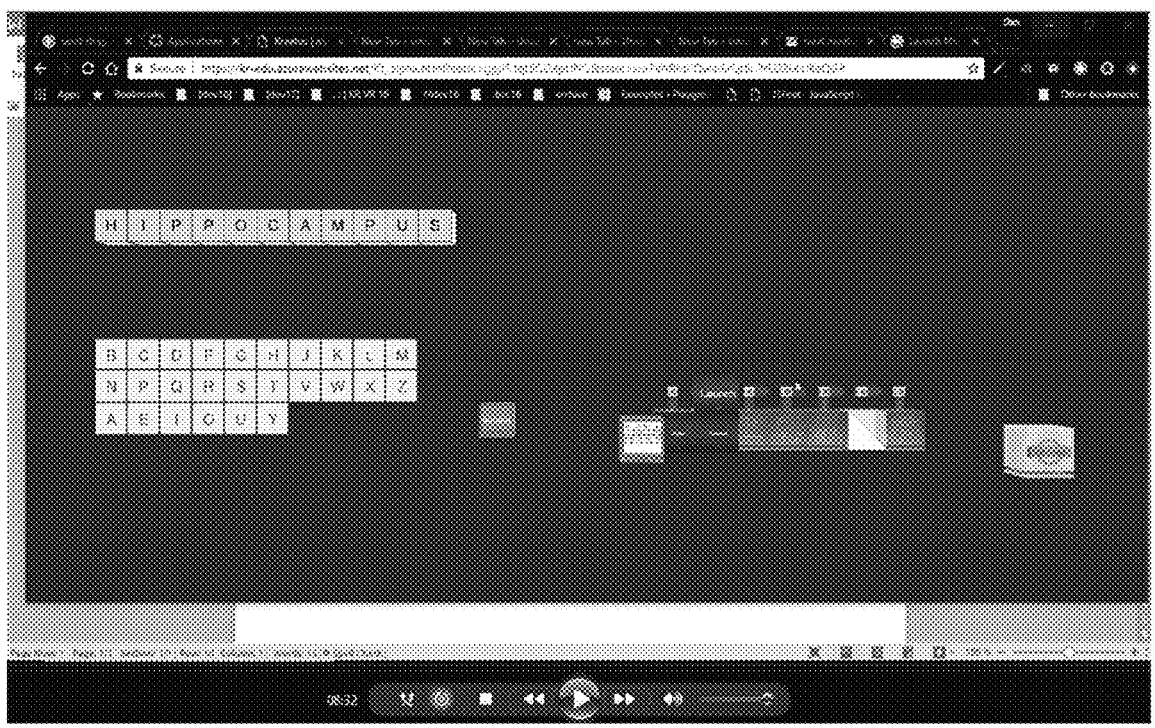

In developing a set of entities to represent the game board in a dynamic multi-dimensional visual programming environment, a developer will create a set of graphical items in the grid to represent a keyboard of alphabetical elements to be visually displayed to a player, a set of graphical items to represent a word space to fill with the letters of the word being guessed, and a "new word" button. In this embodiment, as shown in FIGS. 9 and 11D, cubes may be used to represent the keyboard and a "new word" button, and other cubes may be used to represent the word space.

Starting with developing the keyboard, in the dynamic multi-dimensional visual programming environment described here, it is not necessary for the developer to write new code that will generate the keyboard. Instead, a developer may operate the computer system's user interface to create blocks for the grid to model keyboard keys. In this embodiment, the functionality associated with a keyboard cube will be to display text on its face and, upon activation of the cube, communicate its text to the processor that is executing the game, and, optionally, to change the appearance of a key cube once the letter associated with it has been guessed. Several display options are available to the developer to show key cube activity, such as greying out the key cube if its letter was not found in the word, or highlighting the key cube if its letter is found in the word, but, for simplicity in this embodiment, the key cube is made invisible once it has been used to guess a letter in the term.

To create a functional keyboard cube, the developer may employ the user interface of a computer system hosting a dynamic multi-dimensional visual programming environment to point to and click on a location on the grid (so selecting it) and then create a new empty block to place in the selected location on the grid. The empty cube may be created by selecting "new cube" in a dropdown list, or by selecting an "empty" cube in the templates in the foreground. The developer may then proceed to add components to the empty cube that provide the desired functionality in the new cube. In one embodiment, the developer may open an 'Enter' text screen shown in FIG. 11B to allow a developer to specify the new cube's functionality by selecting the new cube to highlight it, holding down a keyboard key that is defined to be a shortcut over a cube, and pulling the code and instructions associated with the cube into a cut and paste area, which is functionally a clipboard.

In one embodiment, the type of cube that has the ability to be colored and take a few arguments is called a button. The developer may customize the button. The button retains its grid address so that, although the button targets an element remote from the grid location of the button, the VoxelWorld software operates to keep track of the button and its current contents, characteristics, address and functionality, so that no other graphical items are placed into the button's grid location. The button's contents, characteristics, and functionality (its "value") and its grid address are sufficient to carry out the developer's intended action.

The dynamic multi-dimensional visual programming environment's grid address conservation system then provides that no other graphical item will be placed in that grid address, thus preventing proliferation or stacking of graphical items at the address. Therefore, until alteration of the cube's values or grid address are made, the current cube is completely defined by the cube's stored information object within the cube's (X,Y,Z) coordinate grid address.

The current values associated with the cube may be modified by copying text or lines of code and editing as desired. It should be noted that, while the values associated with the cube may change, the new cube may have functionality due to its links to other cubes, and that edits to the content may alter those relationships. When the changes made to the values associated with a cube have been accepted and an instruction (which may be implemented by keyboard shortcut) is provided to ignore the edits, the values will work exactly as expected so long as the links between the cube and other cubes remain operational.

For example, if the link is proximity-based and the revised cube remains in proximity to its neighbors, the relationships remain operational. If the cube is moved away (its grid address changing), the links may also be broken. For example, a "Launch" button may be defined to have value associated with it to execute code at an adjacent cube when it is clicked. The functionality may go further to define the launching functionality not in terms of keeping track of addresses per se, but instead launching whatever cube is adjacent to it. When the "Launch" button is moved to a different location on the grid adjacent to no other cube, it retains its functionality but will no longer click a cube since none are adjacent. The launching code associated with a "Launch" button tries to click any contiguous cube but will not succeed because there are no cubes to click.

In another embodiment, the "Launch" button may be defined to have value associated with it to retain its grid address in memory and execute code at addresses less than a selected distance from the "Launch" button. Such functionality would require the code associated with the "Launch" button to, upon clicking of the "Launch" button, provide for identifying addresses and proximities and execute cubes thereby found in accordance with the explorations and rules imposed in its functionality. The grid addresses may then operate much like an information vector field where information is passed rather than momentum or a conserved physical entity or Newtonian entity passed.

In traditional programming terms, objects have a memory location on a screen but they do not occupy a visual space in any meaningful way. Therefore, it is meaningless to say what is to the left or what is to the right of a given function. A long string of text can define many logical objects, but there is no locational meaning to their definition. In physics, vector fields may be used to map and chart physical phenomena such as magnetism within a space that is not visible but real. With a visual mapping, a scientist may view, map, and track interactions between objects within the space and derive or describe functions for behavior.

To define the multi-dimensional world as though it constituted actual physical space and as though the objects placed onto the grid behaved as physical entities (such as not occupying the same space at the same time) is to develop an information vector field or address matrix, the constituent elements of which may be associated with one and only one set of information at a time, thus preserving the spatial integrity of the objects.

When the software system that is being modeled in a space defined by such an information vector field or address matrix has objects or subprograms that interact, as long as the geometric relationships of the graphical items that model those objects or subprograms remain consistent and the links between those graphical items are preserved, the entire system will behave predictably and consistently, even if graphical items are moved through different addresses, because the grid addresses of the graphical objects themselves operate as entities. The grid addresses are not inherently meaningful, but they are preserved, and the information associated with the graphical items at those locations in them are maintained in a "one-to-one" and "onto" manner so that the content associated with a graphical item is persistent and continues to persist through system changes unless it is acted upon by something else in the system.

As an analogy, consider a long "strong" password vs. a pin code. With a pin code, a user may quickly access information. In a software system in a dynamic multi-dimensional visual programming environment, the information is an entity associated with a piece of software code, and the pin to is the grid address (X,Y,Z) of the graphical item that models the entity associated with the piece of code. Recognizing that inputting a grid address (X,Y,Z) obtains access to the piece of software code associated with the entity that is modeled by the cube at the inputted grid address, developers are freed up to have quicker and more meaningful referencing to the code. For example, one alternative method of obtaining such access involves tedious associating of a large amount of metadata to the piece of code and equally tedious memorizing or cataloging of the metadata or the code to aid in remembering how to access the code.

By creating this Cartesian space identification system to quickly reference pieces of code, a developer may reliably access a desired piece of code without disrupting any relationships that have been established to the graphical item associated with the accessed piece of code, so that the graphical item can still invoke the entity it models to interact with the entities of any of its neighboring graphical items to which it has links Inadvertently rendering internal linkages inoperable is a common problem that developers face. Especially at risk in development are pointers that are internal addresses of objects, because renaming small code changes (e.g. "my_array" being renamed to "my_new_array") could start a chain of operational link breaks.

Alternatively, the developer may select a block that is already capable of performing the desired functionality from the block templates to perform that functionality. The developer may complete the keyboard by repeating one of the above procedures twenty-five more times, or the developer may copy the first key block twenty-five more times and locate the copied blocks on the grid to build the rest of the keyboard.

Once the keyboard blocks are placed in the grid at the developer's preferred locations, the developer may "alt-click" (or right click) to edit an input field to include letters, one for each letter of the alphabet, onto the face of the letter block, organizing the keyboard into a QWERTY or alphabetic style, as the developer chooses. When the developer has repeated these actions for each letter of the English alphabet, and the keyboard is assembled, each graphical item of the keyboard now represents a separate entity and each entity represents a separate letter in the keyboard.

The developer may then create a set of graphical items to model the entities of the word space. The developer may choose to arrange the elements of the word space as he or she chooses, for example, in one long string to spell out the term, or organized into an array or into another desired geometric shape (such as a crossword puzzle grid). The completed keyboard and word space are shown in FIG. 11C.

As with the keyboard development, developers need not write code that will generate the array of fillable boxes. They may provide enough boxes as there are letters in the longest word in the set of words stored in RAM, and hide those that are not needed, per word to be guessed.

The developer also will add components, using one of the procedures described above, to provide functionality to the cubes in the word space:
  To become invisible when it is not needed (e.g., when the word selected for guessing is not the longest word in the list, and the cube is not needed in the display of the word space);
  To allow a selected cube, upon instruction by the client, to be filled in with a letter that has been guessed; and
  To clear display upon operation of the "New word" button at the end of a round of play.

Each graphical item in the word space now represents a separate entity and each entity represents a separate blank space ready to be filled upon correct guessing by a player. As for development of the software to display and run the game, graphical items are also added to the grid: code cubes to represent the model of the software system to execute the guessing word game.

FIG. 11D shows the developer's view of the word guessing game, in which the "gameboard" intended for view by a gameplayer is displayed to the left, and the development corner showing the model of the software system for the guessing game is displayed to the right of the screen.

Figure 11E:
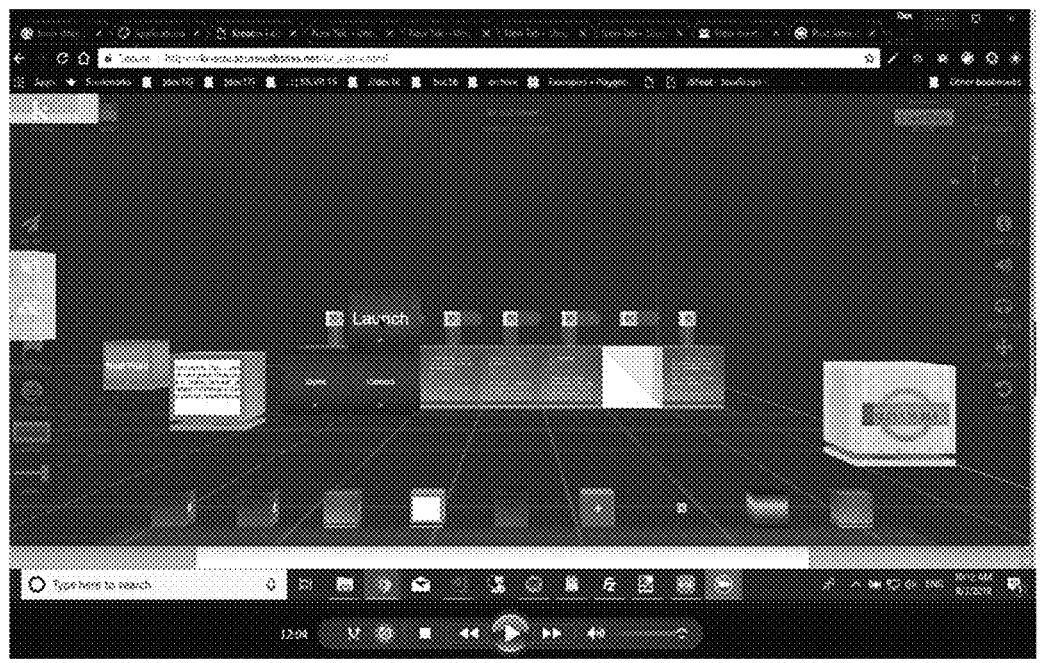

FIG. 11E shows more detail of the development corner that the developer, but not the game player, sees. The following types of cubes are used in the model of the software system for the guessing game:
  Code cubes representing the entities that hold the software code in the game's software system;
  At least one "Launch" cube representative of a trigger to initiate operation of the software that is represented by a series of selected cubes, in one embodiment with the link between the "Launch" cube and the first selected Code cube being the location of the "Launch" cube contiguous to the selected Code cube; and
  A Camera cube, which generates and presents the 2D display of the gameboard to the developer.

The Code cubes representing entities may have a limited number of lines of code (only about 50 or 100 lines of code) whereas the generated program, if created from scratch, could end up being thousands of lines of code. Code cubes may be named to aid the developer in remembering the functionality of the code associated with it. The amount of code that a developer has to remember may be huge, so associating names with Code cubes renders the model of the software system into a memory palace for the system.

Figure 11F:
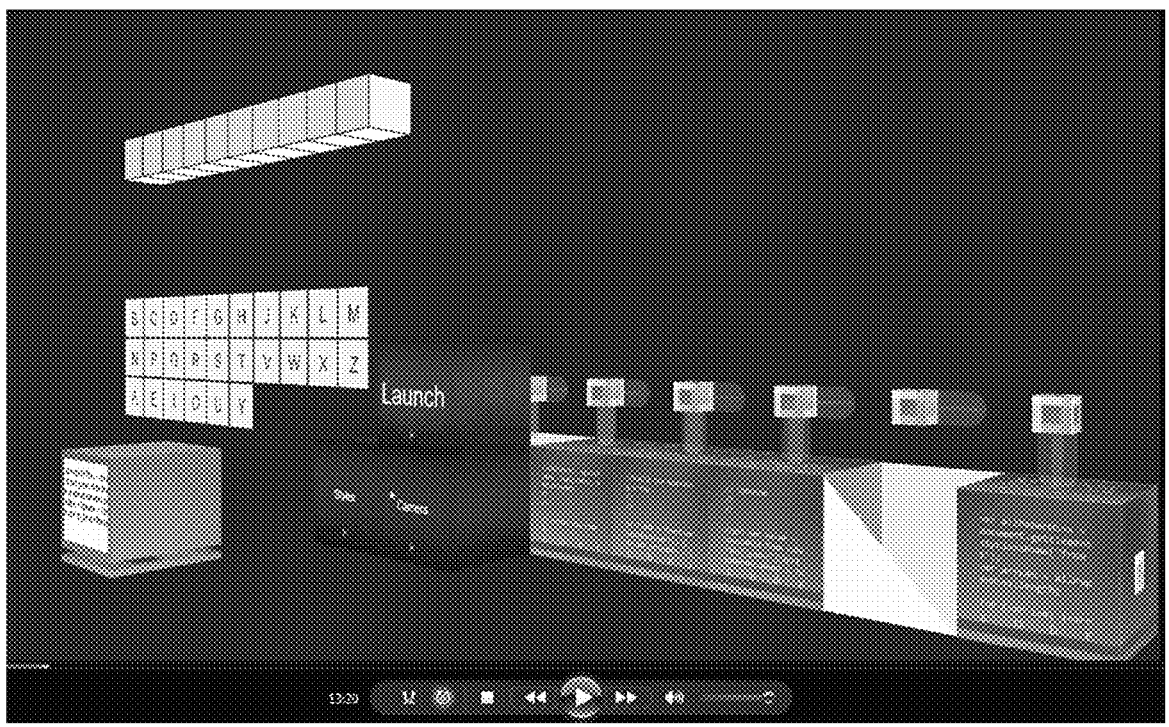

An example of how the Camera cube may be implemented to change the 2D display of the game may be seen in FIG. 11F.

The "Launch" cube is representative of a trigger to operate the software of a cube entity that is represented by a selected Code cube, in one embodiment with the link between the "Launch" cube and the selected Code cube being the location of the "Launch" cube contiguous to the selected Code cube. In this screen shot, the "Launch" cube is atop the Camera cube, causing launch of the Camera functionality to operate to change the view of the grid.

Figure 11G:
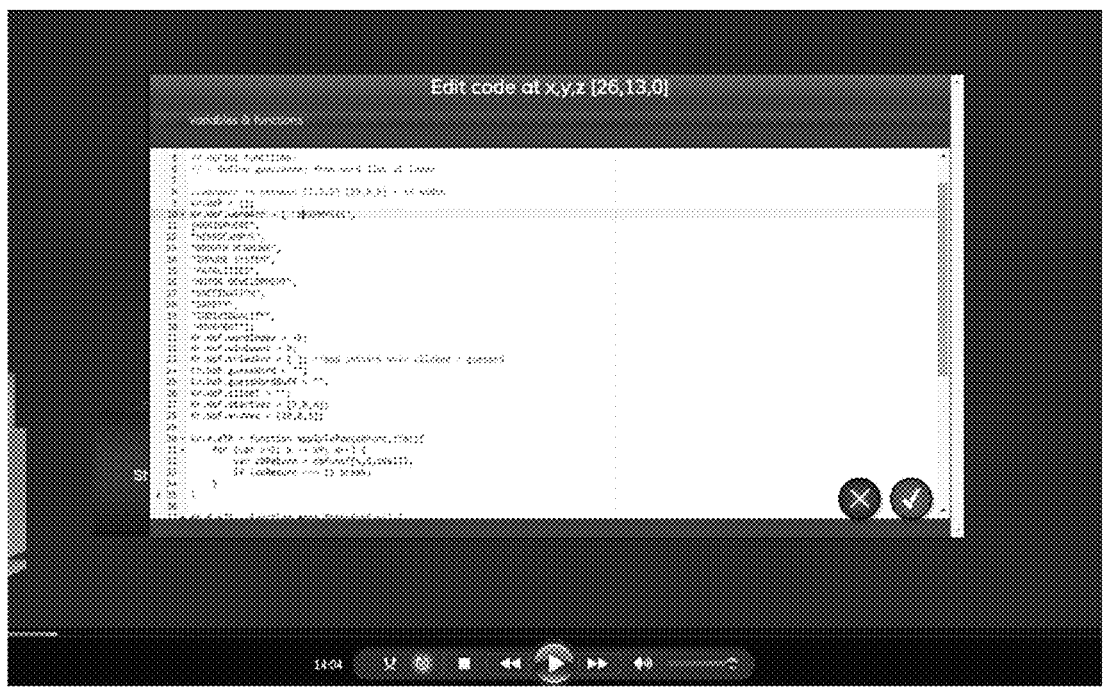
Figure 11H:

As an example of how code may be modified in a Code cube, FIG. 11G shows conventional valid JavaScript™ code in the Code cube representing the entity associated with the word list. The pseudocode that may be used to represent code for showing "EPIPHYSIS" as the guessing word is found in line 10 in the text space:

. . .
, "ENV.MoF.wordArr=["EPIPHYSIS"]
. . .

Another word, such as "ANOTHERWORD," may be substituted in the code of line 10, and, upon setting the "Launch" button atop the Code cube holding line 10, and clicking of the "Launch" button, the substitution of "ANOTHERWORD" for "EPIPHYSIS" occurs without the need for compiling, repurposing, or re-tasking. The substitution occurred because the developer accessed a Code cube at a grid address, changed a line of code, and launched the series of adjacent cubes to effect the change in code.

During play of the game, when the gameboard is presented in a 2D visual display, a player uses the user interface of the computer system to click on the 2D representation of the "New word" button with a cursor or to touch the button on a touch-screen (hereinafter "select"). In response, the client causes selection of one of the words in the list of available words stored in RAM. Using the code associated with the letter counting component associated with the entity, a count of the letters in the selected word is made and the count is stored in RAM, and instructions are sent along with the count of letters to the processor to identify the number of cubes needed to display the guessing word (one letter per cube) and to make invisible the cubes in the word space (that are positioned as determined by grid addresses) beyond the number of cubes needed to fit the guessing word into the word space.

A player guesses a letter by selecting the keyboard cube associated with the guessed letter. Selecting the keyboard cube activates the entity that it models, which causes a counter to increment to keep track of the number of guesses and also activates a search subprogram to cause the guessing word to be searched for occurrences of the selected letter in the guessing word, and, if any occurrences are found, to identify the letter positions in the guessing word where the guessed letter is found. The grid address(es) of the graphical item(s) in the word space that represent those letter position(s) in the guessing word where the guessed letter occurred are identified and then the guessed letter is associated with the graphical item(s) so identified, and then a display subprogram is executed to display the guessed letter in the identified graphical item(s).

In response, the software system also may cause the selected graphical item in the keyboard to become invisible in the 2D display of the grid (not deleting the keyboard graphical item from the grid itself, or the game could not be played another time) to signify that the letter associated with the selected item had already been guessed.

The guessing process is repeated until the guessing word in the word space is completed. After the word space is completed, an instruction is sent by the letter cube function controlling each letter cube to the large messaging wall at the back of the world. Depending on the session guess count, stored as a custom system variable, a display subprogram causes a display of a message such as "Success!" (FIG. 11H) when the guess count is below the selected preferred count, or a message such as "Try again" otherwise.

COP-based software programming in a dynamic, polymorphic multi-dimensional visual programming environment magnifies and multiplies the efficiency with which different pieces of a game or an app may be developed in a software system by using visual relationships, which are not conventional to software development. Visual changes in the environment may represent cubes being activated, created, changed, or destroyed. Each gives visual feedback to the developer which may be richer and more informative than a typical "command line" debug log. Therefore, even 2D systems may benefit from working through a "depth stack" or the ability to organize or be inspected visually and interactively.

5.2. Software Code Development

The dynamic multi-dimensional visual programming environment described herein is advantageous to both experienced and inexperienced code developers. Experienced developers may find the dynamic multi-dimensional visual programming environment system useful because of the ease of illustrating information spaces in the multi-dimensional model of the software system under development, the ability to visually represent a variable, a function, and an outcome, and the ability to move elements to another part of an application to experiment with options.

The visual model of the software system under development is particularly advantageous to developers with little or no experience, who may see patterns in the software systems and understand the system at a higher level when they may view the software system under development as code and as a multi-dimensional model. In addition, features of the disclosed dynamic multi-dimensional visual programming environment, such as the ability to view the visual model of the software system under development, the ability to modify the software system with ease (by moving graphical items, modifying their components, and adding links between them without having to maintain a dictionary of lookup names) allow for efficient editing of a software system, no matter the developer's experience level.

As an example, a developer may find a helpful HTML5 or JavaScript™ tutorial, then load the tutorial by pasting its URL into a "display cube". The developer may, in the same world, start a second cube that is a sub-editor (such as available in the Glitch™ and JS Fiddle™ development environments) which may include a preview window. Alternatively, the developer may add a third cube to generate the preview window.

The developer may copy and paste code from window 1 into window 2, edit as desired, and see the result updated in a preview window 3 without ever having to leave a single tab or without having to abandon other project materials that may also be relevant in the same world (such as code references, etc.).

The resulting product provides a user with a quicker learning and test loop with less switching and distance between learning materials with the added possibility of blending rich content (e.g. blogs) with interactive JavaScript (e.g. JS Fiddle™) which is currently an ad-hoc or "in line scrolling" solution only.

5.3. Multi-User Environment

The dynamic multi-dimensional visual programming environment on a user's computer system may be duplicated on computer systems for multiple users, resulting in a shared dynamic multi-dimensional visual programming environment for allowing multiple programmers to work together to develop the software system.

Figure 12A:
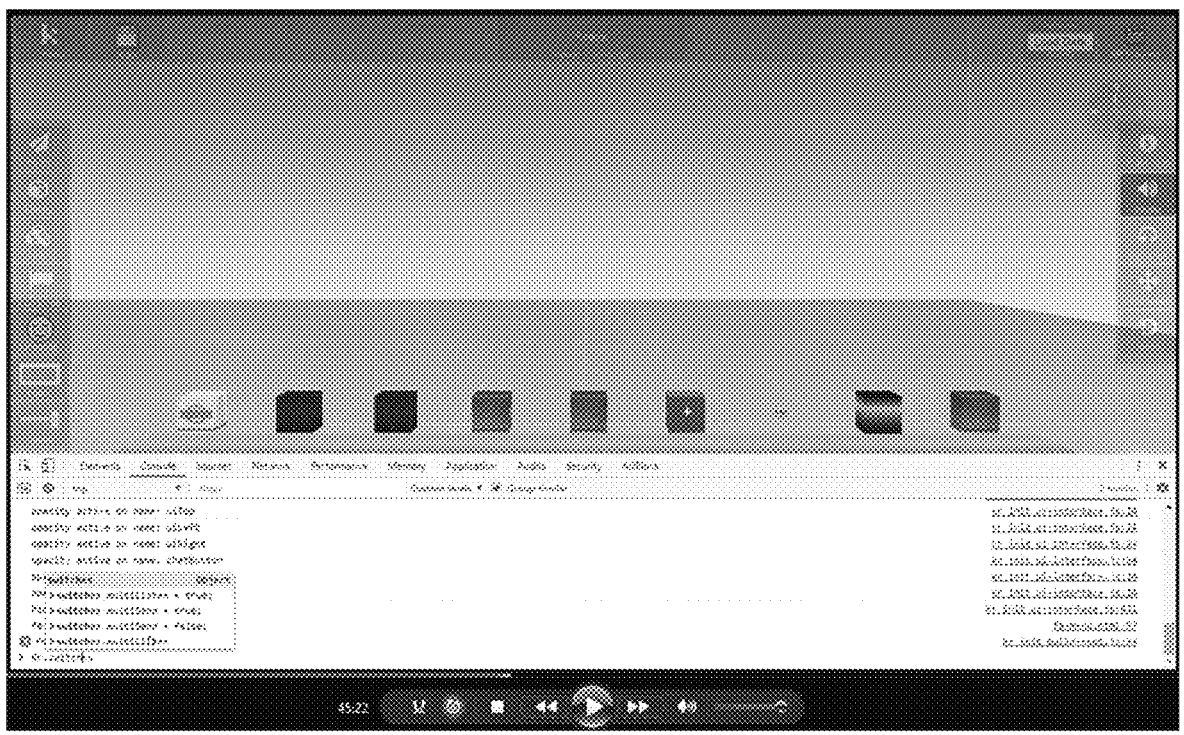
FIG. 12A-12H are screen shots of editor screens in use in multi-user development of an exemplary software system using the dynamic, polymorphic multi-dimensional visual programming environment of the current invention.

In one multi-user example, in which Developer 1 and Developer 2 want to share a multi-dimensional world (also known as a "world" or "space") and the code, data, and variables associated with it, Developer 1 may initiate world sharing by turning on a multiplayer broadcast with a multi-user flag on the browser's console of the graphical interface, which is part of the developer tools. Developer 1 may press the multiSend button to initiate the transmitting process to another developer, and press the multiListen button to initiate the receiving process from that developer. Developer 1 may select the browser's Console tab on the status bar to display an empty grid, and may also initiate send and receive at the Developer Console as seen in FIG. 12A.

Figure 12B:
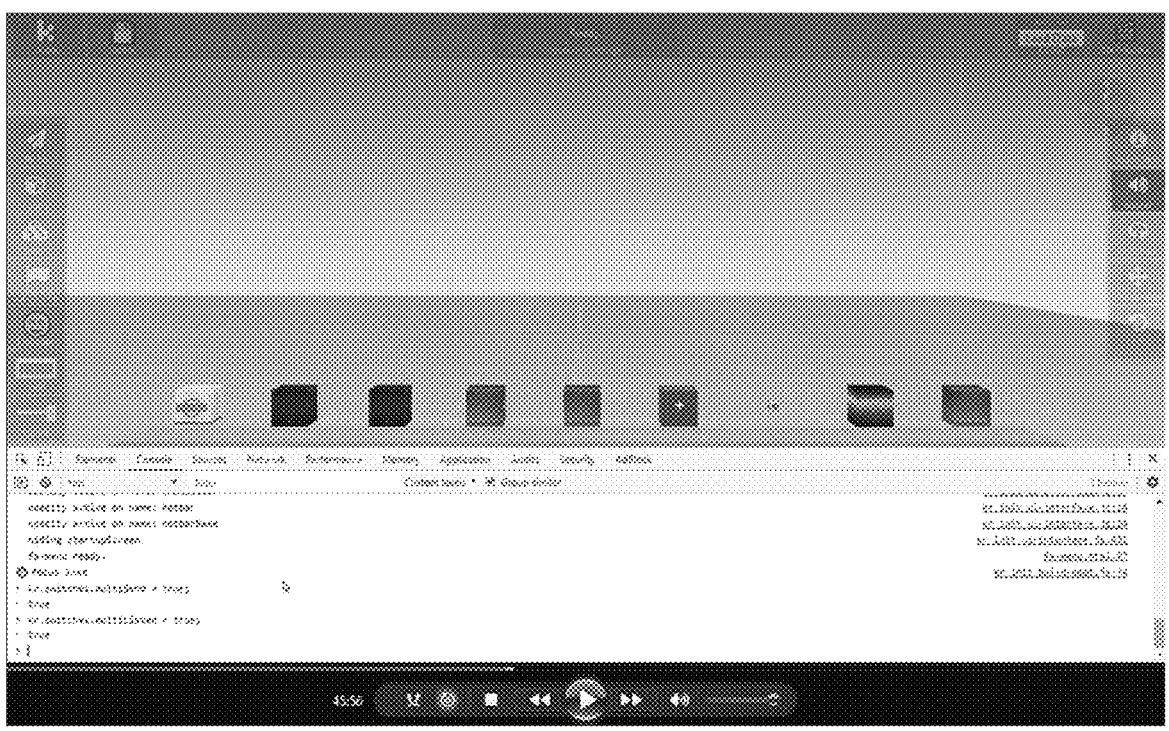

At the console, Developer 1 enters a command line. As seen in FIG. 12B, Developer 1 enters "Env.switches.multiSend=true" to enable sending Developer 1's world to Developer 2; and Developer 1 enters "Env.switches.multiListen=true" to receive broadcasts of Developer 2.

Developer 2 also selects "Env.switches.multiSend=true" to enable sending Developer 2's world to Developer 1. Developer 2 also inputs "Env.switches.multiListen=true" to receive broadcasts of Developer 1.

In using the instruction switches commands "(Env) .switch.multiSend", and "(Env).switch.multiListen," Developer 1 enables his version of the StringWorld and VoxelWorld to be shared with Developer 2. When Developer 2 does the same, she also enables her version of the StringWorld and VoxelWorld to be shared with Developer 1.

When two-way communication is established, the system 100 creates avatars for the sharing users with a conventional avatar development program (not shown). The avatars may be created in any conventional manner, with users choosing from a library (not shown) of available avatar types, customizing an available avatar, or uploading a preferred avatar. In addition, the system 100 has an avatar naming program (not shown) so that users may assign names to their avatars. A user may use her own name, a nick name, or a pseudonym as an avatar name. In further embodiments, the avatar naming program may have an avatar name randomizer subprogram (not shown) to create random avatar names for the user.

Figure 12C:
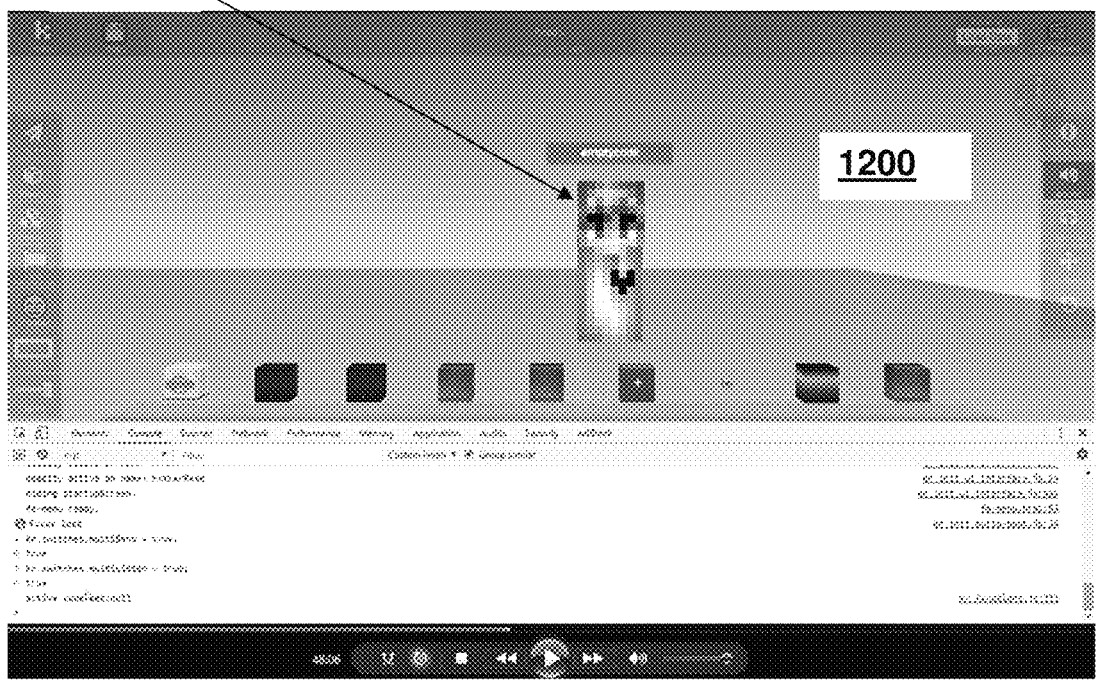

As shown on FIG. 12C, avatar names may be displayed on the 2D display in proximity to the avatar. In certain embodiments, users may be constrained to choose a unique avatar; in other embodiments, more than one user may choose the same avatar. In such embodiments, a user's avatar name, in combination with the user's chosen avatar displayed in proximity to the avatar name, may uniquely identify the user.

A user's avatar may be disposed on the grid at the location where the user's camera is providing a view of the grid, with the direction that a user's avatar's 'eyes' are facing into the grid reflecting the line of sight being provided to the user by the user's virtual camera. In the instant multi-user example, the view 1200 shown in FIG. 12C is Developer 1's view of the world, and each of the developers may roam their worlds at the same time, viewing different aspects of the multi-dimensional world, with an indicator of their presence in the world represented by his or her avatar. Developer 2's avatar 1210, named 'emptycook,' is in Developer 1's current line of sight. Developer 2, "pointing toward" Developer 1's camera, will see Developer 1's avatar in her view of the world. In this embodiment, neither Developer 1 nor Developer 2 sees his own avatar; each is viewing the world from the viewpoint of his own avatar. Other embodiments may be developed to allow a developer to see portions or all of his or her own avatar by rotating the camera downward to look at the avatar's own body, or from an external perspective.

By listening to Developer 2's broadcasts, the creation of a cube by Developer 2 and its placement at a selected grid address is broadcast on the conventional common socket in a common zone to Developer 1's browser. A common zone is a common user permission to send strings, and ask the server to forward strings, on a selected server port that is unmarked or marked "common". Low latency message passing and sorting may be conducted, like other messaging or email, by conventional industry tools, in this case socket.io, which is a JavaScript™ library for real-time web applications. socket.io is available through the MIT license from the Massachusetts Institute of Technology of Cambridge, Mass. The broadcast identifies the grid address, the type of entity modeled by the new cube, and values associated with the entity, which information is used to update Developer 1's world and the software system modeled thereby.

Developers of the dynamic, multi-dimensional visual software programming environment may elect to provide version control to manage modifications to software systems under development by multiple parties. If Developer 2's "listen" feature is not turned on, her world remains unchanged. Developer 1 may choose to resend the world to Developer 2 to update her world, by reloading the world with "broadcast" turned on.

One effect of this working relationship is a situation similar to collaborative editing software. Both contributors can "co-build"—creating and updating a world collaboratively by contribution, rather than by replacing the other user's entire document or world. Because of grid address conservation, when each developer works in their own spatial area, each may safely add cubes without compromising the integrity of either world. In addition, by operating with world sharing enabled, one developer may view the edits of other collaborators as the edits occur.

When Developer 2 wants to share code, text, or even a world with Developer 1, if they have not yet done so already, Developer 2 and Developer 1 select "Env.switches.multisend=true" to enable sending and "Env.switches.multiListen=true" to receive broadcasts.

Figure 12D:
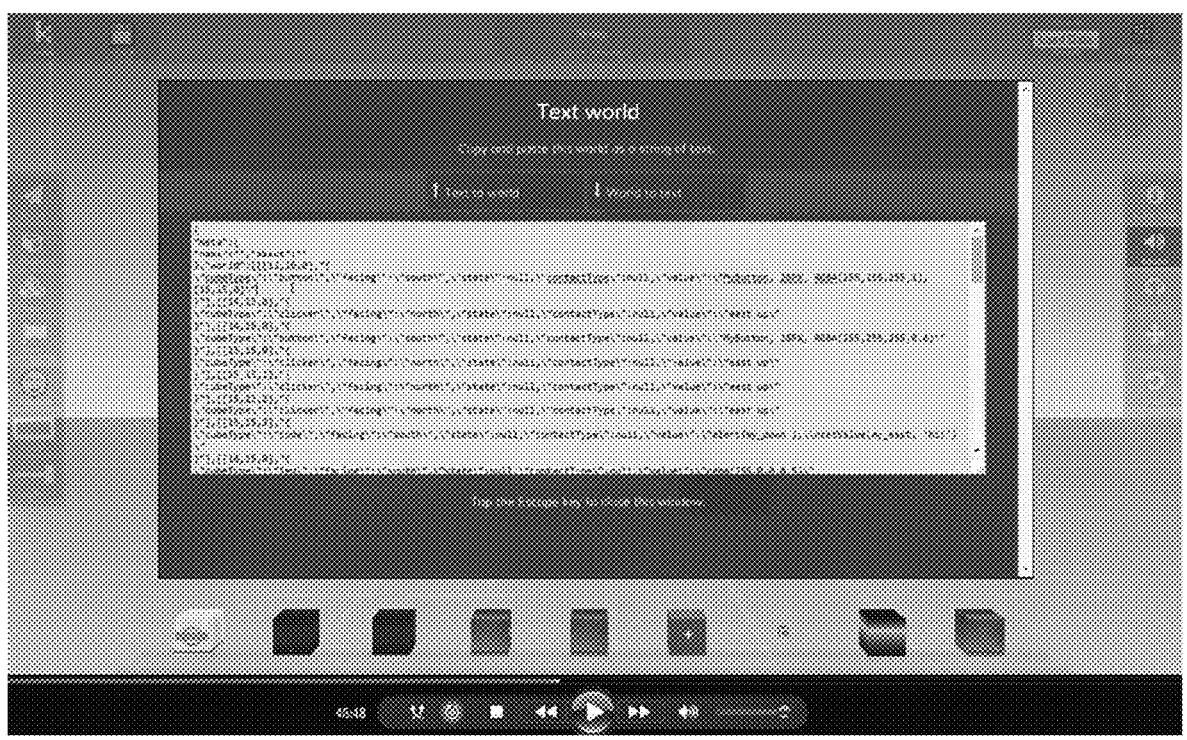

Developer 2 selects the World text button in the Menu pulldown list, which opens a Text world screen shown in FIG. 12D. Developer 2 may input (e.g. copy and paste) a text file describing the world to be loaded into the fillable space on the Text world screen.

As can be seen, Developer 2 may copy a text file, which may be only a few lines long, then pastes that text file into the text window in her browser, which, in the dynamic multi-dimensional visual programming environment, is the text input field of the Text world screen seen in FIG. 12D.

Figure 12E:
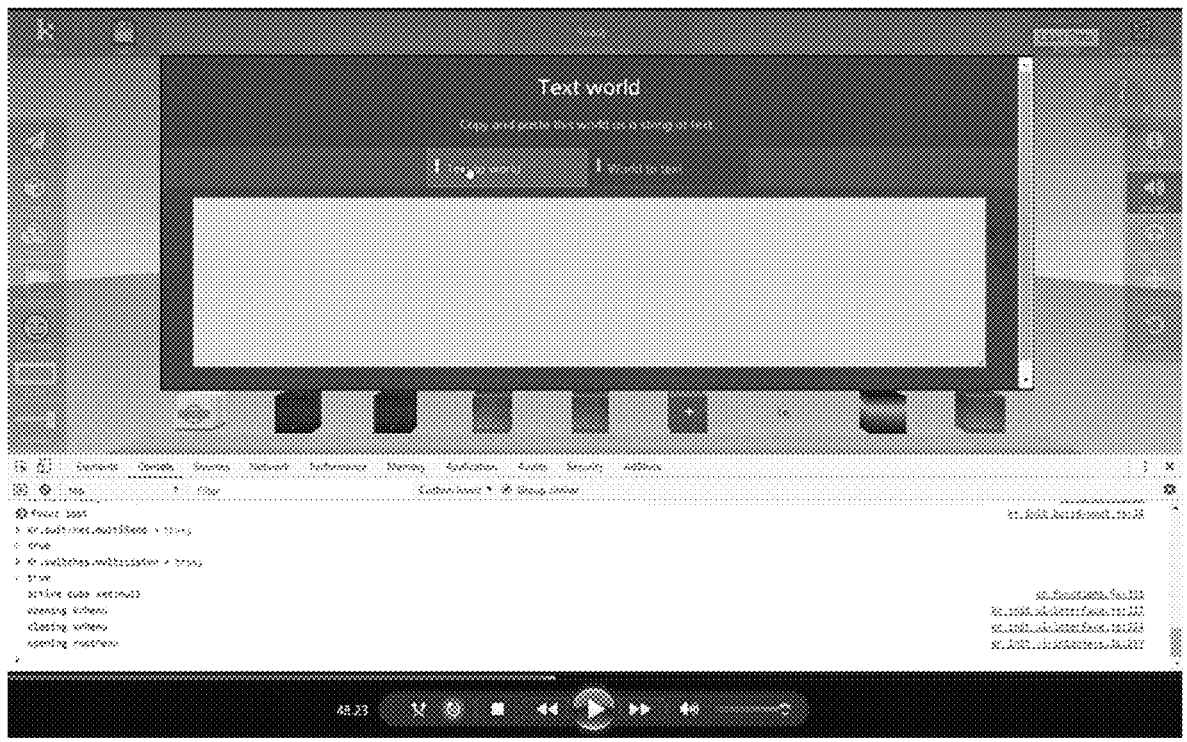

As shown in FIG. 12E, Developer 2 then clicks the 'Text to world' button on the Text world screen, which causes the text string to be sent to the StringWorld Building Program 112a to transform both visual representations of the software system. An instruction is sent to the StringWorld Building Program 112a to load that text string into Developer 2's world space and Developer 1's world space. Developer 2 may then press the Escape key to exit and dismiss the Text world screen.

On pressing 'Text to World', the text depicted in FIG. 12D may be sent to Load World function, which may back up a copy of the current "Env.active.StringWorld" (in case the user wants to perform an undo), and then replaces the active StringWorld with a sub-string of that text (other elements, such as metadata, in the save file such as seen in FIG. 12D and are described above).

Similar to other level loading processes described, a cube visual representation ("VoxelWorld"), is then generated from the replaced StringWorld.

Once the world is built from addresses in lines of code in the string of text, each address is interpreted as a visual graphical model of an entity in the computer system, with components associated with the entities presented with distinguishing visual characteristics, and with their entity interrelationships shown by links and adjacencies between graphical items, all defined by the string of text. That raw text does not readily lend itself to conceptualizing the software system. For a human developer, the visual world is easier to understand, more efficient, and more fluid to work with than the text representation, especially for collaborative projects.

Not only does a visual transformation occur from text string to a 2D display of the world, but also an information process occurs such that the information in the text string that is associated with grid addresses is transferred to storage, with all information related to all entities, including their graphical item models, their components (with functionality and style), and associated link information (or pointers to same) stored in the database at a location addressable by the grid address of the model of the entity. Thus, as explained earlier in this description of the dynamic multi-dimensional visual programming environment, the grid address of a selected graphical item may also operate as a database address to a selected storage record for the entity associated with the selected graphical item, with the information constituting data, code, or pointers to same in more remote storage.

The multi-user environment may be implemented in the dynamic multi-dimensional visual programming environment disclosed above with reference to FIGS. 1A-3. Referring to FIG. 10B, when Developer 2 is finished entering code and data into the "Text World" screen (see FIG. 10B), and presses the "Text to World" button, the contents of the "Text World" screen are sent to the processor executing Developer 2's version of the StringWorld Building Program 112A, and the "Text to World" instructions and data are received using the StringWorld I/O Subprogram 210a, stored using the Storage Subprogram 280a, and used to modify the software system under development using the SW System Modification Subprogram 226a. The processor may also populate the Developer 2's world space using the 3D Graphical Items Development Subprogram 220a, and the VoxelWorld Subprogram 221b.

The transformation of the text string into a multi-dimensional world results in an extensive visual transformation, in which grid addresses are populated with visual graphical items that represent entities of a software system. In accordance with the earlier established multiSend and multiListen commands, Developer 1, having enabled broadcasts from Developer 2, receives the broadcast of Developer 2's world, and with Developer 1's version of the StringWorld Building Program 112a, executes amendments to the Developer 1's version of the shared StringWorld in the same manner as the StringWorld Building Program 112A would execute amendments to the StringWorld by Developer 2.

Developer 1 and Developer 2 may both send and receive string broadcasts of formatted JSON on a shared server port, e.g. "site.com:3000", which is hosted or served by a standard web server or similar cloud service. Multi-User Control Subprogram 222f may transmit using the WebSocket protocol. The broadcasts may be stored first in a database such as the Master Database 310, then pasted into StringWorld at the same time.

Figure 12F:
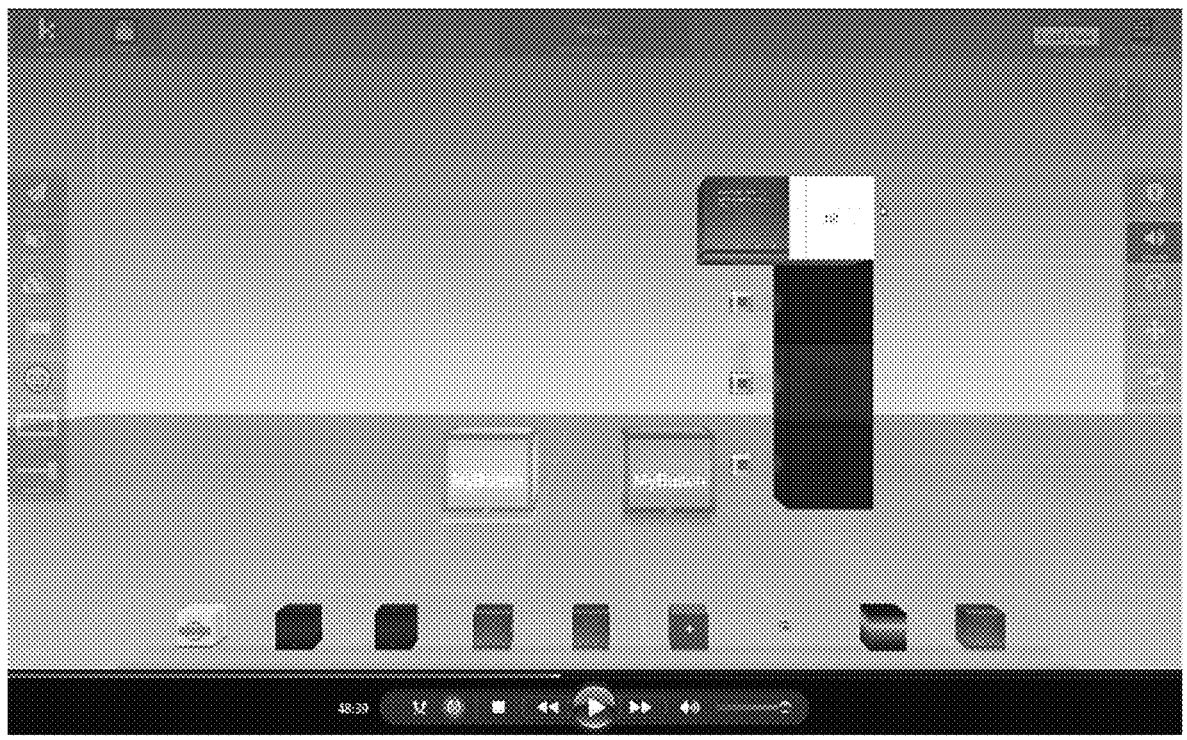
Figure 12G:

Developer 1 and Developer 2 may then both see the same multi-dimensional world, such as the one displayed in FIG. 12F. As shown in FIG. 12G, by clicking on a cube, for example, the "MyButton" cube, the cube may be highlighted and a message box opened on-screen to identify the grid address of the cube.

Figure 12H:

Further, by clicking on a cube and holding the ALT key simultaneously, an information screen, as shown in FIG. 12H, may open to present current information about code or data associated with the selected cube and provides an opportunity to edit the content, if the developer so chooses.

The software development tools and structures of the herein-described dynamic multi-dimensional visual programming environment thus allow multiple developers to share one application context in which similar information in multiple contexts is managed with a minimum of memory and CPU cycle consumption in consideration of its visual benefits. By co-locating multiple web resources, tools, and structures in the same context, the described dynamic multi-dimensional visual programming environment eliminates collection and coordination of similar user materials from a variety of different contexts, increasing interface efficiency.

5.4. Teaching Environment

Teaching coding can be difficult for the student and the teacher. Use of a dynamic multi-dimensional visual programming environment to model a software system may allow a student to understand how to organize, edit, test, and maintain a software system.

Conventional visual modeling programs like Google Docs™, which is available from Google LLC, or in the Microsoft PowerPoint™ presentation system, which is available from Microsoft Corporation, will allow a student to visualize and construct a diagram of a software system, but such conventional visual modeling programs do not support coding, outside of their own scripting languages, which require additional programs With a dynamic multi-dimensional visual programming environment, the software system may be implemented directly by modeling, and then manipulated to add, remove, or edit functionality and to move and replicate software system elements so as to improve organization and functionality of the software systems.

Programs like Minecraft EDU, a game-based K-12 learning platform by Mojang AB of Stockholm, Sweden, and now available from Microsoft Corporation, familiarize students with software concepts and certain programming techniques, but many K-12 teachers would prefer programming environments that are not as much in the gaming mindset.

A dynamic multi-dimensional visual software programming environment such as discussed here may be used in the classroom to teach software concepts and programming techniques. It may be used to keep students focused while preparing them to program and to use code, limiting complexity of the world (for example, limiting the volume of the grid as suggested in the exemplary pseudocode for the "3D Array Scan" command described, in which the defined 3D grid is 32×32×32) and providing a visually graspable environment in which a 2D screen displays a multi-dimensional grid containing familiar blocks (cubes) to model elements of a modular software system and that are able to be manipulated to edit the software system with familiar user interfaces. Certain functionality in the VoxelWorld program may be available to allow voxels to be created that are multiples of single voxels in size (or from non-cube shaped voxels) for convenience, as well as for multiple voxels to share the space of a single voxel, all while maintaining its consistent and comfortable "one cube per voxel location" convention.

Cube types may be blocks of selected colors or textures; and one graphical item may be a floor on which the other cubes may sit, with the floor item also having selectable color or texture options. Cube types may also have other non-appearance capabilities that may be associated with the cubes, such as storing an .mp3 file, a .mov file, or pointers to environment functionality (like text to speech); accessing the networking features of the dynamic multi-dimensional visual software programming environment to search the Internet; develop hyperlinks to Internet content (such as instructions on how to build artificial wood duck nests) and store the hyperlinks; or accessing the hyperlinked or stored files or pointers and triggering the execution of the accessed content. Students may also make use of the multi-user features of the environment discussed here to allow students to work individually for certain portions of the project and in teams for other portions of their project.

As an example, a student may be assigned a research project about wood ducks. The students may create a series of blocks and assign a category related to ducks to each one—their habitats, migration patterns, life expectancy, food habits, nesting preferences, appearance when young and when mature (by gender), and the calls they make, labeling the blocks with relevant titles and/or including images that represent the categories. The students may use the networking functionality of the dynamic multi-dimensional visual software programming environment to search the Internet and fill the world with the results of their research (such as a map of where certain ducks are found on a river or within a watershed), associating data from and links to their Internet search with the cube for the research category.

Students may integrate multi-dimensional models or pictures of ducks, and they may record themselves reading their research and associating the recording with a sound cube so that the student's voice may be heard when the sound cube is clicked. They may store videos of a field trip that they took to a wood duck habitat or a video of a class or Eagle Scout project in which they participated in building artificial nests for the wood ducks, and associate the stored videos with a video cube that may play the video when the video cube is clicked.

The student may use the functionality of the dynamic multi-dimensional visual software programming environment to simulate what happens to a population of wood ducks when environmental events occur (early snow, hurricane, drought, or pollution) or when a food supply is disrupted. The students may also develop the relationships between cubes described above, such as proximity links or conjoiners between and among cubes so that execution of one cube triggers execution of other(s), to demonstrate, for example, relationships between categories (like habitat and season of the year).

The students may organize the cubes in whatever organizational style they deem appropriate and change the appearance of the background to their preferences. They may give their world a title, description, and author, and add data cubes for other identifying information such as classroom, team members, and a "table of contents", which may be visually organized to identify aspects of the project. The students may provide conjoiners between the "table of contents" block and the other blocks so that a user could click on a research category and be taken to the block for that category. Additionally, the student's name and the blocks to which he or she contributed may be highlighted on the screen.

Additionally, the students may structure the "table of contents" block so that its displayed contents may be switched between presenting the contents by research category or by the research team for each category. The students may provide conjoiners between the "table of contents" block and the other blocks so that a user may click on a student's name and the blocks to which he contributed are highlighted on the screen.

As the students are building their worlds, whether they know it or not, they are developing software programs. The dynamic multi-dimensional visual software programming environment may have a capability to switch between displaying a 2D representation of their world and displaying the software program that they are creating. Students may be guided into reading the lines of code to develop an understanding of what programming means (how the computer manages and operates to execute what they have created). For example, a student who created a blue block may be guided into searching for the word "blue" in the program, and in so searching, find the line of code in the world text model for the "blue" color component associated with the entity representing the blue block. The student may also be guided into editing the identified line of code to substitute the word "red" and then switch back to the 2D display of their world to find the color of the block has changed.

Examples of types of non-visual coding that students may perform include:

Using a set of algebraic operation cubes to show pieces of equations visually and display the results, either on cube faces or by adding more cubes to the environment to create a simple graphing system;

Using clicker cubes and switches to build logic chains and print, or visually display, results of boolean logic and other common logic trees, and clicking parts of the structure to see sub-chains in action and interpret results; and Moving cubes in the world to solve, or create, a challenge for the user.

Examples of types of conceptual thinking that programming in a dynamic multi-dimensional visual software programming environment may provide include spatial reasoning, computational thinking (e.g., block-demonstrated multiplying and division), or direction, as shown by the 'facing' properties defined in the "Add Voxel" command represented in the pseudocode disclosed above, which may be used to show the difference between north, south, east, and west.

Others include proximity, interrelationships and cause-and-effect (such as when a click on one cube triggers a change in the display of another), all provided in the hands on, visual and multi-dimensional representations to which learners frequently respond. A dynamic multi-dimensional visual software programming environment learning tool would be particularly useful in a Montessori-like teaching environment, in which the tools and materials are set up in a way that makes clear what a student can do with them, but it is up to the student to select how to use them.

Further, teachers may control the sharing of information related to the assigned project by being the Project Manager, splitting the project into assigned topics, and assigning groups of students to research and present computerized reports of each assigned topic. A teacher may activate the send and listen instructions disclosed above to an assigned portion of the software project under development to a selected group of students, but allow the group with no listening or sending access to other portions of the software project that are assigned to other groups of students. The teacher may set the "(Env).switch.multiSend" instruction for him or herself so that he may follow the group's progress. Thus, teachers may create for themselves an effective "chatroom" for limited or complete sharing, applying permissions to create a desired effect.

Such functionality is particularly useful to a teacher who wants to assign certain topics to sets of students as part of a class project, thus allowing a selected group of students to research and present information on one subtopic and allow another set of students to research and present a report about another subtopic. The teacher may set up groups of students to listen and send to each other the portion of the software system related to the assigned subtopic, while retaining for him or herself the ability to "listen in" on all of the portions of the software systems assigned to the student groups. Thus, as part of the functionality of the shared dynamic multi-dimensional visual programming environment, a teacher may restrict any "stream" of broadcasts and may allow listening to and by a group of people in a labeled chatroom, such as "Students", "Teachers", etc.

53. Modeling Three-Dimensional Structures

The dynamic multi-dimensional visual programming environment, such as the 3D environment described above with reference to FIGS. 1A-3, may be used to model factory floors, multi-story warehouses, office buildings, or any other three-dimensional environment.

In one example, an architect requiring a brand-new 3D model may set down cubes as corners of a rectangular object, such as a factory or office building. These cubes may be given a new component name, such as "factory-corner", and may be equipped with functionality to draw lines to the nearest neighbors of the same component or cube type. Then, the architect may add another vertical set of four corner components per floor and thus draw a building with interactivity-ready layers. The architect may also find it useful to define a cube to be associated with multiple entity sub-components to add additional dimensions to define functionalities (HVAC, IT, plumbing) to be associated with some or all of the cube, thus rendering additional dimensions to the definition of the building.

An architect may also use Code cubes to draw non-cuboid shapes in CSS, similar to how the environment draws a "VoxelWorld," to create a series of elements which are then given width, height, visual styling and desired (X,Y,Z) pixel transforms and then are attached to an existing multi-dimensional architectural representation.

For pre-built models stored in common public formats such as the glTF multi-dimensional model type, a prototype "model" cube may load the external model's geometry, material, and/or animations as needed, including via HTTP(S) request if stored externally. Separate preview panels attached to each model cube may be used to view the models together in one frame, like moveable virtual holograms. The models may also be loaded together into one virtual space for the user to view as a layer composited with the cube world that takes up the entire background width and height and coordinates movement within the cube world, or "voxel world", using simple rotoscoping techniques (i.e. coordinated camera motions to make two cameras on two layers appear as one in a final combined-layer view).

These and the other elements of the dynamic multi-dimensional visual programming environment, which present themselves as functions embedded into cubes of different type and appearance, together comprise an intuitive low-code environment for creating practical reports, experiences, and applications that can be developed easily by a user with minimal training. According to reports by the Gartner Group (2018) and Forrester Research (2017), the "low-code" software segment is a fast-growing area of line-of-business application development. Demand for new developers familiar with "low-code" processes will increase for the foreseeable future. The dynamic multi-dimensional visual programming environment herein described combines the traditional views of Data, Process, Code, and Interface into one tangible system.

Although the disclosed system elements have been described above as being in units and sub-units, a person of ordinary skill in the art will recognize that functionalities provided by one or more units may be combined. As a person of ordinary skill in the art will appreciate, one or more units may be optional and may be omitted from implementations in certain embodiments.

The foregoing descriptions have been presented for purposes of illustration. They are not exhaustive and do not limit the invention to the precise forms or embodiments disclosed. Modifications and adaptations of the invention will be apparent to those skilled in the art by consideration of the specification and practice of the disclosed embodiments. It is intended that the specification and examples be considered as exemplary only, with a true scope and spirit of the invention being indicated by the following claims.

The invention claimed is:
1. A system comprising:
a processor;
a two-dimensional display screen;
a memory containing records associated with a software system and with a computer-based programming environment for computer-based development and maintenance of the software system; and
a non-transitory computer-readable medium encoding instructions, for execution by the processor, for the computer-based development, operation, and maintenance of the software system, and for computer-based building and operation of the computer-based programming environment,
wherein the programming environment has:
a software system modelling program for modeling the software system in a plurality of dimensions such that the modeled software system comprises a multi-dimensional representation of the software system having a spatial arrangement of multi-dimensional structures that model elements of the software system, with a selected multi-dimensional structure for modeling a selected element of the software system further having:
a graphical image with a grid location on a multi-dimensional grid in the multi-dimensional representation, the selected grid location having a unique grid address on the multi-dimensional grid,
a polymorphic characteristic for representing a plurality of element types in the modeled software programs, the polymorphic characteristic supplying an individuality of appearance to the multi-dimensional structure and for conveying information about values associated with the selected element, the individuality of appearance being changeable based on the values associated with the selected element, and
a dynamic structure characteristic for modifying a feature or the values of the selected element based on a modification of the selected multi-dimensional structure; and
a visual programming language to support the modeling and operation of the software system and manipulation of the multi-dimensional structures that model the software elements; and
wherein the instructions for the computer-based development and maintenance of the software system comprise instructions to cause the processor to
render the multi-dimensional representation of the software system into a display on the two-dimensional computer screen,
construct, display, and act on instructions from a user interface associated with the 2D screen to perform the manipulation of the multi-dimensional structures,
receive, into the memory, a request for building the computer-based programming environment, and
in response to receiving the request, supply the computer-based programming environment.

2. The system of claim 1, wherein the instructions for the computer-based development, operation, and maintenance of the software system further comprise instructions to impose conservation of addressing on the multi-dimensional grid to disallow superimposition of the multi-dimensional structures in one grid location on the multi-dimensional grid.

3. The system of claim 1, wherein the software system is organized according to Object-Oriented Programming (OOP) methodology.

4. The system of claim 1, wherein the software system is organized according to Component Oriented Programming (COP) methodology,
wherein the software system is organized into system entities, interrelationships between the system entities, and components defining attributes or behaviors of the system entities, the software system having:
a first system entity with a first component associated therewith and modeled by a first multi-dimensional structure comprising:
a first image positioned at a first location on the multi-dimensional grid, and
a first individuality of appearance based on the first component;
a second system entity with a second component associated therewith and modeled by a second multi-dimensional structure comprising:
a second image positioned at a second location on the multi-dimensional grid, and
a second individuality of appearance based on the second component, and
wherein the second system entity is different from the first system entity, the second component is different from the first component, the second location is different from the first location, and the second individuality of appearance is different from the first individuality of appearance.

5. The system of claim 1, wherein the software system has a selected interrelationship between a pair of system entities that is modeled by a visual representation between a pair of multi-dimensional structures that model the pair of system entities.

6. The system of claim 1, wherein the multi-dimensional representation of the software system comprises a three-dimensional representation of the software system.

7. The system of claim 1, wherein the computer-based programming environment further comprises instructions to impart at least one of software functionality to a target software element and appearance of an identified multi-dimensional structure in the model of the software system.

8. The system of claim 7, wherein the appearance of the identified multi-dimensional structure in the model of the software system further comprises instructions to impart at least one of a visual style and a behavior to the identified multi-dimensional structure.

9. The system of claim 7,
wherein the target system element is modeled by a target multi-dimensional structure with a target location on the multi-dimensional grid, and an identified system element is modeled by the identified multi-dimensional structure with an identified location on the multi-dimensional grid; and
wherein the computer-based programming environment further comprises instructions to develop a proximity association between the target system element and the identified system element, with the proximity association based on a proximity of the target location to the identified location.

10. The system of claim 7, further comprising an identified software element modeled by an identified multi-dimensional structure,
wherein the target software element is modeled by a target multi-dimensional structure; and
wherein the computer-based programming environment further comprises instructions to allow for functionality of the target software element to be influenced by the identified software element, with the behavior based on location on the multi-dimensional grid of the target multi-dimensional structure and the identified multi-dimensional structure.

11. The system of claim 7, further comprising a target multi-dimensional structure that models the target software element and that is positioned at a target location on the multi-dimensional grid, wherein the instructions to impart the at least one of the software functionality to the target software element and the appearance of the identified multi-dimensional structure further comprises instructions to act on the target software element through direct or absolute addressing of the target location.

12. The system of claim 7,
wherein the target software element is modeled by a target multi-dimensional structure having a target location on the multi-dimensional grid, and the identified multi-dimensional structure models an identified software element and has an identified location on the multi-dimensional grid; and
wherein the instructions to impart the at least one of the software functionality to the target software element and the appearance of the identified multi-dimensional structure further comprises instructions to act on the target software element through relative addressing, comprising addressing based on a distance on the multi-dimensional grid of the target location from the identified location.

13. The system of claim 1, wherein the selected multi-dimensional structure further comprises a dynamic element characteristic for modifying a feature of the selected multi-dimensional structure based on modification of the selected software element.

14. The system of claim 1, wherein the instructions for the computer-based development and maintenance of the software system further comprise instructions to cause the processor to
receive, into the memory, a request for modifying the computer-based programming environment, and
in response to receiving the request, modify the computer-based programming environment.

15. The system of claim 1, wherein the instructions for the computer-based development and maintenance of the software system further comprise instructions to cause the processor to transmit execution of the selected element of the software system based on an appearance of the selected graphical item associated with the selected element.

16. The system of claim 1, wherein the instructions for the computer-based development and maintenance of the software system further comprise instructions to cause the processor to alter interrelationships among the elements based on an appearance of a selected graphical item.

17. The system of claim 1, wherein the instructions for the computer-based development and maintenance of the software system further comprise instructions to cause the processor to alter the path of code execution of the software system based on the interrelationships among elements of the software system.

18. The system of claim 1, wherein the instructions further comprise instructions for presenting the computer-based programming environment, the software system, and the multi-dimensional representation of the software system on a plurality of computer systems, the instructions further comprising instructions for sharing interaction with the software system.

19. The system of claim 18, wherein the instructions for sharing the interaction with the software system further comprise instructions for reflecting operation of and changes to the software system on a first computer on the software system on a second computer system.

20. A system comprising:
a processor;
a two-dimensional display screen;

a memory containing records associated with a software system and with a computer-based programming environment for computer-based development and maintenance of the software system; and a non-transitory computer-readable medium encoding instructions, for execution by the processor, for the computer-based development, operation, and maintenance of the software system, and for computer-based building and operation of the computer-based programming environment, wherein the programming environment has:
- a software system modelling program for modeling the software system in a plurality of dimensions such that the modeled software system comprises a multi-dimensional representation of the software system having a spatial arrangement of multi-dimensional structures that model elements of the software system, and
- a visual programming language to support the modeling and operation of the software system and manipulation of the multi-dimensional structures that model the software elements; and wherein the instructions for the computer-based development and maintenance of the software system comprise instructions to cause the processor to
- render the multi-dimensional representation of the software system into a display on the two-dimensional computer screen,
- construct, display, and act on instructions from a user interface associated with the 2D screen to perform the manipulation of the multi-dimensional structures,
- receive, into the memory, a request for building the computer-based programming environment, and in response to receiving the request, supply the computer-based programming environment; and present the computer-based programming environment, the software system, and the multi-dimensional representation of the software system on a plurality of computer systems, the instructions further comprising instructions for sharing interaction with the software system.

* * * * *